United States Patent
Luo et al.

(10) Patent No.: US 11,844,070 B2
(45) Date of Patent: Dec. 12, 2023

(54) DATA TRANSMISSION METHOD, DEVICE, AND SYSTEM, AND STORAGE MEDIUM

(71) Applicant: HUAWEI TECHNOLOGIES CO., LTD., Shenzhen (CN)

(72) Inventors: Zhihu Luo, Beijing (CN); Jun Li, Shanghai (CN); Xiaolei Tie, Shanghai (CN); Zhe Jin, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 448 days.

(21) Appl. No.: 17/212,183

(22) Filed: Mar. 25, 2021

(65) Prior Publication Data
US 2021/0212095 A1    Jul. 8, 2021

Related U.S. Application Data

(63) Continuation of application No. PCT/CN2018/108488, filed on Sep. 28, 2018.

(51) Int. Cl.
*H04W 72/12* (2023.01)
*H04W 72/1273* (2023.01)
*H04W 72/23* (2023.01)

(52) U.S. Cl.
CPC ....... *H04W 72/1273* (2013.01); *H04W 72/23* (2023.01)

(58) Field of Classification Search
CPC .......................... H04W 72/1273; H04W 72/23
USPC ........................................................ 370/329
See application file for complete search history.

(56) References Cited

U.S. PATENT DOCUMENTS

| | | | | |
|---|---|---|---|---|
| 2015/0257150 | A1* | 9/2015 | Yi | H04B 7/26 370/329 |
| 2017/0353946 | A1 | 12/2017 | Rico Alvarino et al. | |
| 2022/0116850 | A1* | 4/2022 | Ahn | H04W 40/22 |

FOREIGN PATENT DOCUMENTS

| | | |
|---|---|---|
| CN | 107046722 A | 8/2017 |
| CN | 107204825 A | 9/2017 |
| CN | 108541359 A | 9/2018 |
| WO | 2018030848 A1 | 2/2018 |

OTHER PUBLICATIONS

Ericsson, NB-IoT—Remaining issues for NPDCCH, 3GPP TSG-RAN1#84-BIS, R1-162773, Apr. 11-15, 2016, total 6 pages.

(Continued)

*Primary Examiner* — Faisal Choudhury
(74) *Attorney, Agent, or Firm* — Maier & Maier, PLLC

(57) ABSTRACT

Embodiments relate to the internet of things communications field, and provide a data transmission method, device, and system, and a storage medium. The method includes: determining a first parameter, a second parameter, a first gap threshold, and a second gap threshold; determining, based on the first parameter and the first gap threshold, whether a gap exists in transmission on a downlink control channel; sending downlink control information through the downlink control channel based on a determining result; determining, based on the second parameter and the second gap threshold, whether a gap exists in transmission on a downlink data channel; and sending a transport block through the downlink data channel based on a determining result.

20 Claims, 12 Drawing Sheets

(56) References Cited

OTHER PUBLICATIONS

Mediatek Inc. "Detail on scheduling delay for PDSCH and PUSCH." 3GPP TSG RAN WG1 Meeting #84bis. Busan, South Korea. R1-163260. Apr. 11-15, 2016. 3 pages.
Ericsson. "NB-IoT—Remaining issues for NPDSCH design", 3GPP TSG WG1 Meeting #84bis, R1-162774. Busan, Korea. Apr. 11-15, 2016. XP051080718. 6 pages.
Ericsson et al. "WF on Further Details of DL Gap Configuration for NB-IoT", 3GPP TSG RAN WG1 Meeting #84bis, R1-163448. Busan, Korea. Apr. 11-15, 2016. XP051088807. 6 pages.
LG Electronics. "Discussion on multiple transmission blocks scheduling in NB-IoT", 3GPP TSG RAN WG1 Meeting #94, R1-1808476. Gothenburg, Sweden. Aug. 20-24, 2018. XP051515855. 4 pages.

\* cited by examiner

CONT. FROM FIG. 6A

CONT. FROM FIG. 6A

608: Receive the downlink control information from the network device through the downlink control channel based on the result of determining whether a gap exists in the transmission on the downlink control channel, where the downlink control information is used to schedule the one or more transport blocks 609: Determine, based on the second parameter and the second gap threshold, whether a gap exists in the transmission on the downlink data channel 610: Receive the one or more transport blocks from the network device through the downlink data channel based on the result of determining whether a gap exists in the transmission on the downlink data channel

FIG. 6B

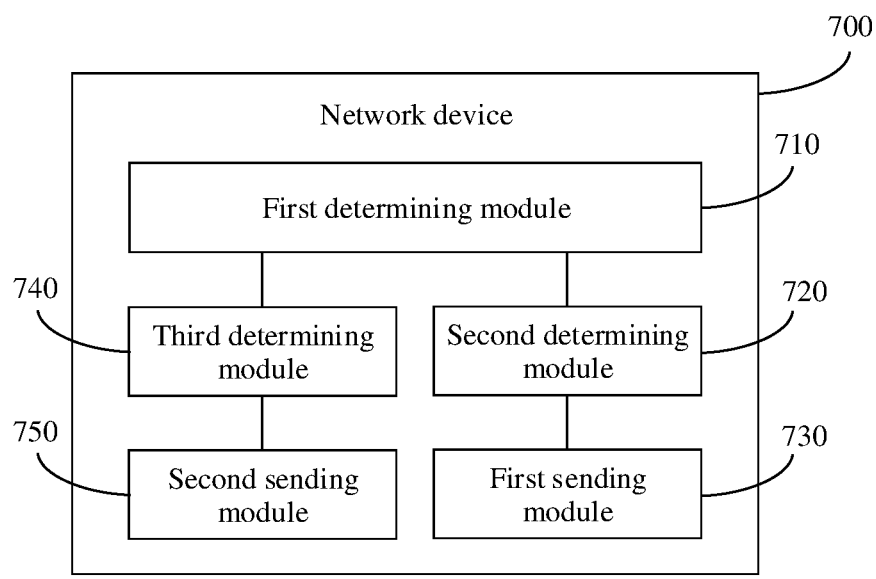

FIG. 7

CONT. FROM FIG. 10B

CONT. FROM FIG. 10B

CONT. FROM FIG. 10B

1018: Receive the downlink control information from the network device through the downlink control channel based on the result of determining whether a gap exists in the transmission on the downlink control channel 1009: Determine, for the terminal device of the second type based on the second parameter and the second gap threshold, whether a gap exists in the transmission on the downlink data channel 1010: Send a plurality of transport blocks to the second terminal device through the downlink data channel based on the result of determining whether a gap exists in the transmission on the downlink data channel, where the downlink control information is used to schedule the plurality of transport blocks 1019: Determine, based on the second parameter and the second gap threshold, whether a gap exists in the transmission on the downlink data channel 1020: Receive the plurality of transport blocks from the network device through the downlink data channel based on the result of determining whether a gap exists in the transmission on the downlink data channel, where the downlink control information is used to schedule the plurality of transport blocks

FIG. 10C

DATA TRANSMISSION METHOD, DEVICE, AND SYSTEM, AND STORAGE MEDIUM

CROSS-REFERENCE TO RELATED APPLICATIONS

This application is a continuation of International Application No. PCT/CN2018/108488, filed on Sep. 28, 2018, the disclosure of which is hereby incorporated by reference in its entirety.

TECHNICAL FIELD

Embodiments relate to the internet of things communications field, and in particular, to a data transmission method, device, and system, and a storage medium.

BACKGROUND

A narrowband internet of things (NB-IoT) system is a typical internet of things (IoT) system, and includes a plurality of terminal devices and a network device that provides communication services for the plurality of terminal devices. The NB-IoT system needs to support a relatively large coverage area due to different deployment environments of the terminal devices, for example, an outdoor deployment environment, an indoor deployment environment, and a basement deployment environment. The network device has different coverage conditions for the terminal devices in different deployment environments. The terminal devices in different coverage conditions require different quantities of repetitions (that is, quantities of times of repeat transmission) in downlink transmission. The coverage conditions are related to radio channel quality of the terminal devices and distances between the terminal devices and the network device.

The NB-IoT system defines two types of downlink physical channels: a narrowband physical downlink control channel (NPDCCH) and a narrowband physical downlink shared channel (NPDSCH). The NPDCCH is used to carry downlink control information (DCI). The NPDSCH is used to carry downlink data.

In the NB-IoT system, NPDSCHs corresponding to different terminal devices perform transmission in a time division multiplexing (TDM) mode, and the NPDCCH and the NPDSCH also perform transmission in a TDM mode. For a terminal device with a relatively poor coverage condition (for example, relatively poor radio channel quality), to ensure reliability of transmission, a relatively large quantity of repetitions is required in downlink transmission. As a result, the downlink transmission for the terminal device with the relatively poor coverage condition occupies a downlink channel for a long time, and the downlink channel is blocked. Therefore, the NB-IoT release 13 introduces a concept of a gap. During downlink transmission between the network device and a terminal device, for the downlink transmission for the terminal device, the network device determines whether a gap exists in a time period used for the downlink transmission for the terminal device. If a gap exists, the network device does not perform downlink transmission with the terminal device in the gap and continues performing downlink transmission with the terminal device after the gap. The terminal device determines whether a gap exists in the time period used for the downlink transmission. If a gap exists, the terminal device does not perform receiving for the downlink transmission in the gap and continues performing receiving for the downlink transmission after the gap. The processing of the network device and the terminal device is also referred to as postponed transmission.

The downlink transmission includes NPDCCH transmission and NPDSCH transmission. Currently, usually, a maximum quantity of repetitions $R_{max}$ of an NPDCCH search space is compared with a gap threshold $N_{gap,\ threshold}$ configured by the NB-IoT system to determine whether a gap exists in the NPDCCH transmission. If $R_{max}$ is greater than or equal to $N_{gap,\ threshold}$, a gap exists in the NPDCCH transmission. If $R_{max}$ is less than $N_{gap,\ threshold}$, no gap exists in the NPDCCH transmission. A manner of determining whether a gap exists in the NPDSCH transmission is the same as the manner of determining whether a gap exists in the NPDCCH transmission. Whether a gap exists in the NPDCCH transmission means whether a gap exists in a time period used for the NPDCCH transmission. Whether a gap exists in the NPDSCH transmission means whether a gap exists in a time period used for the NPDSCH transmission.

During actual transmission, downlink data is transmitted as a transport block (TB). Based on a size of a service data volume and a limitation on a TB size in the NB-IoT system, the downlink data may be split into a plurality of TBs for transmission. The TBs are carried on the NPDSCH for transmission. A subsequent evolved release of the NB-IoT release 13 evolves from supporting scheduling only one TB by one piece of DCI to supporting scheduling a plurality of TBs by one piece of DCI. In a scenario in which one piece of DCI schedules a plurality of TBs, in the existing gap determining manner, if $R_{max}$ is less than $N_{gap,\ threshold}$, no gap exists in the time period used for the downlink transmission, and therefore the downlink transmission is not postponed. However, total duration of NPDSCH transmission carrying the plurality of TBs may be relatively long. As a result, the NPDSCH transmission carrying the plurality of TBs occupies a downlink channel for a long time, thereby blocking the downlink channel, and affecting downlink transmission for other terminal devices. Therefore, a new gap determining manner is urgently required, to avoid continuous downlink transmission that lasts for a relatively long time for a terminal device and avoid blocking a downlink channel.

SUMMARY

Embodiments provide a data transmission method, device, and system, and a storage medium, to avoid continuous downlink transmission that lasts for a relatively long time for a terminal device and avoid blocking a downlink channel Solutions in the embodiments are as follows.

According to a first aspect, a data transmission method is provided. The method includes:
  determining a first parameter, a second parameter, a first gap threshold, and a second gap threshold;
  determining, based on the first parameter and the first gap threshold, whether a gap exists in transmission on a downlink control channel;
  sending downlink control information to a terminal device through the downlink control channel based on a result of determining whether a gap exists in the transmission on the downlink control channel;
  determining, based on the second parameter and the second gap threshold, whether a gap exists in transmission on a downlink data channel; and
  sending one or more transport blocks to the terminal device through the downlink data channel based on a result of determining whether a gap exists in the transmission on the downlink data channel, where the downlink control information is used to schedule the one or more transport blocks; and the first parameter is different from the second parameter, and the first gap threshold is the same as the second gap threshold; or the first parameter is the same as the second parameter, and the first gap threshold is different from the second gap threshold; or the first parameter is different from the second parameter, and the first gap threshold is different from the second gap threshold.

Optionally, the first parameter, the second parameter, the first gap threshold, and the second gap threshold enable a quantity of gaps included in a same time period used for the downlink data channel transmission to be not less than a quantity of gaps included in the same time period used for the downlink control channel transmission.

According to a second aspect, a data transmission method is provided. The method includes:

obtaining a first parameter, a second parameter, a first gap threshold, and a second gap threshold;

determining, based on the first parameter and the first gap threshold, whether a gap exists in transmission on a downlink control channel;

receiving downlink control information from a network device through the downlink control channel based on a result of determining whether a gap exists in the transmission on the downlink control channel;

determining, based on the second parameter and the second gap threshold, whether a gap exists in transmission on a downlink data channel; and receiving one or more transport blocks from the network device through the downlink data channel based on a result of determining whether a gap exists in the transmission on the downlink data channel, where the downlink control information is used to schedule the one or more transport blocks; and the first parameter is different from the second parameter, and the first gap threshold is the same as the second gap threshold; or the first parameter is the same as the second parameter, and the first gap threshold is different from the second gap threshold; or the first parameter is different from the second parameter, and the first gap threshold is different from the second gap threshold.

Optionally, the first parameter, the second parameter, the first gap threshold, and the second gap threshold enable a quantity of gaps included in a same time period used for receiving the downlink data channel to be not less than a quantity of gaps included in the same time period used for receiving the downlink control channel.

Optionally, in the first aspect and the second aspect, the first parameter is the same as the second parameter, and the first parameter is a maximum quantity of repetitions of a physical downlink control channel search space.

The determining, based on the first parameter and the first gap threshold, of whether a gap exists in transmission on a downlink control channel includes:

when the maximum quantity of repetitions of the physical downlink control channel search space is greater than or equal to the first gap threshold, determining that a gap exists in the transmission on the downlink control channel; or when the maximum quantity of repetitions of the physical downlink control channel search space is less than the first gap threshold, determining that no gap exists in the transmission on the downlink control channel.

The determining, based on the second parameter and the second gap threshold, of whether a gap exists in transmission on a downlink data channel includes:

when the maximum quantity of repetitions of the physical downlink control channel search space is greater than or equal to the second gap threshold, determining that a gap exists in the transmission on the downlink data channel; or when the maximum quantity of repetitions of the physical downlink control channel search space is less than the second gap threshold, determining that no gap exists in the transmission on the downlink data channel.

The first gap threshold and the second gap threshold are configured by a system; or the first gap threshold is configured by a system, and the second gap threshold is determined based on the first gap threshold and a quantity of transport blocks scheduled by the downlink control information; or the first gap threshold is configured by a system, and the second gap threshold is determined based on the first gap threshold and a maximum quantity of transport blocks that can be scheduled by the downlink control information.

Optionally, in the first aspect and the second aspect, the first parameter is a maximum quantity of repetitions of a physical downlink control channel search space, and the second parameter is a first quantity of valid subframes.

The determining, based on the first parameter and the first gap threshold, of whether a gap exists in transmission on a downlink control channel includes:

when the maximum quantity of repetitions of the physical downlink control channel search space is greater than or equal to the first gap threshold, determining that a gap exists in the transmission on the downlink control channel; or when the maximum quantity of repetitions of the physical downlink control channel search space is less than the first gap threshold, determining that no gap exists in the transmission on the downlink control channel.

The determining, based on the second parameter and the second gap threshold, of whether a gap exists in transmission on a downlink data channel includes:

when the first quantity of valid subframes is greater than or equal to the second gap threshold, determining that a gap exists in the transmission on the downlink data channel; or when the first quantity of valid subframes is less than the second gap threshold, determining that no gap exists in the transmission on the downlink data channel.

The first gap threshold and the second gap threshold are configured by a system; or the first gap threshold is configured by a system, the second gap threshold is determined based on the first gap threshold and a preset constant, and the preset constant is an integer greater than or equal to 1 and less than or equal to 10; or the first gap threshold is configured by a system, the second gap threshold is determined based on the first gap threshold and a third gap threshold, and the third gap threshold is configured by the system.

Optionally, in the first aspect and the second aspect, the first quantity of valid subframes is a quantity of valid subframes occupied by a physical downlink shared channel that carries the $1^{st}$ transport block in a plurality of transport blocks scheduled by the downlink control information; or the first quantity of valid subframes is a quantity of valid subframes occupied by a physical downlink shared channel that carries any one of a plurality of transport blocks scheduled by the downlink control information; or the first quantity of valid subframes is a quantity of valid subframes occupied by a physical downlink shared channel that carries a plurality of transport blocks scheduled by the downlink control information.

According to a third aspect, a network device is provided. The network device includes at least one module. The at least one module is configured to implement the data transmission method provided in any one of the first aspect or the optional manners of the first aspect.

According to a fourth aspect, a terminal device is provided. The terminal device includes at least one module. The at least one module is configured to implement the data transmission method provided in any one of the second aspect or the optional manners of the second aspect.

According to a fifth aspect, a network device is provided. The network device includes a processor, a memory, and a transceiver.

The transceiver is used for the network device to communicate with a terminal device.

The memory is configured to store an instruction.

The processor is configured to execute the instruction stored in the memory to implement the data transmission method provided in any one of the first aspect or the optional manners of the first aspect.

Optionally, the network device further includes a network interface. The processor, the transceiver, the memory, and the network interface are connected to each other through a bus. The processor includes one or more processing cores. The processor runs software programs and units to perform various functional applications and data processing. There may be a plurality of network interfaces. The network interfaces are used for the network device to communicate with other storage devices or terminal devices.

According to a sixth aspect, a terminal device is provided. The terminal device includes a processor, a memory, and a transceiver.

The transceiver is used for the terminal device to communicate with a network device.

The memory is configured to store an instruction.

The processor is configured to execute the instruction stored in the memory to implement the data transmission method provided in any one of the second aspect or the optional manners of the second aspect.

Optionally, the terminal device further includes a network interface. The processor, the transceiver, the memory, and the network interface are connected to each other through a bus. The processor includes one or more processing cores. The processor runs software programs and units to perform various functional applications and data processing. There may be a plurality of network interfaces. The network interfaces are used for the terminal device to communicate with other storage devices or network devices.

According to a seventh aspect, a data transmission system is provided. The data transmission system includes the network device in the third aspect and the terminal device in the fourth aspect. Alternatively, the data transmission system includes the network device in the fifth aspect and the terminal device in the sixth aspect.

According to an eighth aspect, a computer-readable storage medium is provided. The computer-readable storage medium stores an instruction. When the instruction is run on a processing component of a computer, the processing component is enabled to perform the data transmission method in any one of the first aspect or the optional manners of the first aspect.

According to a ninth aspect, a computer-readable storage medium is provided. The computer-readable storage medium stores an instruction. When the instruction is run on a processing component of a computer, the processing component is enabled to perform the data transmission method in any one of the second aspect or the optional manners of the second aspect.

According to a tenth aspect, a computer program product including an instruction is provided. When the computer program product is run on a computer, the computer is enabled to perform the data transmission method in any one of the first aspect or the optional manners of the first aspect.

According to an eleventh aspect, a computer program product including an instruction is provided. When the computer program product is run on a computer, the computer is enabled to perform the data transmission method in any one of the second aspect or the optional manners of the second aspect.

According to a twelfth aspect, a chip is provided. The chip includes a programmable logic circuit and/or a program instruction. When the chip runs, the chip is configured to implement the data transmission method in any one of the first aspect or the optional manners of the first aspect.

According to a thirteenth aspect, a chip is provided. The chip includes a programmable logic circuit and/or a program instruction. When the chip runs, the chip is configured to implement the data transmission method in any one of the second aspect or the optional manners of the second aspect.

According to a fourteenth aspect, a processing apparatus is provided. The processing apparatus includes at least one circuit. The at least one circuit is configured to perform the data transmission method in any one of the first aspect or the optional manners of the first aspect.

According to a fifteenth aspect, a processing apparatus is provided. The processing apparatus includes at least one circuit. The at least one circuit is configured to perform the data transmission method in any one of the second aspect or the optional manners of the second aspect.

According to a sixteenth aspect, a processing apparatus is provided. The processing apparatus is configured to implement the data transmission method in any one of the first aspect or the optional manners of the first aspect.

According to a seventeenth aspect, a processing apparatus is provided. The processing apparatus is configured to implement the data transmission method in any one of the second aspect or the optional manners of the second aspect.

According to an eighteenth aspect, a data transmission method is provided. The method includes:

determining a first parameter, a second parameter, a first gap threshold, and a second gap threshold;

determining a type of a terminal device, where the type of the terminal device is a first type or a second type; and for a terminal device of the first type, determining, based on the first parameter and the first gap threshold, whether a gap exists in transmission on a downlink control channel, and sending downlink control information to the terminal device of the first type through the downlink control channel based on a result of determining whether a gap exists in the transmission on the downlink control channel; and for the terminal device of the first type, determining, based on the first parameter and the first gap threshold, whether a gap exists in transmission on a downlink data channel, and sending one transport block to the terminal device of the first type through the downlink data channel based on a result of determining whether a gap exists in the transmission on the downlink data channel, where the downlink control information is used to schedule the transport block; or for a terminal device of the second type, determining, based on the second parameter and the second gap threshold, whether a gap exists in transmission on a downlink control channel, and sending downlink control information to the terminal device of the second type through the downlink control channel based on a result of determining whether a gap exists in the transmission on the downlink control channel; and for the terminal device of the second type, determining, based on the second parameter and the second gap threshold, whether a gap exists in transmission on a downlink data channel, and sending a plurality of transport blocks to the terminal device of the second type through the downlink data channel based on a result of determining whether a gap exists in the transmission on the downlink data channel, where the downlink control information is used to schedule the plurality of transport blocks; and the first parameter is different from the second parameter, and the first gap threshold is the same as the second gap threshold; or the first parameter is the same as the second parameter, and the first gap threshold is different from the second gap threshold; or the first parameter is different from the second parameter, and the first gap threshold is different from the second gap threshold.

Optionally, the first parameter, the second parameter, the first gap threshold, and the second gap threshold enable, for a same terminal device, a quantity of gaps included in a same time period used for sending the downlink data channel to be not less than a quantity of gaps included in the same time period used for sending the downlink control channel.

According to a nineteenth aspect, a data transmission method is provided. The method includes:

obtaining a first parameter, a second parameter, a first gap threshold, and a second gap threshold;

determining a type of a terminal device, where the type of the terminal device is a first type or a second type; and when the terminal device is a terminal device of the first type, determining, based on the first parameter and the first gap threshold, whether a gap exists in transmission on a downlink control channel, and receiving downlink control information from a network device through the downlink control channel based on a result of determining whether a gap exists in the transmission on the downlink control channel; and when the terminal device is a terminal device of the first type, determining, based on the first parameter and the first gap threshold, whether a gap exists in transmission on a downlink data channel, and receiving one transport block from the network device through the downlink data channel based on a result of determining whether a gap exists in the transmission on the downlink data channel, where the downlink control information is used to schedule the transport block; or when the terminal device is a terminal device of the second type, determining, based on the second parameter and the second gap threshold, whether a gap exists in transmission on a downlink control channel, and receiving downlink control information from a network device through the downlink control channel based on a result of determining whether a gap exists in the transmission on the downlink control channel; and when the terminal device is a terminal device of the second type, determining, based on the second parameter and the second gap threshold, whether a gap exists in transmission on a downlink data channel, and receiving a plurality of transport blocks from the network device through the downlink data channel based on a result of determining whether a gap exists in the transmission on the downlink data channel, where the downlink control information is used to schedule the plurality of transport blocks; and the first parameter is different from the second parameter, and the first gap threshold is the same as the second gap threshold; or the first parameter is the same as the second parameter, and the first gap threshold is different from the second gap threshold; or the first parameter is different from the second parameter, and the first gap threshold is different from the second gap threshold.

Optionally, the first parameter, the second parameter, the first gap threshold, and the second gap threshold enable, for a same terminal device, a quantity of gaps included in a same time period used for receiving the downlink data channel to be not less than a quantity of gaps included in the same time period used for receiving the downlink control channel.

Optionally, in the eighteenth aspect and the nineteenth aspect, the first parameter is the same as the second parameter, and the first parameter is a maximum quantity of repetitions of a physical downlink control channel search space.

When the terminal device is a terminal device of the first type, the determining, based on the first parameter and the first gap threshold, of whether a gap exists in transmission on a downlink control channel includes:

when the maximum quantity of repetitions of the physical downlink control channel search space is greater than or equal to the first gap threshold, determining that a gap exists in the transmission on the downlink control channel; or when the maximum quantity of repetitions of the physical downlink control channel search space is less than the first gap threshold, determining that no gap exists in the transmission on the downlink control channel.

When the terminal device is a terminal device of the first type, the determining, based on the first parameter and the first gap threshold, of whether a gap exists in transmission on a downlink data channel includes:

when the maximum quantity of repetitions of the physical downlink control channel search space is greater than or equal to the first gap threshold, determining that a gap exists in the transmission on the downlink data channel; or when the maximum quantity of repetitions of the physical downlink control channel search space is less than the first gap threshold, determining that no gap exists in the transmission on the downlink data channel.

When the terminal device is a terminal device of the second type, the determining, based on the second parameter and the second gap threshold, of whether a gap exists in transmission on a downlink control channel includes:

when the maximum quantity of repetitions of the physical downlink control channel search space is greater than or equal to the second gap threshold, determining that a gap exists in the transmission on the downlink control channel; or when the maximum quantity of repetitions of the physical downlink control channel search space is less than the second gap threshold, determining that no gap exists in the transmission on the downlink control channel.

When the terminal device is a terminal device of the second type, the determining, based on the second parameter and the second gap threshold, of whether a gap exists in transmission on a downlink data channel includes:

when the maximum quantity of repetitions of the physical downlink control channel search space is greater than or equal to the second gap threshold, determining that a gap exists in the transmission on the downlink data channel; or when the maximum quantity of repetitions of the physical downlink control channel search space is less than the second gap threshold, determining that no gap exists in the transmission on the downlink data channel.

The first gap threshold and the second gap threshold are configured by a system, and the first gap threshold is different from the second gap threshold; or the first gap threshold is configured by a system, and the second gap threshold is determined based on the first gap threshold and a maximum quantity of transport blocks that can be scheduled by the downlink control information.

Optionally, in the eighteenth aspect and the nineteenth aspect, the first parameter is different from the second parameter, the first parameter is a first quantity of repetitions, the first quantity of repetitions is a maximum quantity of repetitions of a physical downlink control channel search space used by the terminal device of the first type, the second parameter is a second quantity of repetitions, and the second quantity of repetitions is a maximum quantity of repetitions of a physical downlink control channel search space used by the terminal device of the second type.

When the terminal device is a terminal device of the first type, the determining, based on the first parameter and the first gap threshold, of whether a gap exists in transmission on a downlink control channel includes:

when the first quantity of repetitions is greater than or equal to the first gap threshold, determining that a gap exists in the transmission on the downlink control channel; or when the first quantity of repetitions is less than the first gap threshold, determining that no gap exists in the transmission on the downlink control channel.

When the terminal device is a terminal device of the first type, the determining, based on the first parameter and the first gap threshold, of whether a gap exists in transmission on a downlink data channel includes:

when the first quantity of repetitions is greater than or equal to the first gap threshold, determining that a gap exists in the transmission on the downlink data channel; or when the first quantity of repetitions is less than the first gap threshold, determining that no gap exists in the transmission on the downlink data channel.

When the terminal device is a terminal device of the second type, the determining, based on the second parameter and the second gap threshold, of whether a gap exists in transmission on a downlink control channel includes:

when the second quantity of repetitions is greater than or equal to the second gap threshold, determining that a gap exists in the transmission on the downlink control channel; or when the second quantity of repetitions is less than the second gap threshold, determining that no gap exists in the transmission on the downlink control channel.

When the terminal device is a terminal device of the second type, the determining, based on the second parameter and the second gap threshold, of whether a gap exists in transmission on a downlink data channel includes:

when the second quantity of repetitions is greater than or equal to the second gap threshold, determining that a gap exists in the transmission on the downlink data channel; or when the second quantity of repetitions is less than the second gap threshold, determining that no gap exists in the transmission on the downlink data channel.

The first gap threshold and the second gap threshold are configured by a system, and the first gap threshold is different from the second gap threshold; or the first gap threshold is configured by a system, and the second gap threshold is determined based on the first gap threshold and a maximum quantity of transport blocks that can be scheduled by the downlink control information.

According to a twentieth aspect, a network device is provided. The network device includes at least one module. The at least one module is configured to implement the data transmission method provided in any one of the eighteenth aspect or the optional manners of the eighteenth aspect.

According to a twenty-first aspect, a terminal device is provided. The terminal device includes at least one module. The at least one module is configured to implement the data transmission method provided in any one of the nineteenth aspect or the optional manners of the nineteenth aspect.

According to a twenty-second aspect, a network device is provided. The network device includes a processor, a memory, and a transceiver.

The transceiver is used for the network device to communicate with a terminal device.

The memory is configured to store an instruction.

The processor is configured to execute the instruction stored in the memory to implement the data transmission method provided in any one of the eighteenth aspect or the optional manners of the eighteenth aspect.

Optionally, the network device further includes a network interface. The processor, the transceiver, the memory, and the network interface are connected to each other through a bus. The processor includes one or more processing cores. The processor runs software programs and units to perform various functional applications and data processing. There may be a plurality of network interfaces. The network interfaces are used for the network device to communicate with other storage devices or terminal devices.

According to a twenty-third aspect, a terminal device is provided. The terminal device includes a processor, a memory, and a transceiver.

The transceiver is used for the terminal device to communicate with a network device.

The memory is configured to store an instruction.

The processor is configured to execute the instruction stored in the memory to implement the data transmission method provided in any one of the nineteenth aspect or the optional manners of the nineteenth aspect.

Optionally, the terminal device further includes a network interface. The processor, the transceiver, the memory, and the network interface are connected to each other through a bus. The processor includes one or more processing cores. The processor runs software programs and units to perform various functional applications and data processing. There may be a plurality of network interfaces. The network interfaces are used for the terminal device to communicate with other storage devices or network devices.

According to a twenty-fourth aspect, a data transmission system is provided. The data transmission system includes the network device in the twentieth aspect and the terminal device in the twenty-first aspect. Alternatively, the data transmission system includes the network device in the twenty-second aspect and the terminal device in the twenty-third aspect.

According to a twenty-fifth aspect, a computer-readable storage medium is provided. The computer-readable storage medium stores an instruction. When the instruction is run on a processing component of a computer, the processing component is enabled to perform the data transmission method in any one of the eighteenth aspect or the optional manners of the eighteenth aspect.

According to a twenty-sixth aspect, a computer-readable storage medium is provided. The computer-readable storage medium stores an instruction. When the instruction is run on a processing component of a computer, the processing component is enabled to perform the data transmission method in any one of the nineteenth aspect or the optional manners of the nineteenth aspect.

According to a twenty-seventh aspect, a computer program product including an instruction is provided. When the computer program product is run on a computer, the computer is enabled to perform the data transmission method in any one of the eighteenth aspect or the optional manners of the eighteenth aspect.

According to a twenty-eighth aspect, a computer program product including an instruction is provided. When the computer program product is run on a computer, the computer is enabled to perform the data transmission method in any one of the nineteenth aspect or the optional manners of the nineteenth aspect.

According to a twenty-ninth aspect, a chip is provided. The chip includes a programmable logic circuit and/or a program instruction. When the chip runs, the chip is configured to implement the data transmission method in any one of the eighteenth aspect or the optional manners of the eighteenth aspect.

According to a thirtieth aspect, a chip is provided. The chip includes a programmable logic circuit and/or a program instruction. When the chip runs, the chip is configured to implement the data transmission method in any one of the nineteenth aspect or the optional manners of the nineteenth aspect.

According to a thirty-first aspect, a processing apparatus is provided. The processing apparatus includes at least one circuit. The at least one circuit is configured to perform the data transmission method in any one of the eighteenth aspect or the optional manners of the eighteenth aspect.

According to a thirty-second aspect, a processing apparatus is provided. The processing apparatus includes at least one circuit. The at least one circuit is configured to perform the data transmission method in any one of the nineteenth aspect or the optional manners of the nineteenth aspect.

According to a thirty-third aspect, a processing apparatus is provided. The processing apparatus is configured to implement the data transmission method in any one of the eighteenth aspect or the optional manners of the eighteenth aspect.

According to a thirty-fourth aspect, a processing apparatus is provided. The processing apparatus is configured to implement the data transmission method in any one of the nineteenth aspect or the optional manners of the nineteenth aspect.

The solutions provided in the embodiments include the following benefits:

In the data transmission method, device, and system, and the storage medium that are provided in the embodiments, the network device determines, based on the first parameter and the first gap threshold, whether a gap exists in the transmission on the downlink control channel; sends the downlink control information to the terminal device through the downlink control channel based on the result of determining whether a gap exists in the transmission on the downlink control channel; determines, based on the second parameter and the second gap threshold, whether a gap exists in the transmission on the downlink data channel; and sends the one or more transport blocks to the terminal device through the downlink data channel based on the result of determining whether a gap exists in the transmission on the downlink data channel. The first parameter is different from the second parameter, and the first gap threshold is the same as the second gap threshold; or the first parameter is the same as the second parameter, and the first gap threshold is different from the second gap threshold; or the first parameter is different from the second parameter, and the first gap threshold is different from the second gap threshold. In the solutions provided in the embodiments, different determining manners may be used for determining whether a gap exists in the transmission on the downlink control channel and the transmission on the downlink data channel, so that a quantity of gaps included in a same time period used for sending the downlink data channel can be different from a quantity of gaps included in the same time period used for sending the downlink control channel. Thus, the quantity of gaps included in the same time period used for sending the downlink data channel can be greater than or equal to the quantity of gaps included in the same time period used for sending the downlink control channel. Therefore, compared with a current gap determining manner, in the gap determining manners provided in the embodiments, there can be more gaps in the transmission on the downlink data channel. Therefore, in a scenario in which one piece of DCI schedules a plurality of TBs, continuous downlink data transmission that lasts for a relatively long time for a terminal device can be better avoided, thereby better avoiding blocking a downlink channel.

BRIEF DESCRIPTION OF DRAWINGS

FIG. 6A and FIG. 6B are a method flowchart of a data transmission method according to an embodiment;

FIG. 7 is a schematic diagram of a logical structure of a network device according to an embodiment;

FIG. 10A to FIG. 10C are a method flowchart of another data transmission method according to an embodiment;

DETAILED DESCRIPTION OF THE EMBODIMENTS

Figure 1:
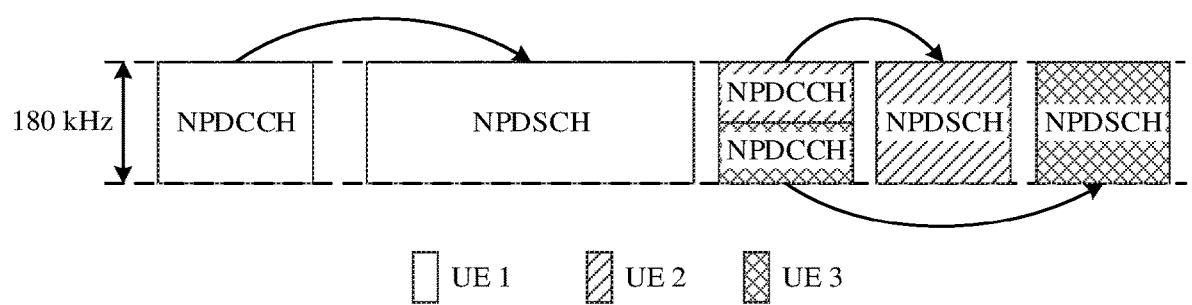
FIG. 1 is a schematic diagram of scheduling an NPDSCH by an NPDCCH according to an embodiment.

To make objectives, solutions and advantages of embodiments clearer, the following further describes implementations of the embodiments in detail with reference to the accompanying drawings.

Machine type communication (MTC) is also referred to as machine-to-machine (M2M) communication or Internet of Things (IoT) communication, and is to be an important application in the future communications field. In the future, the MTC may cover smart meter reading, medical detection and monitoring, logistics detection and monitoring, industrial detection and monitoring, internet of vehicles, smart communities, wearable device communication, and the like. The IoT industry built around the MTC is considered as the $4^{th}$ wave following computers, the Internet, and mobile communications networks in the information industry, and is a development direction of wireless networks in the future.

An MTC system based on a cellular network infrastructure is an important MTC system, and the MTC system is usually referred to as a cellular MTC system or a cellular IoT (CIoT) system. The 3rd generation partnership project (3GPP) standard organization has always paid attention to development of the cellular MTC system and actively standardized related technologies. The cellular MTC system includes a network device and a terminal device. The network device may be an MTC base station. The terminal device may be an MTC device. The MTC device is also referred to as an M2M device or an IoT device. Currently, requirements of the cellular MTC system for the network device and the terminal device include the following four aspects.

In a first aspect, the network device has a relatively large coverage area. An MTC service requires that the network device be able to support a relatively large coverage area. Thus, the network device needs to have a relatively strong coverage enhancement technology and be able to provide a communication service for a terminal device with a relatively large penetration loss (for example, a penetration loss is 20 decibels). For example, a smart household such as a smart water meter or a smart power meter, or a terminal device in a smart meter reading service is usually deployed indoors or at a basement. The cellular MTC system requires that the network device be able to provide robust communication services for terminal devices deployed indoors and at basements.

In a second aspect, the network device has a very large quantity of connections. Terminal devices such as smart households, smart communities, monitoring devices, vehicles, and wearable devices may be deployed on a large scale (more than tens of thousands or even hundreds of thousands) within a service range of the network device. While preventing network congestion, the network device needs to provide communication services for the terminal devices deployed on a large scale.

In a third aspect, the terminal device has relatively low cost or costs. Costs of the terminal device need to be lower than costs of an existing mobile terminal, to meet a condition in which terminal devices can be deployed on a large scale.

In a fourth aspect, the terminal device has relatively low power consumption. Because terminal devices are diversified and deployment environments of the terminal devices are diversified, batteries are usually used for power supply for the terminal devices. Replacing batteries for a large quantity of terminal devices causes very high labor costs and time costs. Therefore, functional components of the terminal devices are required to have very low power consumption, so that the terminal devices can have a longer standby time, to reduce a quantity of battery replacements.

The MTC system is also referred to as an M2M system or an IoT system. An NB-IoT system is a typical IoT system. In the narrowband IoT (NB-IoT) system, a network device has different coverage conditions for terminal devices in different deployment environments, and the network device schedules, by using different scheduling policies based on the coverage conditions, the terminal devices deployed in different environments. The coverage conditions are related to radio channel quality of the terminal devices and distances between the terminal devices and the network device. For example, radio channel quality of terminal devices at a cell center location is relatively good, the network device has relatively good coverage conditions for the terminal devices, and the network device can establish reliable communication links to the terminal devices by using a relatively low transmit power. Therefore, the network device may quickly transmit data with the terminal devices by using elements such as a large code block, higher-order modulation, and carrier binding. For another example, radio channel quality of terminal devices located at cell edges or basements is relatively poor, the network device has relatively poor coverage conditions for the terminal devices, and the network device can establish communication links to the terminal devices only by using a relatively high transmit power. Therefore, the network device needs to transmit data with the terminal devices by using elements such as a small code block, lower-order modulation, a plurality of times of repeat transmission, and spread spectrum.

To ensure communication reliability and reduce a transmit power, the NB-IoT system introduces a concept of a coverage level to distinguish between terminal devices with different coverage conditions. In the NB-IoT system, each terminal device corresponds to one coverage level, and terminal devices at a same coverage level have a same coverage condition or similar coverage conditions. The network device may schedule the terminal devices at the same coverage level by using a same scheduling parameter or similar scheduling parameters. For example, coverage levels introduced in the NB-IoT system include three coverage levels: "normal coverage", "extreme coverage", and "extended coverage". A coverage level of a terminal device that is relatively close to the network device may be "normal coverage". When the network device performs data transmission with the terminal device, a quantity of repetitions may be zero repetitions. A coverage level of a terminal device that is relatively far from the network device may be "extreme coverage". When the network device performs data transmission with the terminal device, a quantity of repetitions may be medium. A coverage level of a terminal device in a deployment environment such as a basement is "extended coverage". When the network device performs data transmission with the terminal device, a quantity of repetitions may be up to hundreds or even thousands of times. The quantity of repetitions is a quantity of times of repeat transmission. A terminal device may select an appropriate quantity of repetitions based on a coverage level corresponding to the terminal device to transmit data, to reduce unnecessary repeat transmission and reduce power consumption.

The NB-IoT system defines two types of downlink physical channels: a narrowband physical downlink control channel (NPDCCH) and a narrowband physical downlink shared channel NPDSCH. The NPDCCH is used to carry downlink control information (DCI), and the NPDSCH is used to carry downlink data. The downlink data is usually transmitted in a form of a transport block (TB). That the NPDSCH is used to carry downlink data also means that the NPDSCH is used to carry a TB. The NPDCCH is used to schedule the NPDSCH (that is, the DCI is used to schedule the TB). System bandwidth of the NB-IoT system is 180 kilohertz (kHz). Bandwidth occupied by NPDSCH transmission is 180 kHz, and bandwidth occupied by NPDCCH transmission is 90 kHz or 180 kHz. An NPDCCH and an NPDSCH that correspond to a same terminal device perform transmission in a time division multiplexing (TDM) mode. NPDSCHs corresponding to different terminal devices perform transmission in a TDM mode. NPDCCHs corresponding to different terminal devices perform transmission in a TDM or frequency division multiplexing (FDM) mode. FIG. 1 is a schematic diagram of scheduling an NPDSCH by an NPDCCH according to an embodiment. A meaning represented by an arrow is as follows: an NPDSCH to which the arrow points is scheduled by an NPDCCH at an end without an arrow. FIG. 1 is described by using an example in which a terminal device is user equipment (UE). Referring to FIG. 1, an NPDCCH corresponding to UE 1 and an NPDSCH corresponding to the UE 1 perform transmission in a TDM mode, an NPDCCH corresponding to UE 2 and an NPDSCH corresponding to the UE 2 perform transmission in a TDM mode, an NPDCCH corresponding to UE 3 and an NPDSCH corresponding to the UE 3 perform transmission in a TDM mode, the NPDCCH corresponding to the UE 1 and the NPDCCH corresponding to the UE 2 perform transmission in a TDM mode, the NPDCCH corresponding to the UE 1 and the NPDCCH corresponding to the UE 3 perform transmission in a TDM mode, the NPDCCH corresponding to the UE 2 and the NPDCCH corresponding to the UE 3 perform transmission in an FDM mode, the NPDSCH corresponding to the UE 1 and the NPDSCH corresponding to the UE 2 perform transmission in a TDM mode, the NPDSCH corresponding to the UE 1 and the NPDSCH corresponding to the UE 3 perform transmission in a TDM mode, and the NPDSCH corresponding to the UE 2 and the NPDSCH corresponding to the UE 3 perform transmission in a TDM mode.

Figure 2:
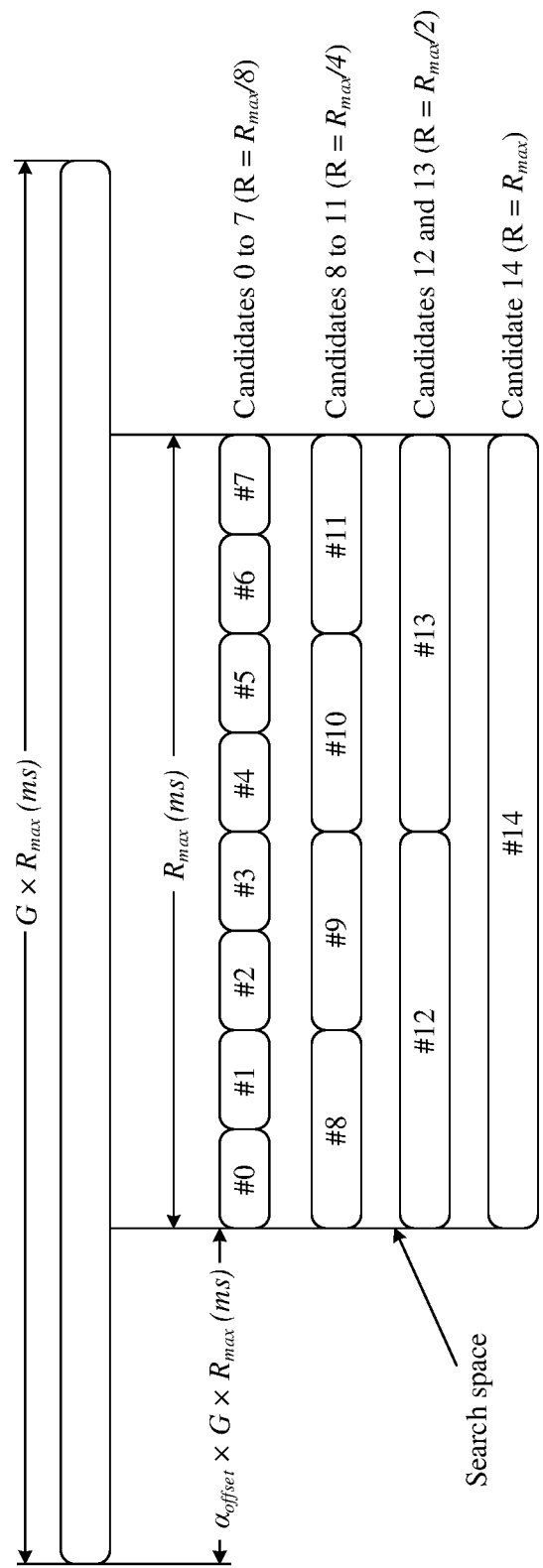
FIG. 2 is a schematic diagram of an NPDCCH candidate according to an embodiment.

The terminal device needs to monitor an NPDCCH candidate set to obtain DCI. The NPDCCH candidate set is referred to as an NPDCCH search space, and resources of the search space are periodically distributed. A network device may indicate, to the terminal device by using a system message or radio resource control (RRC) signaling, a search space period (that is, duration of the search space period in time domain) and a starting location of the search space in each period. The terminal device performs blind detection on an NPDCCH in the search space based on the indication of the network device. The system message or the RRC signaling carries parameters $R_{max}$, G, and $\alpha_{offset}$. $R_{max}$ indicates a maximum quantity of repetitions of the NPDCCH search space. After receiving the system message or the RRC signaling, the terminal device determines a product of $R_{max}$ and G as the search space period, determines $R_{max}$ as duration of the search space in each search space period, and determines a product of $R_{max}$, G, and $\alpha_{offset}$, as a gap between a starting location of the search space period and a starting location of the search space in time domain. $G \times R_{max} \times \alpha_{offset}$, means performing offsetting backwards in time domain by duration of $G \times R_{max} \times \alpha_{offset}$ from the starting location of the search space period. One search space period may include a plurality of NPDCCH candidates. FIG. 2 is a schematic diagram of an example of an NPDCCH candidate according to an embodiment. A search space period is $G \times R_{max}$. Duration of a search space in $G \times R_{max}$ is $R_{max}$ valid subframes. A gap between a starting location of the search space period and a starting location of the search space in time domain is $G \times R_{max} \times \alpha_{offset}$. One search space period includes 15 NPDCCH candidates. Duration of each of the $0^{th}$ to the $7^{th}$ candidates in time domain is equal to $R_{max}/8$ (that is, $R_{max}$ divided by 8) valid subframes. Duration of each of the $8^{th}$ to the $11^{th}$ candidates in time domain is equal to $R_{max}/4$ (that is, $R_{max}$ divided by 4) valid subframes. Duration of each of the $12^{th}$ and $13^{th}$ candidates in time domain is equal to $R_{max}/2$ (that is, $R_{max}$ divided by 2) valid subframes. Duration of the $14^{th}$ candidate in time domain is equal to $R_{max}$ valid subframes.

In the NB-IoT system, downlink transmission for a terminal device with a relatively poor coverage condition requires up to hundreds or even thousands of repetitions. As a result, the downlink transmission for the terminal device with the relatively poor coverage condition requires a relatively long time. Because NPDSCHs corresponding to different terminal devices can perform transmission only in a TDM mode, if the downlink transmission for the terminal device with the relatively poor coverage condition occupies a channel, downlink transmission for a terminal device with a relatively good coverage condition can be performed only after the downlink transmission for the terminal device with the relatively poor coverage condition ends. Therefore, the downlink transmission for the terminal device with the relatively poor coverage condition blocks the downlink transmission for the terminal device with the relatively good coverage condition. Therefore, the NB-IoT Rel-13 introduces a concept of a gap. During downlink transmission between a network device and a terminal device, for the downlink transmission for the terminal device, the network device determines whether a gap exists in a time period used for the downlink transmission for the terminal device. If a gap exists, the network device does not perform downlink transmission with the terminal device in the gap and continues performing downlink transmission with the terminal device after the gap. The terminal device determines whether a gap exists in the time period used for the downlink transmission. If a gap exists, the terminal device does not perform receiving for the downlink transmission in the gap and continues performing receiving for the downlink transmission after the gap.

The downlink transmission includes NPDCCH transmission and NPDSCH transmission. Currently, usually, a maximum quantity of repetitions $R_{max}$ of an NPDCCH search space is compared with a gap threshold $N_{gap, threshold}$ configured by the NB-IoT system to determine whether a gap exists in the NPDCCH transmission. If $R_{max}$ is greater than or equal to $N_{gap, threshold}$, a gap exists in the NPDCCH transmission. If $R_{max}$ is less than $N_{gap, threshold}$, no gap exists in the NPDCCH transmission. A manner of determining whether a gap exists in the NPDSCH transmission is the same as the manner of determining whether a gap exists in the NPDCCH transmission. Gaps are periodically distributed. The network device may configure gap configuration parameters. The gap configuration parameters include a gap threshold $N_{gap,\ threshold}$ of a gap, a gap period $N_{gap,\ period}$, and a gap duration factor $N_{gap,\ coeff}$. In the downlink transmission, the gap may also be referred to as a downlink (downlink, DL) gap. The network device may configure the gap threshold $N_{gap,\ threshold}$ by using a dl-GapThreshold parameter, configure the gap period $N_{gap,\ period}$ by using a dl-GapPeriodicity parameter, and configure the gap duration factor $N_{gap,\ coeff}$ by using a dl-GapDurationCoeff parameter. Value ranges of $N_{gap,\ threshold}$, $N_{gap,\ period}$, $N_{gap,\ coeff}$ are shown in Table 1 below.

TABLE 1

| Configuration parameter | Value range |
| --- | --- |
| $N_{gap,\ threshold}$ | {32, 64, 128, 256} |
| $N_{gap,\ period}$ | {64, 128, 256, 512} |
| $N_{gap,\ coeff}$ | {⅛, ¼, ⅜, ½} |

In each gap period, a starting radio frame and a starting subframe of a gap are determined based on the following formula:

$$\left(10n_f + \left\lfloor \frac{n_s}{2} \right\rfloor\right) \bmod N_{gap,period} = 0,$$

and duration of the gap is determined based on the following formula: $N_{gap,\ duration} = N_{gap,\ coeff} \times N_{gap,\ period}$, where $n_f$ is a radio frame number or a system frame number, $n_s$ is a slot number, mod indicates a modulo operation, and $\lfloor\ \rfloor$ indicates a rounding operation.

Figure 3:
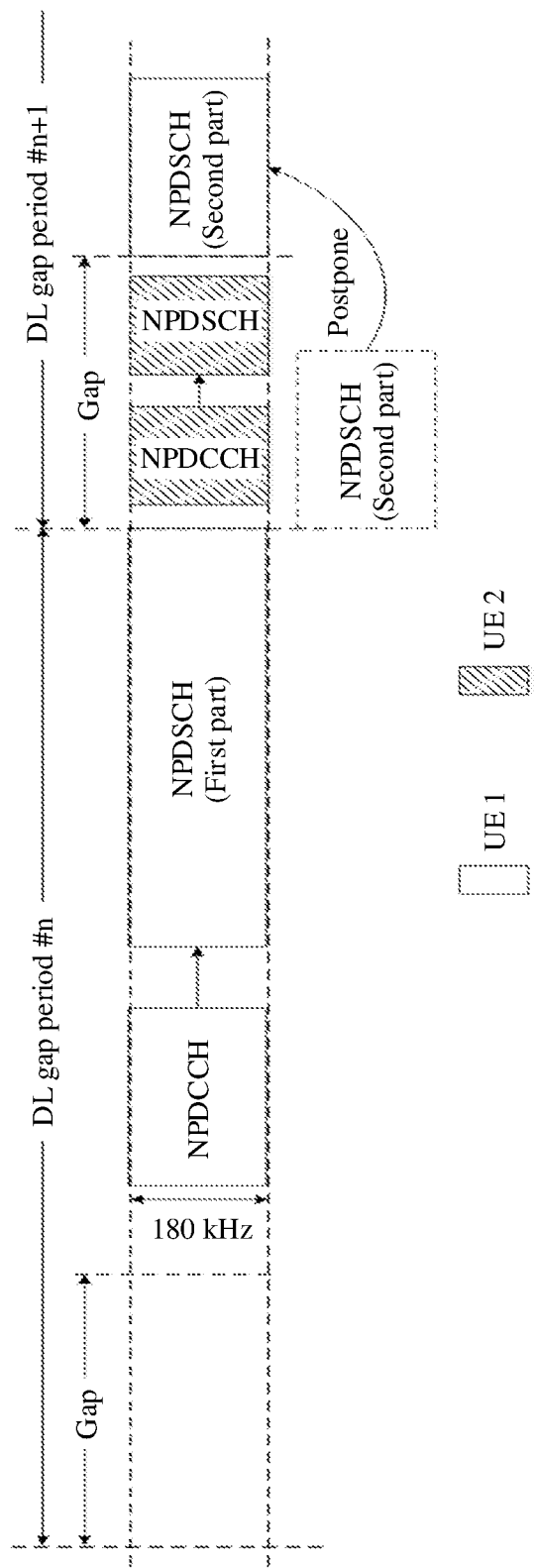
FIG. 3 is a schematic diagram of downlink channel transmission according to an embodiment.

FIG. 3 is a schematic diagram of downlink channel transmission according to an embodiment. It is assumed that a maximum quantity of repetitions $R_{max\ 1}$ of an NPDCCH search space corresponding to UE 1 is greater than or equal to a gap threshold $N_{gap,\ threshold}$, and a maximum quantity of repetitions $R_{max\ 2}$ of an NPDCCH search space of UE 2 is less than the gap threshold $N_{gap,\ threshold}$. In this case, a gap exists in NPDCCH transmission and NPDSCH transmission that correspond to the UE 1, and no gap exists in NPDCCH transmission or NPDSCH transmission that corresponds to the UE 2. An intuitive understanding may be as follows: the UE 1 is aware of the gap, but the gap is transparent to the UE 2 (that is, the UE 2 is unaware of the gap). It is assumed that a coverage condition of the UE 1 is relatively poor, and a coverage condition of the UE 2 is relatively good. In this case, the NPDCCH transmission and the NPDSCH transmission that correspond to the UE 1 require a relatively large quantity of repetitions, and the NPDCCH transmission and the NPDSCH transmission that correspond to the UE 2 require a relatively small quantity of repetitions or require no repetition. As shown in FIG. 3, the NPDSCH transmission corresponding to the UE 1 includes a first part and a second part. Because a resource for the second part overlaps a resource for the gap, transmission of the second part is postponed until an end of the gap. The NPDCCH transmission and the NPDSCH transmission that correspond to the UE 2 may be performed in the gap without waiting for completion of the transmission for the UE 1. Because the NPDCCH transmission and the NPDSCH transmission that correspond to the UE 2 may be performed in the gap without waiting for the completion of the transmission for the UE 1, introducing the gap can avoid blocking a downlink channel.

Figure 4:
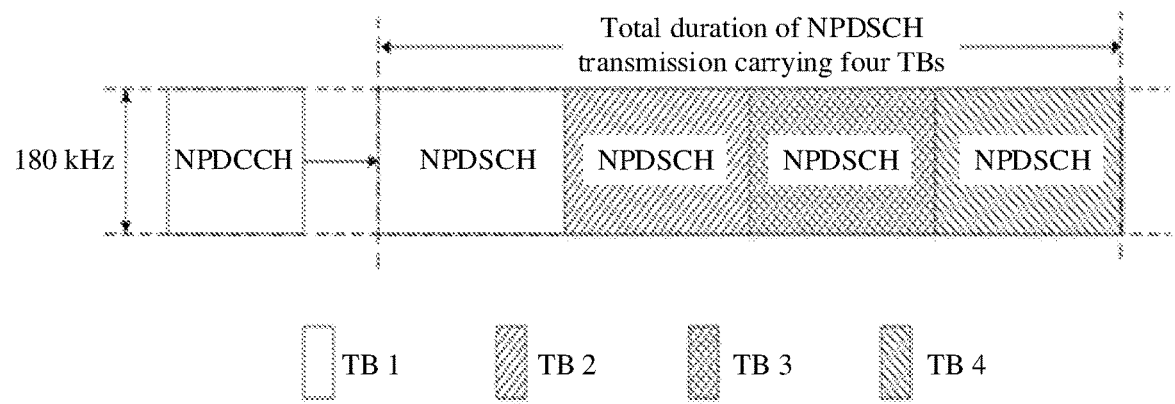
FIG. 4 is a schematic diagram of scheduling a plurality of TBs by one piece of DCI according to a related technology.

During actual application, based on a size of a service data volume and a limitation on a TB size in the NB-IoT system, downlink data may be split into a plurality of TBs for transmission. To improve scheduling efficiency and reduce DCI overheads, a subsequent evolved release of the NB-IoT Rel-13 evolves from supporting scheduling only one TB by one piece of DCI to supporting scheduling a plurality of TBs by one piece of DCI. In a scenario in which one piece of DCI schedules a plurality of TBs, assuming that a maximum quantity of repetitions $R_{max}$ of an NPDCCH search space corresponding to a terminal device is less than a gap threshold $N_{gap,\ threshold}$, in an existing gap determining manner, no gap exists in NPDCCH transmission or NPDSCH transmission that corresponds to the terminal device. In the scenario in which one piece of DCI schedules the plurality of TBs, duration of NPDSCH transmission carrying each TB is relatively short, but total duration of NPDSCH transmission carrying the plurality of TBs is relatively long. As a result, the NPDSCH transmission carrying the plurality of TBs occupies a downlink channel for a long time, and downlink transmission for other terminal devices is affected. For example, FIG. 4 is a schematic diagram of scheduling a plurality of TBs by one piece of DCI according to a related technology. Referring to FIG. 4, one piece of DCI schedules four TBs, and total duration of NPDSCH transmission carrying the four TBs is relatively long.

In the scenario in which one piece of DCI schedules the plurality of TBs, the NPDSCH transmission carrying the plurality of TBs occupies the downlink channel for a long time. For this problem, the embodiments provide a new gap determining manner, to prevent the NPDSCH transmission carrying the plurality of TBs from occupying the downlink channel for a long time in the scenario in which one piece of DCI schedules the plurality of TBs. Therefore, continuous downlink transmission that lasts for a relatively long time for a terminal device is avoided, thereby avoiding blocking the downlink channel, and improving system resource utilization. For detailed solutions in the embodiments, refer to the following embodiments.

Before the embodiments are described in detail, several phrases in the embodiments are provided first. In the embodiments, a physical downlink control channel may be an NPDCCH in an NB-IoT system, a physical downlink data channel may be an NPDSCH in the NB-IoT system, a maximum quantity of repetitions of a physical downlink control channel search space may be a maximum quantity of repetitions $R_{max}$ of an NPDCCH search space, downlink control information may be DCI, and configuring in a system may be agreeing upon or defining in a protocol, or may be configuring by a network device by using signaling such as a system message, RRC signaling, or a media access control entity (MAC CE). A first gap threshold may be the same as a gap threshold $N_{gap,\ threshold}$ in a related technology. Also, the first gap threshold may be alternatively different from the gap threshold $N_{gap,\ threshold}$ in the related technology. For a plurality of transport blocks scheduled by downlink control information, a specific quantity of the plurality of transport blocks may be indicated by using the downlink control information, or may be indicated by using a system message, or may be indicated by using RRC signaling. The specific quantity may be 1 or may be greater than 1. For example, for unicast, the specific quantity of the plurality of transport blocks may be indicated by using downlink control information; for a single cell multicast control channel (SC-MCCH), the specific quantity of the plurality of transport blocks may be indicated by using a system message; or for a single cell multicast transport channel (SC-MTCH), the specific quantity of the plurality of transport blocks may be indicated through an SC-MCCH.

The solutions provided in the embodiments may be used in a wireless communications network. The wireless communications network is also referred to as a wireless communications system. The wireless communications system may be a long term evolution (LTE) system, an advanced long term evolution (LTE advanced or LTE-A) system, or a communications system in which any entity may send and receive messages through a wireless network.

Figure 5:
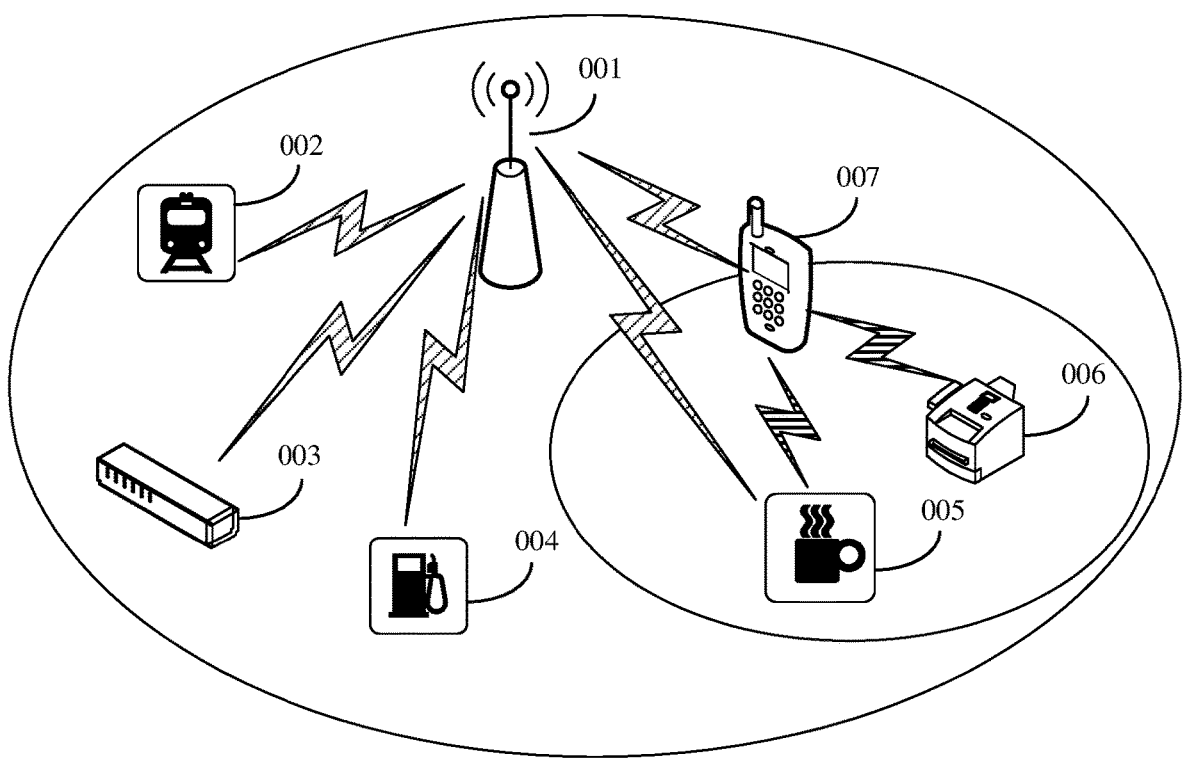
FIG. 5 is a schematic diagram of an implementation environment for each embodiment according to an embodiment.

FIG. 5 is a schematic diagram of an implementation environment for each embodiment according to an embodiment. The implementation environment provides a wireless communications system. The wireless communications system may be an IoT system, for example, an NB-IoT system. Referring to FIG. 5, the wireless communications system includes a network device 001 and a plurality of terminal devices. The plurality of terminal devices include terminal devices 002 to 007. The terminal devices 002 to 007 may be deployed in different environments. For example, the terminal device 002 and the terminal device 003 are deployed indoors, the terminal device 004 is deployed outdoors, and the terminal devices 005 to 007 are deployed at a basement.

The network device 001 is a network-side entity configured to send or receive a signal. The network device 001 usually serves as an access device to provide communication services for the terminal devices 002 to 007. The network device 001 has a specific service coverage area (which may also be referred to as a cellular or a cell, as shown in a large elliptical area in FIG. 5). A terminal device in the service coverage area of the network device 001 may communicate with the network device 001 by using a wireless signal, to receive a communication service provided by the network device 001. The network device 001 may be a base station. Depending on a used wireless communications technology, the base station may also be referred to as a NodeB, an evolved NodeB (eNodeB), an access point (AP), or the like. In addition, based on a size of the service coverage area, the base station may be further classified into a macro base station configured to provide a macro cell, a pico base station configured to provide a pico cell, a femto base station configured to provide a femto cell, and the like. With continuous evolution of wireless communications technologies, a future base station may also be referred to as another name.

Any one of the terminal devices 002 to 007 may be a communications device with a wireless communication function. The communications device with the wireless communication function may be an IoT device. The IoT device is also referred to as an MTC device or an M2M device. The IoT device may be a household appliance, a smart household, a vehicle, a tool device, a service device, a service facility, a wearable device, or the like. For example, the IoT device can be, but is not limited to, a smart refrigerator, a smart washing machine, a smart water meter, a smart power meter, a smart car, a vehicle-mounted device, or a wearable device.

As shown in FIG. 5, the terminal devices 002 to 007 are located in the service coverage area of the network device 001. The network device 001 may communicate with any one of the terminal devices 002 to 007. The terminal device 007 may communicate with the terminal devices 005 and 006. Various wireless communications technologies may be used for communication between the network device 001 and any terminal device, and between the terminal device 007 and the terminal devices 005 and 006. For example, the wireless communications technologies are, but are not limited to, a time division multiple access (TDMA) technology, a frequency division multiple access (FDMA) technology, a code division multiple access (CDMA) technology, a time division synchronous code division multiple access (TD-SCDMA) technology, an orthogonal frequency division multiple access (OFDMA) technology, a single carrier frequency division multiple access (SC-FDMA) technology, a space division multiple access (SDMA) technology, and evolved and derivative technologies of these technologies. The foregoing wireless communications technologies are incorporated in many wireless communications standards as radio access technologies (RAT), to construct various wireless communications systems (or networks) that are well-known nowadays. The wireless communications systems may include, but are not limited to, a global system for mobile communications (GSM), CDMA 2000, wideband CDMA (WCDMA), wireless fidelity (wireless-fidelity, Wi-Fi) defined in 802.22 series standards, worldwide interoperability for microwave access (WiMAX), LTE, LTE-A, a future 5th generation (5G) system, a new radio (NR) system, evolved systems of these wireless communications systems, and the like. Unless otherwise specified, the solutions provided in the embodiments may be used in the foregoing various wireless communications technologies and wireless communications systems. In addition, the terms "system" and "network" can be interchanged with each other.

It should be noted that the wireless communications network shown in FIG. 5 is merely used as an example and is not intended to limit the solutions in the embodiments. A person of ordinary skill in the art should understand that, during specific implementation, the wireless communications network may alternatively include other devices, and a quantity of network devices and a quantity of terminal devices may be alternatively configured according to a requirement.

FIG. 6 is a method flowchart of a data transmission method according to an embodiment. The data transmission method may be used in the implementation environment shown in FIG. 5. Referring to FIG. 6, the method includes the following steps.

Step 601: A network device determines a first parameter, a second parameter, a first gap threshold, and a second gap threshold.

In this embodiment, a relationship between the first parameter, the second parameter, the first gap threshold, and the second gap threshold includes the following three possible implementations.

In a first implementation, the first parameter is different from the second parameter, and the first gap threshold is the same as the second gap threshold.

In a second implementation, the first parameter is the same as the second parameter, and the first gap threshold is different from the second gap threshold.

In a third implementation, the first parameter is different from the second parameter, and the first gap threshold is different from the second gap threshold.

For the foregoing three possible implementations, that the network device determines the first parameter, the second parameter, the first gap threshold, and the second gap threshold in step 601 may include the following three possible implementations.

In a first implementation, the first parameter is the same as the second parameter, and the first gap threshold is different from the second gap threshold. The first parameter is a maximum quantity of repetitions of a physical downlink control channel search space, the first gap threshold and the second gap threshold are configured by a system, and the first gap threshold is different from the second gap threshold. Alternatively, the first gap threshold is configured by a system, and the second gap threshold is determined based on the first gap threshold and a quantity of transport blocks scheduled by downlink control information. Alternatively, the first gap threshold is configured by a system, and the second gap threshold is determined based on the first gap threshold and a maximum quantity of transport blocks that can be scheduled by downlink control information.

In the first implementation, that the network device determines the first parameter, the second parameter, the first gap threshold, and the second gap threshold may include the following three possible cases.

In a first case, the first parameter is the same as the second parameter, the first gap threshold is different from the second gap threshold, the first parameter is the maximum quantity of repetitions of the physical downlink control channel search space, and the first gap threshold and the second gap threshold are configured by the system.

The network device may determine the maximum quantity of repetitions $R_{max}$ of the physical downlink control channel search space and gap configuration parameters and determine the maximum quantity of repetitions $R_{max}$ of the physical downlink control channel search space as the first parameter and the second parameter. The gap configuration parameters may include the first gap threshold $N_{gap,\ threshold\ 1}$ and the second gap threshold $N_{gap,\ threshold\ 2}$ that are configured by the system. The first gap threshold $N_{gap,\ threshold\ 1}$ is different from the second gap threshold $N_{gap,\ threshold\ 2}$.

In a second case, the first parameter is the same as the second parameter, the first gap threshold is different from the second gap threshold, the first parameter is the maximum quantity of repetitions of the physical downlink control channel search space, the first gap threshold is configured by the system, and the second gap threshold is determined based on the first gap threshold and the quantity of transport blocks scheduled by the downlink control information.

The network device may determine the maximum quantity of repetitions $R_{max}$ of the physical downlink control channel search space, gap configuration parameters, and the quantity $N_{TB}$ of transport blocks scheduled by the downlink control information, and determine the maximum quantity of repetitions $R_{max}$ of the physical downlink control channel search space as the first parameter and the second parameter. The gap configuration parameters may include the first gap threshold $N_{gap,\ threshold\ 1}$ configured by the system. The network device determines the second gap threshold based on the first gap threshold $N_{gap,\ threshold\ 1}$ and the quantity $N_{TB}$ of transport blocks scheduled by the downlink control information.

Optionally, the network device determines a quotient of the first gap threshold $N_{gap,\ threshold\ 1}$ and the quantity $N_{TB}$ of transport blocks scheduled by the downlink control information as the second gap threshold, that is, the network device determines $N_{gap,\ threshold\ 1}/N_{TB}$ as the second gap threshold. Additionally, the network device may alternatively determine a sum, a difference, a product, or the like of the first gap threshold $N_{gap,\ threshold\ 1}$ and the quantity $N_{TB}$ of transport blocks scheduled by the downlink control information as the second gap threshold. This is not limited in this embodiment. It should be noted that, in the second case, because the first gap threshold is different from the second gap threshold, and the second gap threshold is $N_{gap,\ threshold\ 1}/N_{TB}$, the quantity $N_{TB}$ of transport blocks scheduled by the downlink control information is not equal to 1, in other words, the quantity $N_{TB}$ of transport blocks scheduled by the downlink control information is greater than 1.

In a third case, the first parameter is the same as the second parameter, the first gap threshold is different from the second gap threshold, the first parameter is the maximum quantity of repetitions of the physical downlink control channel search space, the first gap threshold is configured by the system, and the second gap threshold is determined based on the first gap threshold and the maximum quantity of transport blocks that can be scheduled by the downlink control information.

The network device may determine the maximum quantity of repetitions $R_{max}$ of the physical downlink control channel search space, gap configuration parameters, and the maximum quantity $N_{TB,\ max}$ of transport blocks that can be scheduled by the downlink control information, and determine the maximum quantity of repetitions $R_{max}$ of the physical downlink control channel search space as the first parameter and the second parameter. The gap configuration parameters may include the first gap threshold $N_{gap,\ threshold\ 1}$ configured by the system. The network device determines the second gap threshold based on the first gap threshold $N_{gap,\ threshold\ 1}$ and the maximum quantity $N_{TB,\ max}$ of transport blocks that can be scheduled by the downlink control information.

Optionally, the network device determines a quotient of the first gap threshold $N_{gap,\ threshold\ 1}$ and the maximum quantity $N_{TB,\ max}$ of transport blocks that can be scheduled by the downlink control information as the second gap threshold, that is, the network device determines $N_{gap,\ threshold\ 1}/N_{TB,\ max}$ as the second gap threshold. Further, the network device may alternatively determine a sum, a difference, a product, or the like of the first gap threshold $N_{gap,\ threshold\ 1}$ and the maximum quantity $N_{TB,\ max}$ of transport blocks that can be scheduled by the downlink control information as the second gap threshold. This is not limited in this embodiment. It should be noted that, in the third case, because the first gap threshold is different from the second gap threshold, and the second gap threshold is $N_{gap,\ threshold\ 1}/N_{TB,\ max}$, the maximum quantity $N_{TB,\ max}$ of transport blocks that can be scheduled by the downlink control information is not equal to 1, in other words, the maximum quantity $N_{TB,\ max}$ of transport blocks that can be scheduled by the downlink control information is greater than 1.

In a second implementation, the first parameter is different from the second parameter, and the first gap threshold is the same as the second gap threshold. The first parameter is a maximum quantity of repetitions of a physical downlink control channel search space, the second parameter is a first quantity of valid subframes, and the first gap threshold and the second gap threshold are configured by a system. Alternatively, the first gap threshold is configured by a system, the second gap threshold is determined based on the first gap threshold and a preset constant, and the preset constant is an integer greater than or equal to 1 and less than or equal to 10. Alternatively, the first gap threshold is configured by a system, the second gap threshold is determined based on the first gap threshold and a third gap threshold, and the third gap threshold is configured by the system. The first quantity of valid subframes is a quantity of valid subframes occupied by a physical downlink shared channel that carries the 1$^{st}$ transport block in a plurality of transport blocks scheduled by downlink control information. Alternatively, the first quantity of valid subframes is a quantity of valid subframes occupied by a physical downlink shared channel that carries any one of a plurality of transport blocks scheduled by downlink control information. Alternatively, the first quantity of valid subframes is a quantity of valid subframes occupied by a physical downlink shared channel that carries a plurality of transport blocks scheduled by downlink control information.

In the second implementation, that the network device determines the first parameter, the second parameter, the first gap threshold, and the second gap threshold may include the following three possible cases.

In a first case, the first parameter is different from the second parameter, the first gap threshold is the same as the second gap threshold, the first parameter is the maximum quantity of repetitions of the physical downlink control channel search space, the second parameter is the first quantity of valid subframes, and the first gap threshold and the second gap threshold are configured by the system.

The network device may determine the maximum quantity of repetitions $R_{max}$ of the physical downlink control channel search space, gap configuration parameters, and the first quantity of valid subframes, determine the maximum quantity of repetitions $R_{max}$ of the physical downlink control channel search space as the first parameter, and determine the first quantity of valid subframes as the second parameter. The gap configuration parameters may include the first gap threshold $N_{gap, threshold\ 1}$ and the second gap threshold $N_{gap, threshold\ 2}$ that are configured by the system. The first gap threshold $N_{gap, threshold\ 1}$ is the same as the second gap threshold $N_{gap, threshold\ 2}$.

In a second case, the first parameter is different from the second parameter, the first gap threshold is the same as the second gap threshold, the first parameter is the maximum quantity of repetitions of the physical downlink control channel search space, the second parameter is the first quantity of valid subframes, the first gap threshold is configured by the system, the second gap threshold is determined based on the first gap threshold and the preset constant, and the preset constant is an integer greater than or equal to 1 and less than or equal to 10.

The network device may determine the maximum quantity of repetitions $R_{max}$ of the physical downlink control channel search space, gap configuration parameters, the first quantity of valid subframes, and the preset constant $\tilde{N}_{SF}$, determine the maximum quantity of repetitions $R_{max}$ of the physical downlink control channel search space as the first parameter, and determine the first quantity of valid subframes as the second parameter. The gap configuration parameters may include the first gap threshold $N_{gap, threshold\ 1}$ configured by the system. The network device determines the second gap threshold based on the first gap threshold $N_{gap, threshold\ 1}$ and the preset constant $\tilde{N}_{SF}$. The preset constant $\tilde{N}_{SF}$ is an integer greater than or equal to 1 and less than or equal to 10. For example, a value of the preset constant $\tilde{N}_{SF}$ may be 6, 8, or 10.

Optionally, the network device determines a product of the first gap threshold $N_{gap, threshold\ 1}$ and the preset constant $\tilde{N}_{SF}$ as the second gap threshold, that is, the network device determines $N_{gap, threshold\ 1} \times \tilde{N}_{SF}$ as the second gap threshold. Further, the network device may alternatively determine a sum, a difference, a quotient, or the like of the first gap threshold $N_{gap, threshold\ 1}$ and the preset constant $\tilde{N}_{SF}$ as the second gap threshold. This is not limited in this embodiment. It should be noted that, when the network device determines the product of the first gap threshold $N_{gap, threshold\ 1}$ and the preset constant $\tilde{N}_{SF}$ as the second gap threshold, because the first gap threshold $N_{gap, threshold\ 1}$ is the same as the second gap threshold, the preset constant $\tilde{N}_{SF}$ is equal to 1.

In a third case, the first parameter is different from the second parameter, the first gap threshold is the same as the second gap threshold, the first parameter is the maximum quantity of repetitions of the physical downlink control channel search space, the second parameter is the first quantity of valid subframes, the first gap threshold is configured by the system, the second gap threshold is determined based on the first gap threshold and the third gap threshold, and the third gap threshold is configured by the system.

The network device may determine the maximum quantity of repetitions $R_{max}$ of the physical downlink control channel search space, gap configuration parameters, and the first quantity of valid subframes, determine the maximum quantity of repetitions $R_{max}$ of the physical downlink control channel search space as the first parameter, and determine the first quantity of valid subframes as the second parameter. The gap configuration parameters may include the first gap threshold $N_{gap, threshold\ 1}$ and the third gap threshold $N_{gap, threshold\ 3}$ that are configured by the system. The network device determines the second gap threshold based on the first gap threshold $N_{gap, threshold\ 1}$ and the third gap threshold $N_{gap, threshold\ 3}$.

Optionally, the network device determines a product of the first gap threshold $N_{gap, threshold\ 1}$ and the third gap threshold $N_{gap, threshold\ 3}$ as the second gap threshold, that is, the network device determines $N_{gap, threshold\ 1} \times N_{gap, threshold\ 3}$ as the second gap threshold. Further, the network device may alternatively determine a sum, a difference, a quotient, or the like of the first gap threshold $N_{gap, threshold\ 1}$ and the third gap threshold $N_{gap, threshold\ 3}$ as the second gap threshold. This is not limited in this embodiment.

In this embodiment, a value range of the first gap threshold $N_{gap, threshold\ 1}$ may be $\{1, 2, 3, 4, 5, 6, 8, 10\}$, and a value range of the third gap threshold $N_{gap, threshold\ 3}$ may be a subset of the value range of the first gap threshold $N_{gap, threshold\ 1}$. For example, the value range of the third gap threshold $N_{gap, threshold\ 3}$ is $\{1, 2, 3, 4\}$, $\{2, 3, 4, 5\}$, $\{3, 4, 5, 6\}$, $\{4, 5, 6, 8\}$, $\{5, 6, 8, 10\}$, $\{1, 2\}$, $\{2, 3\}$, $\{3, 4\}$, $\{4, 5\}$, $\{5, 6\}$, $\{6, 8\}$, or $\{8, 10\}$. This is not limited in this embodiment. When the network device determines the product of the first gap threshold $N_{gap, threshold\ 1}$ and the third gap threshold $N_{gap, threshold\ 3}$ as the second gap threshold, because the first gap threshold $N_{gap, threshold\ 1}$ is the same as the second gap threshold, the third gap threshold $N_{gap, threshold\ 3}$ is equal to 1.

It should be noted that, in this embodiment, the network device maps a transport block to a subframe for transmission, and the transport block is carried on a physical downlink data channel. The physical downlink data channel may be a physical downlink shared channel. In the second implementation, the first quantity of valid subframes may include the following three cases.

Case (1): The first quantity of valid subframes is a quantity $N_{first, sf, NPDSCH}$ of valid subframes occupied by a physical downlink shared channel that carries the 1st transport block in a plurality of transport blocks scheduled by downlink control information, where $$N_{first, NPDSCH} = M_{rep, first}^{NPDSCH} \times N_{sf, first}, \text{ where}$$

$M_{rep, first}^{NPDSCH}$ indicates a quantity of repetitions of the $1^{st}$ transport block in the plurality of transport blocks scheduled by the downlink control information, and $N_{sf, first}$ indicates a quantity of subframes to which the $1^{st}$ transport block in the plurality of transport blocks scheduled by the downlink control information is mapped.

Case (2): The first quantity of valid subframes is a quantity $N_{any, sf, NPDSCH}$ of valid subframes occupied by a physical downlink shared channel that carries any one of a plurality of transport blocks scheduled by downlink control information, where $$N_{any,sf,NPDSCH} = M_{rep}^{NPDSCH} \times N_{sf}, \text{ where}$$

when quantities of repetitions of any two of the plurality of transport blocks scheduled by the downlink control information are the same, $M_{rep}^{NPDSCH}$ a indicates a quantity of repetitions of any one of the plurality of transport blocks scheduled by the downlink control information, and $N_{sf}$ indicates a quantity of subframes to which any one of the plurality of transport blocks scheduled by the downlink control information is mapped; or when quantities of repetitions of the plurality of transport blocks scheduled by the downlink control information are different, $M_{rep}^{NPDSCH}$ indicates a maximum value, a minimum value, or an average value of the quantities of repetitions of the plurality of transport blocks scheduled by the downlink control information, and $N_{sf}$ indicates a maximum value, a minimum value, or an average value of quantities of subframes to which the plurality of transport blocks scheduled by the downlink control information are mapped.

Case (3): The first quantity of valid subframes is a quantity $N_{total, sf, NPDSCH}$ of valid subframes occupied by a physical downlink shared channel that carries a plurality of transport blocks scheduled by downlink control information, where $$N_{total,sf,NPDSCH} = \sum_{i=0}^{N_{TB}-1} M_{rep,i}^{NPDSCH} \times N_{sf,i};$$

or $$N_{total,sf,NPDSCH} = \sum_{i=0}^{N_{TB,max}-1} M_{rep,i}^{NPDSCH} \times N_{sf,i};$$

or $$N_{total,sf,NPDSCH} = N_{TB} \times M_{rep,i}^{NPDSCH} \times N_{sf,i};$$

or $$N_{total,sf,NPDSCH} = N_{TB,max} \times M_{rep}^{NPDSCH} \times N_{sf},$$

where $N_{TB}$ indicates a quantity of the plurality of transport blocks scheduled by the downlink control information; $M_{rep,i}^{NPDSCH}$ indicates a quantity of repetitions of the $i^{th}$ transport block in the plurality of transport blocks scheduled by the downlink control information; $N_{sf,i}$ indicates a quantity of subframes to which the $i^{th}$ transport block in the plurality of transport blocks scheduled by the downlink control information is mapped; $N_{TB,max}$ indicates a maximum quantity of the plurality of transport blocks scheduled by the downlink control information; and when quantities of repetitions of any two of the plurality of transport blocks scheduled by the downlink control information are the same, $M_{rep}^{NPDSCH}$ indicates a quantity of repetitions of any one of the plurality of transport blocks scheduled by the downlink control information, and $N_{sf}$ indicates a quantity of subframes to which any one of the plurality of transport blocks scheduled by the downlink control information is mapped; or when quantities of repetitions of any two of the plurality of transport blocks scheduled by the downlink control information are different, $M_{rep}^{NPDSCH}$ indicates a maximum value, a minimum value, or an average value of the quantities of repetitions of the plurality of transport blocks scheduled by the downlink control information, and $N_{sf}$ indicates a maximum value, a minimum value, or an average value of quantities of subframes to which the plurality of transport blocks scheduled by the downlink control information are mapped.

In a third implementation, the first parameter is different from the second parameter, and the first gap threshold is different from the second gap threshold.

The first parameter is a maximum quantity of repetitions of a physical downlink control channel search space, the second parameter is a first quantity of valid subframes, and the first gap threshold and the second gap threshold are configured by a system. Alternatively, the first gap threshold is configured by a system, the second gap threshold is determined based on the first gap threshold and a preset constant, and the preset constant is an integer greater than or equal to 1 and less than or equal to 10. Alternatively, the first gap threshold is configured by a system, the second gap threshold is determined based on the first gap threshold and a third gap threshold, and the third gap threshold is configured by the system. The first quantity of valid subframes is a quantity of valid subframes occupied by a physical downlink shared channel that carries the $1^{st}$ transport block in a plurality of transport blocks scheduled by downlink control information. Alternatively, the first quantity of valid subframes is a quantity of valid subframes occupied by a physical downlink shared channel that carries any one of a plurality of transport blocks scheduled by downlink control information. Alternatively, the first quantity of valid subframes is a quantity of valid subframes occupied by a physical downlink shared channel that carries a plurality of transport blocks scheduled by downlink control information.

In the third implementation, that the network device determines the first parameter, the second parameter, the first gap threshold, and the second gap threshold may include the following three possible cases.

In a first case, the first parameter is different from the second parameter, the first gap threshold is different from the second gap threshold, the first parameter is the maximum quantity of repetitions of the physical downlink control channel search space, the second parameter is the first quantity of valid subframes, and the first gap threshold and the second gap threshold are configured by the system.

The network device may determine the maximum quantity of repetitions $R_{max}$ of the physical downlink control channel search space, gap configuration parameters, and the first quantity of valid subframes, determine the maximum quantity of repetitions $R_{max}$ of the physical downlink control channel search space as the first parameter, and determine the first quantity of valid subframes as the second parameter. The gap configuration parameters may include the first gap threshold $N_{gap,\ threshold\ 1}$ and the second gap threshold $N_{gap,\ threshold\ 2}$ that are configured by the system. The first gap threshold $N_{gap,\ threshold\ 1}$ is different from the second gap threshold $N_{gap,\ threshold\ 2}$.

In a second case, the first parameter is different from the second parameter, the first gap threshold is different from the second gap threshold, the first parameter is the maximum quantity of repetitions of the physical downlink control channel search space, the second parameter is the first quantity of valid subframes, the first gap threshold is configured by the system, the second gap threshold is determined based on the first gap threshold and the preset constant, and the preset constant is an integer greater than or equal to 1 and less than or equal to 10.

The network device may determine the maximum quantity of repetitions $R_{max}$ of the physical downlink control channel search space, gap configuration parameters, the first quantity of valid subframes, and the preset constant $\tilde{N}_{SF}$, determine the maximum quantity of repetitions $R_{max}$ of the physical downlink control channel search space as the first parameter, and determine the first quantity of valid subframes as the second parameter. The gap configuration parameters may include the first gap threshold $N_{gap, threshold\ 1}$ configured by the system. The network device determines the second gap threshold based on the first gap threshold $N_{gap, threshold\ 1}$ and the preset constant $\tilde{N}_{SF}$. The preset constant $\tilde{N}_{SF}$ is an integer greater than or equal to 1 and less than or equal to 10. For example, a value of the preset constant $\tilde{N}_{SF}$ may be 6, 8, or 10.

Optionally, the network device determines a product of the first gap threshold $N_{gap, threshold\ 1}$ and the preset constant $\tilde{N}_{SF}$ as the second gap threshold, that is, the network device determines $N_{gap, threshold\ 1} \times \tilde{N}_{SF}$ as the second gap threshold. Also, the network device may alternatively determine a sum, a difference, a quotient, or the like of the first gap threshold $N_{gap, threshold\ 1}$ and the preset constant $\tilde{N}_{SF}$ as the second gap threshold. This is not limited in this embodiment. It should be noted that, when the network device determines the product of the first gap threshold $N_{gap, threshold\ 1}$ and the preset constant $\tilde{N}_{SF}$ as the second gap threshold, because the first gap threshold $N_{gap, threshold\ 1}$ is different from the second gap threshold, the preset constant $\tilde{N}_{SF}$ is not equal to 1.

In a third case, the first parameter is different from the second parameter, the first gap threshold is different from the second gap threshold, the first parameter is the maximum quantity of repetitions of the physical downlink control channel search space, the second parameter is the first quantity of valid subframes, the first gap threshold is configured by the system, the second gap threshold is determined based on the first gap threshold and the third gap threshold, and the third gap threshold is configured by the system.

The network device may determine the maximum quantity of repetitions $R_{max}$ of the physical downlink control channel search space, gap configuration parameters, and the first quantity of valid subframes, determine the maximum quantity of repetitions $R_{max}$ of the physical downlink control channel search space as the first parameter, and determine the first quantity of valid subframes as the second parameter. The gap configuration parameters may include the first gap threshold $N_{gap, threshold\ 1}$ and the third gap threshold $N_{gap, threshold\ 3}$ that are configured by the system. The network device determines the second gap threshold based on the first gap threshold $N_{gap, threshold\ 1}$ and the third gap threshold $N_{gap, threshold\ 3}$.

Optionally, the network device determines a product of the first gap threshold $N_{gap, threshold\ 1}$ and the third gap threshold $N_{gap, threshold\ 3}$ as the second gap threshold, that is, the network device determines $N_{gap, threshold\ 1} \times N_{gap, threshold\ 3}$ as the second gap threshold. Further, the network device may alternatively determine a sum, a difference, a quotient, or the like of the first gap threshold $N_{gap, threshold\ 1}$ and the third gap threshold $N_{gap, threshold\ 3}$ as the second gap threshold. This is not limited in this embodiment.

In this embodiment, a value range of the first gap threshold $N_{gap, threshold\ 1}$ may be $\{1, 2, 3, 4, 5, 6, 8, 10\}$, and a value range of the third gap threshold $N_{gap, threshold\ 3}$ may be a subset of the value range of the first gap threshold $N_{gap, threshold\ 1}$. For example, the value range of the third gap threshold $N_{gap, threshold\ 3}$ is $\{1, 2, 3, 4\}$, $\{2, 3, 4, 5\}$, $\{3, 4, 5, 6\}$, $\{4, 5, 6, 8\}$, $\{5, 6, 8, 10\}$, $\{1, 2\}$, $\{2, 3\}$, $\{3, 4\}$, $\{4, 5\}$, $\{5, 6\}$, $\{6, 8\}$, or $\{8, 10\}$. This is not limited in this embodiment. When the network device determines the product of the first gap threshold $N_{gap, threshold\ 1}$ and the third gap threshold $N_{gap, threshold\ 3}$ as the second gap threshold, because the first gap threshold $N_{gap, threshold\ 1}$ is different from the second gap threshold, the third gap threshold $N_{gap, threshold\ 3}$ is not equal to 1.

It should be noted that, in the third implementation, the first quantity of valid subframes is a quantity $N_{first, sf, NPDSCH}$ of valid subframes occupied by a physical downlink shared channel that carries the $1^{st}$ transport block in a plurality of transport blocks scheduled by downlink control information. Alternatively, the first quantity of valid subframes is a quantity $N_{ary, sf, NPDSCH}$ of valid subframes occupied by a physical downlink shared channel that carries any one of a plurality of transport blocks scheduled by downlink control information. Alternatively, the first quantity of valid subframes is a quantity $N_{total, sf, NPDSCH}$ of valid subframes occupied by a physical downlink shared channel that carries a plurality of transport blocks scheduled by downlink control information. For a process of determining the first quantity of valid subframes, refer to the second implementation. Details are not described herein again in this embodiment.

It should be further noted that the gap configuration parameters may further include a gap period $N_{gap, period}$ and a gap duration factor $N_{gap, coff}$. After the network device determines the gap configuration parameters, if the gap threshold (the first gap threshold, the second gap threshold, or the third gap threshold) is configured by the network device, the network device may send the gap configuration parameters to the terminal device by using a system message or RRC signaling; or if the gap threshold (the first gap threshold, the second gap threshold, or the third gap threshold) is agreed upon or is defined in a protocol, the network device may send the gap period $N_{gap, period}$ and the gap duration factor $N_{gap, coff}$ to the terminal device by using a system message or RRC signaling. In addition, the network device may further send, to the terminal device by using downlink control information, RRC signaling, a system message, or MAC CE signaling, the maximum quantity $N_{TB, max}$ of transport blocks that can be scheduled by the downlink control information.

Step 602: The network device determines, based on the first parameter and the first gap threshold, whether a gap exists in transmission on a downlink control channel.

It can be understood from the descriptions of step 601 that, in any implementation, the first parameter is the maximum quantity of repetitions $R_{max}$ of the physical downlink control channel search space, and the first gap threshold is $N_{gap, threshold\ 1}$. The network device may compare the maximum quantity of repetitions $R_{max}$ of the physical downlink control channel search space with the first gap threshold $N_{gap, threshold\ 1}$, to determine whether a gap exists in the transmission on the downlink control channel. When the maximum quantity of repetitions $R_{max}$ of the physical downlink control channel search space is greater than or equal to the first gap threshold $N_{gap, threshold\ 1}$, the network device determines that a gap exists in the transmission on the downlink control channel. When the maximum quantity of repetitions $R_{max}$ of the physical downlink control channel search space is less than the first gap threshold $N_{gap,\ threshold\ 1}$, the network device determines that no gap exists in the transmission on the downlink control channel.

For example, the downlink control channel is an NPDCCH. In this case, a relationship between $R_{max}$, $N_{gap,\ threshold\ 1}$, and whether a gap exists in transmission on the NPDCCH may be shown in Table 2 below.

TABLE 2

| Relationship between $R_{max}$ and $N_{gap,\ threshold\ 1}$ | Whether a gap exists in the transmission on the NPDCCH |
|---|---|
| $R_{max} \geq N_{gap,\ threshold\ 1}$ | A gap exists. |
| $R_{max} < N_{gap,\ threshold\ 1}$ | No gap exists. |

Step 603: The network device sends downlink control information to the terminal device through the downlink control channel based on a result of determining whether a gap exists in the transmission on the downlink control channel, where the downlink control information is used to schedule one or more transport blocks.

Based on the result of determining whether a gap exists in the transmission on the downlink control channel, the network device may include the downlink control information in the downlink control channel, and then send the downlink control information to the terminal device through the downlink control channel. The downlink control information is used to schedule the one or more transport blocks. Optionally, if a gap exists in the transmission on the downlink control channel, the network device determines a starting radio frame and a starting subframe of the gap based on the following formula:

$$\left(10n_f + \left\lfloor \frac{n_s}{2} \right\rfloor\right) \mathrm{mod} N_{gap, period} = 0;$$

determines duration of the gap in each period based on the following formula: $N_{gap,\ duration} = N_{gap,\ coff} \times N_{gap,\ period}$; and then postpones the transmission on the downlink control channel until an end of the gap based on a radio frame (or a system frame) of the gap, a slot, and the duration of the gap in each period, where of is a radio frame number or a system frame number, $n_S$ is a slot number, mod indicates a modulo operation, and $\lfloor \ \rfloor$ indicates a rounding operation. If no gap exists in the transmission on the downlink control channel, the downlink control channel may perform transmission in consecutive valid subframes, and the network device may send the downlink control information to the terminal device by using the consecutive valid subframes.

Optionally, the downlink control information may indicate a quantity $N_{TB}$ of transport blocks scheduled by the downlink control information. In this embodiment, an independent field of the downlink control information may be used to indicate the quantity $N_{TB}$ of transport blocks scheduled by the downlink control information, or the downlink control information and other scheduling information may jointly indicate the quantity $N_{TB}$ of transport blocks scheduled by the downlink control information. This is not limited in this embodiment. In addition, the downlink control information may further indicate scheduling information for a downlink data channel that carries the $N_{TB}$ transport blocks scheduled by the downlink control information. For example, the downlink control information includes scheduling information for a downlink data channel that carries the $1^{st}$ transport block in the $N_{TB}$ transport blocks scheduled by the downlink control information, and scheduling information for a downlink data channel that carries subsequent $N_{TB-1}$ transport blocks is indicated by using a system message or RRC signaling. Alternatively, the downlink control information includes scheduling information for a downlink data channel that carries the $1^{st}$ transport block in the $N_{TB}$ transport blocks scheduled by the downlink control information, and the network device and the terminal device agree upon that scheduling information for a downlink data channel that carries subsequent $N_{TB-1}$ transport blocks is the same as the scheduling information for the downlink data channel that carries the $1^{st}$ transport block. Alternatively, the downlink control information includes scheduling information for a downlink data channel that carries $N_{TB}$ transport blocks, and the scheduling information includes a quantity of repetitions of the transport blocks, a quantity of subframes to which the transport blocks are mapped, and the like. This is not limited in this embodiment.

Step 604: The network device determines, based on the second parameter and the second gap threshold, whether a gap exists in transmission on a downlink data channel.

It can be understood from the descriptions of step 601 that the second parameter may be the maximum quantity of repetitions $R_{max}$ of the physical downlink control channel search space, or may be the first quantity of valid subframes. In this embodiment, when the second parameter is the maximum quantity of repetitions $R_{max}$ of the physical downlink control channel search space, that the network device determines, based on the second parameter and the second gap threshold, whether a gap exists in transmission on a downlink data channel may include: the network device compares the maximum quantity of repetitions $R_{max}$ of the physical downlink control channel search space with the second gap threshold, to determine whether a gap exists in the transmission on the downlink data channel. When the maximum quantity of repetitions $R_{max}$ of the physical downlink control channel search space is greater than or equal to the second gap threshold, the network device determines that a gap exists in the transmission on the downlink data channel. When the maximum quantity of repetitions $R_{max}$ of the physical downlink control channel search space is less than the second gap threshold, the network device determines that no gap exists in the transmission on the downlink data channel. When the second parameter is the first quantity of valid subframes, that the network device determines, based on the second parameter and the second gap threshold, whether a gap exists in transmission on a downlink data channel may include: the network device compares the first quantity of valid subframes with the second gap threshold, to determine whether a gap exists in the transmission on the downlink data channel. When the first quantity of valid subframes is greater than or equal to the second gap threshold, the network device determines that a gap exists in the transmission on the downlink data channel. When the first quantity of valid subframes is less than the second gap threshold, the network device determines that no gap exists in the transmission on the downlink data channel.

For the three possible implementations in step 601, step 604 may include the following three possible implementations.

In a first implementation, the second parameter is the maximum quantity of repetitions $R_{max}$ of the physical downlink control channel search space, and the second gap threshold is configured by the system, or the second gap threshold is determined based on the first gap threshold and the quantity of transport blocks scheduled by the downlink control information, or the second gap threshold is determined based on the first gap threshold and the maximum quantity of transport blocks that can be scheduled by the downlink control information.

Optionally, the second gap threshold is configured by the system, and the second gap threshold may be $N_{gap,\ threshold\ 2}$. When the maximum quantity of repetitions $R_{max}$ of the physical downlink control channel search space is greater than or equal to $N_{gap,\ threshold\ 2}$, the network device determines that a gap exists in the transmission on the downlink data channel. When the maximum quantity of repetitions $R_{max}$ of the physical downlink control channel search space is less than $N_{gap,\ threshold\ 2}$, the network device determines that no gap exists in the transmission on the downlink data channel.

Optionally, the second gap threshold is determined based on the first gap threshold and the quantity of transport blocks scheduled by the downlink control information, and the second gap threshold may be $N_{gap,\ threshold\ 1}/N_{TB}$. When the maximum quantity of repetitions $R_{max}$ of the physical downlink control channel search space is greater than or equal to $N_{gap,\ threshold\ 1}/N_{TB}$, the network device determines that a gap exists in the transmission on the downlink data channel. When the maximum quantity of repetitions $R_{max}$ of the physical downlink control channel search space is less than $N_{gap,\ threshold\ 1}/N_{TB}$, the network device determines that no gap exists in the transmission on the downlink data channel.

Optionally, the second gap threshold is determined based on the first gap threshold and the maximum quantity of transport blocks that can be scheduled by the downlink control information, and the second gap threshold may be $N_{gap,\ threshold\ 1}/N_{TB,\ max}$. When the maximum quantity of repetitions $R_{max}$ of the physical downlink control channel search space is greater than or equal to $N_{gap,\ threshold\ 1}/N_{TB,\ max}$, the network device determines that a gap exists in the transmission on the downlink data channel. When the maximum quantity of repetitions $R_{max}$ of the physical downlink control channel search space is less than $N_{gap,\ threshold\ 1}/N_{TB,\ max}$, the network device determines that no gap exists in the transmission on the downlink data channel.

For example, the downlink data channel is an NPDSCH. In this case, based on a difference of the second gap threshold, a relationship between $R_{max}$, the second gap threshold, and whether a gap exists in transmission on the NPDSCH may be shown in Table 3 below.

TABLE 3

| Relationship between $R_{max}$ and the second gap threshold ($N_{gap,\ threshold\ 2}$, $N_{gap,\ threshold\ 1}/N_{TB}$, or $N_{gap,\ threshold\ 1}/N_{TB,\ max}$) | Whether a gap exists in the transmission on the NPDSCH |
|---|---|
| $R_{max} \geq N_{gap,\ threshold\ 2}$ | A gap exists. |
| $R_{max} < N_{gap,\ threshold\ 2}$ | No gap exists. |
| $R_{max} \geq N_{gap,\ threshold\ 1}/N_{TB}$ | A gap exists. |
| $R_{max} < N_{gap,\ threshold\ 1}/N_{TB}$ | No gap exists. |
| $R_{max} \geq N_{gap,\ threshold\ 1}/N_{TB,\ max}$ | A gap exists. |
| $R_{max} < N_{gap,\ threshold\ 1}/N_{TB,\ max}$ | No gap exists. |

In a second implementation, the second parameter is the first quantity of valid subframes, and the second gap threshold is configured by the system. Alternatively, the second gap threshold is determined based on the first gap threshold and the preset constant, and the preset constant is an integer greater than or equal to 1 and less than or equal to 10. Alternatively, the second gap threshold is determined based on the first gap threshold and the third gap threshold.

Optionally, the second gap threshold is configured by the system, and the second gap threshold may be $N_{gap,\ threshold\ 2}$. When the first quantity of valid subframes is greater than or equal to $N_{gap,\ threshold\ 2}$, the network device determines that a gap exists in the transmission on the downlink data channel. When the first quantity of valid subframes is less than $N_{gap,\ threshold\ 2}$, the network device determines that no gap exists in the transmission on the downlink data channel.

Optionally, the second gap threshold is determined based on the first gap threshold and the preset constant, and the second gap threshold may be $N_{gap,\ threshold\ 1} \times \tilde{N}_{SF}$. When the first quantity of valid subframes is greater than or equal to $N_{gap,\ threshold\ 1} \times \tilde{N}_{SF}$, the network device determines that a gap exists in the transmission on the downlink data channel. When the first quantity of valid subframes is less than $N_{gap,\ threshold\ 1} \times \tilde{N}_{SF}$, the network device determines that no gap exists in the transmission on the downlink data channel.

Optionally, the second gap threshold is determined based on the first gap threshold and the third gap threshold, and the second gap threshold may be $N_{gap,\ threshold\ 1} \times N_{gap,\ threshold\ 3}$. When the first quantity of valid subframes is greater than or equal to $N_{gap,\ threshold\ 1} \times N_{gap,\ threshold\ 3}$, the network device determines that a gap exists in the transmission on the downlink data channel. When the first quantity of valid subframes is less than $N_{gap,\ threshold\ 1} \times N_{gap,\ threshold\ 3}$, the network device determines that no gap exists in the transmission on the downlink data channel.

The first quantity of valid subframes is the quantity $N_{first,\ sf,\ NPDSCH}$ of valid subframes occupied by the physical downlink shared channel that carries the $1^{st}$ transport block in the plurality of transport blocks scheduled by the downlink control information. Alternatively, the first quantity of valid subframes is the quantity $N_{any,\ sf,\ NPDSCH}$ of valid subframes occupied by the physical downlink shared channel that carries any one of the plurality of transport blocks scheduled by the downlink control information. Alternatively, the first quantity of valid subframes is the quantity $N_{total,\ sf,\ NPDSCH}$ of valid subframes occupied by the physical downlink shared channel that carries the plurality of transport blocks scheduled by the downlink control information.

For example, the downlink data channel is an NPDSCH. In this case, based on a difference of the first quantity of valid subframes and a difference of the second gap threshold, a relationship between the first quantity of valid subframes, the second gap threshold, and whether a gap exists in transmission on the NPDSCH may be shown in Table 4 below.

TABLE 4

| Relationship between the first quantity of valid subframes ($N_{first,\ sf,\ NPDSCH}$, $N_{any,\ sf,\ NPDSCH}$, or $N_{total,\ sf,\ NPDSCH}$) and the second gap threshold ($N_{gap,\ threshold\ 2}$, $N_{gap,\ threshold\ 1} \times \tilde{N}_{SF}$, or $N_{gap,\ threshold\ 1} \times N_{gap,\ threshold\ 3}$) | Whether a gap exists in the transmission on the NPDSCH |
|---|---|
| $N_{first,\ sf,\ NPDSCH} \geq N_{gap,\ threshold\ 2}$ | A gap exists. |
| $N_{first,\ sf,\ NPDSCH} < N_{gap,\ threshold\ 2}$ | No gap exists. |
| $N_{first,\ sf,\ NPDSCH} \geq N_{gap,\ threshold\ 1} \times \tilde{N}_{SF}$ | A gap exists. |
| $N_{first,\ sf,\ NPDSCH} < N_{gap,\ threshold\ 1} \times \tilde{N}_{SF}$ | No gap exists. |
| $N_{first,\ sf,\ NPDSCH} \geq N_{gap,\ threshold\ 1} \times N_{gap,\ threshold\ 3}$ | A gap exists. |
| $N_{first,\ sf,\ NPDSCH} < N_{gap,\ threshold\ 1} \times N_{gap,\ threshold\ 3}$ | No gap exists. |
| $N_{any,\ sf,\ NPDSCH} \geq N_{gap,\ threshold\ 2}$ | A gap exists. |
| $N_{any,\ sf,\ NPDSCH} < N_{gap,\ threshold\ 2}$ | No gap exists. |
| $N_{any,\ sf,\ NPDSCH} \geq N_{gap,\ threshold\ 1} \times \tilde{N}_{SF}$ | A gap exists. |
| $N_{any,\ sf,\ NPDSCH} < N_{gap,\ threshold\ 1} \times \tilde{N}_{SF}$ | No gap exists. |
| $N_{any,\ sf,\ NPDSCH} \geq N_{gap,\ threshold\ 1} \times N_{gap,\ threshold\ 3}$ | A gap exists. |

TABLE 4-continued

| Relationship between the first quantity of valid subframes ($N_{first, sf, NPDSCH}$, $N_{any, sf, NPDSCH}$, or $N_{total, sf, NPDSCH}$) and the second gap threshold ($N_{gap, threshold\ 2}$, $N_{gap, threshold\ 1} \times N_{SF}$, or $N_{gap, threshold\ 1} \times N_{gap, threshold\ 3}$) | Whether a gap exists in the transmission on the NPDSCH |
|---|---|
| $N_{any, sf, NPDSCH} \leq N_{gap, threshold\ 1} \times N_{gap, threshold\ 3}$ | No gap exists. |
| $N_{total, sf, NPDSCH} \geq N_{gap, threshold\ 2}$ | A gap exists. |
| $N_{total, sf, NPDSCH} \leq N_{gap, threshold\ 2}$ | No gap exists. |
| $N_{total, sf, NPDSCH} \geq N_{gap, threshold\ 1} \times \tilde{N}_{SF}$ | A gap exists. |
| $N_{total, sf, NPDSCH} \leq N_{gap, threshold\ 1} \times \tilde{N}_{SF}$ | No gap exists. |
| $N_{total, sf, NPDSCH} \geq N_{gap, threshold\ 1} \times N_{gap, threshold\ 3}$ | A gap exists. |
| $N_{total, sf, NPDSCH} \leq N_{gap, threshold\ 1} \times N_{gap, threshold\ 3}$ | No gap exists. |

In a third implementation, the second parameter is the first quantity of valid subframes, and the second gap threshold is configured by the system. Alternatively, the second gap threshold is determined based on the first gap threshold and the preset constant, and the preset constant is an integer greater than or equal to 1 and less than or equal to 10. Alternatively, the second gap threshold is determined based on the first gap threshold and the third gap threshold, and the third gap threshold is configured by the system.

The third implementation is the same as the second implementation in step 604. Details are not described herein again in this embodiment.

Step 605: The network device sends one or more transport blocks to the terminal device through the downlink data channel based on a result of determining whether a gap exists in the transmission on the downlink data channel.

Based on the result of determining whether a gap exists in the transmission on the downlink data channel, the network device may include the one or more transport blocks in the downlink data channel, and then send the one or more transport blocks to the terminal device through the downlink data channel. The first parameter, the second parameter, the first gap threshold, and the second gap threshold enable a quantity of gaps included in a same time period used for sending the downlink data channel to be not less than a quantity of gaps included in the same time period used for sending the downlink control channel.

In this embodiment, it is assumed that the first parameter is the same as the second parameter, and the first gap threshold $N_{gap, threshold\ 1}$ is different from the second gap threshold $N_{gap, threshold\ 2}$. The first parameter is the maximum quantity of repetitions $R_{max}$ of the physical downlink control channel search space, and the first gap threshold $N_{gap, threshold\ 1}$ and the second gap threshold $N_{gap, threshold\ 2}$ are configured by the system. The maximum quantity of repetitions $R_{max}$ of the physical downlink control channel search space is 16, the first gap threshold $N_{gap,threshold\ 1}$ is configured to 32, and the second gap threshold $N_{gap, threshold\ 2}$ is configured to 8. Because the first parameter $R_{max}$ is less than the first gap threshold $N_{gap, threshold\ 1}$, no gap exists in the transmission on the downlink control channel Because the second parameter $R_{max}$ is greater than the second gap threshold $N_{gap, threshold\ 2}$, a gap exists in the transmission on the downlink data channel Gaps appear periodically. If gaps in a specific time period are counted, in this example, a gap exists in the transmission on the downlink data channel, and no gap exists in the transmission on the downlink control channel. Therefore, the first parameter, the second parameter, the first gap threshold, and the second gap threshold enable a quantity of gaps included in a same time period used for sending the downlink data channel to be not less than a quantity of gaps included in the same time period used for sending the downlink control channel.

Optionally, if a gap exists in the transmission on the downlink data channel, the network device determines a starting radio frame and a starting subframe of the gap based on the following formula:

$$\left(10n_f + \left\lfloor \frac{n_s}{2} \right\rfloor\right) \bmod N_{gap, period} = 0;$$

determines duration of the gap in each period based on the following formula: $N_{gap, duration} = N_{gap, coff} \times N_{gap, period}$; and postpones the transmission of the one or more transport blocks to the terminal device until an end of the gap based on a radio frame (or a system frame) of the gap, a slot, the duration of the gap in each period, and the scheduling information that is indicated in the downlink control information and that is for the downlink data channel that carries the $N_{TB}$ transport blocks scheduled by the downlink control information, where of is a radio frame number or a system frame number, $n_s$ is a slot number, mod indicates a modulo operation, and $\lfloor\ \rfloor$ indicates a rounding operation. If no gap exists in the transmission on the downlink data channel, the downlink data channel may perform transmission in consecutive valid subframes, and the network device may send the one or more transport blocks to the terminal device by using the consecutive valid subframes. It should be noted that, if a gap exists in the transmission on the downlink data channel, the transmission on the downlink data channel is postponed until the end of the gap. Because the one or more transport blocks are carried on the downlink data channel, this may be understood as that the transmission of the one or more transport blocks to the terminal device is postponed until the end of the gap.

Step 606: The terminal device obtains the first parameter, the second parameter, the first gap threshold, and the second gap threshold.

In this embodiment, corresponding to step 601, that the terminal device obtains the first parameter, the second parameter, the first gap threshold, and the second gap threshold may include three possible implementations.

In a first implementation (corresponding to the first implementation in step 601), the first parameter is the same as the second parameter, and the first gap threshold is different from the second gap threshold. The first parameter is the maximum quantity of repetitions of the physical downlink control channel search space, the first gap threshold and the second gap threshold are configured by the system, and the first gap threshold is different from the second gap threshold. Alternatively, the first gap threshold is configured by the system, and the second gap threshold is determined based on the first gap threshold and the quantity of transport blocks scheduled by the downlink control information. Alternatively, the first gap threshold is configured by the system, and the second gap threshold is determined based on the first gap threshold and the maximum quantity of transport blocks that can be scheduled by the downlink control information.

In the first implementation, the first parameter, the second parameter, the first gap threshold, and the second gap threshold that are obtained by the terminal device may include the following three possible cases.

In a first case, the first parameter is the same as the second parameter, the first gap threshold is different from the second gap threshold, the first parameter is the maximum quantity of repetitions of the physical downlink control channel search space, and the first gap threshold and the second gap threshold are configured by the system.

The terminal device may receive a system message or RRC signaling sent by the network device. If the first gap threshold $N_{gap,\ threshold\ 1}$ and the second gap threshold $N_{gap,\ threshold\ 2}$ are configured by the network device, the system message or the RRC signaling carries the maximum quantity of repetitions $R_{max}$ of the physical downlink control channel search space and the gap configuration parameters, and the gap configuration parameters include the first gap threshold $N_{gap,\ threshold\ 1}$ and the second gap threshold $N_{gap,\ threshold\ 2}$. The first gap threshold $N_{gap,\ threshold\ 1}$ is different from the second gap threshold $N_{gap,\ threshold\ 2}$. The terminal device can obtain the first parameter, the second parameter, the first gap threshold $N_{gap,\ threshold\ 1}$, and the second gap threshold $N_{gap,\ threshold\ 2}$ by receiving the system message or the RRC signaling. If the first gap threshold $N_{gap,\ threshold\ 1}$ and the second gap threshold $N_{gap,\ threshold\ 2}$ are agreed upon or are defined in the protocol, the first gap threshold $N_{gap,\ threshold\ 1}$ and the second gap threshold $N_{gap,\ threshold\ 2}$ are known to the terminal device, the system message or the RRC signaling carries the maximum quantity of repetitions $R_{max}$ of the physical downlink control channel search space and the gap configuration parameters, and the gap configuration parameters may not include the first gap threshold $N_{gap,\ threshold\ 1}$ or the second gap threshold $N_{gap,\ threshold\ 2}$. The terminal device obtains the first parameter and the second parameter by receiving the system message or the RRC signaling.

In a second case, the first parameter is the same as the second parameter, the first gap threshold is different from the second gap threshold, the first parameter is the maximum quantity of repetitions of the physical downlink control channel search space, the first gap threshold is configured by the system, and the second gap threshold is determined based on the first gap threshold and the quantity of transport blocks scheduled by the downlink control information.

The terminal device may receive a system message or RRC signaling sent by the network device. If the first gap threshold $N_{gap,\ threshold\ 1}$ is configured by the network device, the system message or the RRC signaling carries the maximum quantity of repetitions $R_{max}$ of the physical downlink control channel search space and the gap configuration parameters, and the gap configuration parameters include the first gap threshold $N_{gap,\ threshold\ 1}$. The terminal device can obtain the first parameter, the second parameter, and the first gap threshold $N_{gap,\ threshold\ 1}$ by receiving the system message or the RRC signaling. The terminal device determines the second gap threshold based on the first gap threshold $N_{gap,\ threshold\ 1}$ and the quantity $N_{TB}$ of transport blocks scheduled by the downlink control information.

If the first gap threshold $N_{gap,\ threshold\ 1}$ is agreed upon or is defined in the protocol, the first gap threshold $N_{gap,\ threshold\ 1}$ is known to the terminal device, the system message or the RRC signaling carries the maximum quantity of repetitions $R_{max}$ of the physical downlink control channel search space and the gap configuration parameters, and the gap configuration parameters may not include the first gap threshold $N_{gap,\ threshold\ 1}$. The terminal device obtains the first parameter and the second parameter by receiving the system message or the RRC signaling. The terminal device determines the second gap threshold based on the first gap threshold $N_{gap,\ threshold\ 1}$ and the quantity $N_{TB}$ of transport blocks scheduled by the downlink control information. For a process of determining the second gap threshold by the terminal device based on the first gap threshold $N_{gap,\ threshold\ 1}$ and the quantity $N_{TB}$ of transport blocks scheduled by the downlink control information, refer to the process of determining the second gap threshold by the network device based on the first gap threshold $N_{gap,\ threshold\ 1}$ and the quantity $N_{TB}$ of transport blocks scheduled by the downlink control information in step 601. Details are not described herein again in this embodiment.

It should be noted that the quantity $N_{TB}$ of transport blocks scheduled by the downlink control information is usually indicated in the downlink control information. Therefore, in the second case, the terminal device may determine the second gap threshold based on the first gap threshold $N_{gap,\ threshold\ 1}$ and the quantity $N_{TB}$ of transport blocks scheduled by the downlink control information after step 608. Additionally, if the terminal device can learn of, before step 606, the quantity $N_{TB}$ of transport blocks scheduled by the downlink control information, the terminal device may determine the second gap threshold in step 606 based on the first gap threshold $N_{gap,\ threshold\ 1}$ and the quantity $N_{TB}$ of transport blocks scheduled by the downlink control information. This is not limited in this embodiment.

In a third case, the first parameter is the same as the second parameter, the first gap threshold is different from the second gap threshold, the first parameter is the maximum quantity of repetitions of the physical downlink control channel search space, the first gap threshold is configured by the system, and the second gap threshold is determined based on the first gap threshold and the maximum quantity of transport blocks that can be scheduled by the downlink control information.

The terminal device may receive a system message or RRC signaling sent by the network device. If the first gap threshold $N_{gap,\ threshold\ 1}$ is configured by the network device, the system message or the RRC signaling carries the maximum quantity of repetitions $R_{max}$ of the physical downlink control channel search space and the gap configuration parameters, and the gap configuration parameters include the first gap threshold $N_{gap,\ threshold\ 1}$. The terminal device can obtain the first parameter, the second parameter, and the first gap threshold $N_{gap,\ threshold\ 1}$ by receiving the system message or the RRC signaling. The terminal device determines the second gap threshold based on the first gap threshold $N_{gap,\ threshold\ 1}$ and the maximum quantity $N_{TB,\ max}$ of transport blocks that can be scheduled by the downlink control information. If the first gap threshold $N_{gap,\ threshold\ 1}$ is agreed upon or is defined in the protocol, the first gap threshold $N_{gap,\ threshold\ 1}$ is known to the terminal device, the system message or the RRC signaling carries the maximum quantity of repetitions $R_{max}$ of the physical downlink control channel search space and the gap configuration parameters, and the gap configuration parameters may not include the first gap threshold $N_{gap,\ threshold\ 1}$. The terminal device obtains the first parameter and the second parameter by receiving the system message or the RRC signaling. The terminal device determines the second gap threshold based on the first gap threshold $N_{gap,\ threshold\ 1}$ and the maximum quantity $N_{TB,\ max}$ of transport blocks that can be scheduled by the downlink control information.

The terminal device may obtain, by receiving downlink control information, RRC signaling, a system message, or MAC CE signaling sent by the network device, the maximum quantity $N_{TB,\ max}$ of transport blocks that can be scheduled by the downlink control information; and determine the second gap threshold based on the first gap threshold $N_{gap,\ threshold\ 1}$ and the maximum quantity $N_{TB,\ max}$ of transport blocks that can be scheduled by the downlink control information. For a process of determining the second gap threshold by the terminal device based on the first gap threshold $N_{gap, threshold\ 1}$ and the maximum quantity $N_{TB, max}$ of transport blocks that can be scheduled by the downlink control information, refer to the process of determining the second gap threshold by the network device based on the first gap threshold $N_{gap, threshold\ 1}$ and the maximum quantity $N_{TB, max}$ of transport blocks that can be scheduled by the downlink control information in step 601. Details are not described herein again in this embodiment.

In a second implementation (corresponding to the second implementation in step 601), the first parameter is different from the second parameter, and the first gap threshold is the same as the second gap threshold. The first parameter is the maximum quantity of repetitions of the physical downlink control channel search space, the second parameter is the first quantity of valid subframes, and the first gap threshold and the second gap threshold are configured by the system. Alternatively, the first gap threshold is configured by the system, the second gap threshold is determined based on the first gap threshold and the preset constant, and the preset constant is an integer greater than or equal to 1 and less than or equal to 10. Alternatively, the first gap threshold is configured by the system, the second gap threshold is determined based on the first gap threshold and the third gap threshold, and the third gap threshold is configured by the system. The first quantity of valid subframes is the quantity of valid subframes occupied by the physical downlink shared channel that carries the $1^{st}$ transport block in the plurality of transport blocks scheduled by the downlink control information. Alternatively, the first quantity of valid subframes is the quantity of valid subframes occupied by the physical downlink shared channel that carries any one of the plurality of transport blocks scheduled by the downlink control information. Alternatively, the first quantity of valid subframes is the quantity of valid subframes occupied by the physical downlink shared channel that carries the plurality of transport blocks scheduled by the downlink control information.

In the second implementation, that the terminal device obtains the first parameter, the second parameter, the first gap threshold, and the second gap threshold may include the following three possible cases.

In a first case, the first parameter is different from the second parameter, the first gap threshold is the same as the second gap threshold, the first parameter is the maximum quantity of repetitions of the physical downlink control channel search space, the second parameter is the first quantity of valid subframes, and the first gap threshold and the second gap threshold are configured by the system.

The terminal device may receive a system message or RRC signaling sent by the network device. If the first gap threshold $N_{gap, threshold\ 1}$ and the second gap threshold $N_{gap, threshold\ 2}$ are configured by the network device, the system message or the RRC signaling carries the maximum quantity of repetitions $R_{max}$ of the physical downlink control channel search space and the gap configuration parameters, and the gap configuration parameters include the first gap threshold $N_{gap, threshold\ 1}$ and the second gap threshold $N_{gap, threshold\ 2}$. The first gap threshold $N_{gap, threshold\ 1}$ is the same as the second gap threshold $N_{gap, threshold\ 2}$. The terminal device can obtain the first parameter, the first gap threshold $N_{gap, threshold\ 1}$, and the second gap threshold $N_{gap, threshold\ 2}$ by receiving the system message or the RRC signaling. If the first gap threshold $N_{gap, threshold\ 1}$ and the second gap threshold $N_{gap, threshold\ 2}$ are agreed upon or are defined in the protocol, the first gap threshold $N_{gap, threshold\ 1}$ and the second gap threshold $N_{gap, threshold\ 2}$ are known to the terminal device, the system message or the RRC signaling carries the maximum quantity of repetitions $R_{max}$ of the physical downlink control channel search space and the gap configuration parameters, and the gap configuration parameters may not include the first gap threshold $N_{gap, threshold\ 1}$ or the second gap threshold $N_{gap, threshold\ 2}$. The terminal device obtains the first parameter by receiving the system message or the RRC signaling.

In a second case, the first parameter is different from the second parameter, the first gap threshold is the same as the second gap threshold, the first parameter is the maximum quantity of repetitions of the physical downlink control channel search space, the second parameter is the first quantity of valid subframes, the first gap threshold is configured by the system, the second gap threshold is determined based on the first gap threshold and the preset constant, and the preset constant is an integer greater than or equal to 1 and less than or equal to 10.

The terminal device may receive a system message or RRC signaling sent by the network device. If the first gap threshold $N_{gap, threshold\ 1}$ is configured by the network device, the system message or the RRC signaling carries the maximum quantity of repetitions $R_{max}$ of the physical downlink control channel search space and the gap configuration parameters, and the gap configuration parameters include the first gap threshold $N_{gap, threshold\ 1}$. The terminal device can obtain the first parameter and the first gap threshold $N_{gap, threshold\ 1}$ by receiving the system message or the RRC signaling. The terminal device determines the second gap threshold based on the first gap threshold $N_{gap, threshold\ 1}$ and the preset constant $N_{SF}$. If the first gap threshold $N_{gap, threshold\ 1}$ is agreed upon or is defined in the protocol, the first gap threshold $N_{gap, threshold\ 1}$ is known to the terminal device, the system message or the RRC signaling carries the maximum quantity of repetitions $R_{max}$ of the physical downlink control channel search space and the gap configuration parameters, and the gap configuration parameters may not include the first gap threshold $N_{gap, threshold\ 1}$. The terminal device obtains the first parameter by receiving the system message or the RRC signaling. The terminal device determines the second gap threshold based on the first gap threshold $N_{gap, threshold\ 1}$ and the preset constant $\tilde{N}_{SF}$. For a process of determining the second gap threshold by the terminal device based on the first gap threshold $N_{gap, threshold\ 1}$ and the preset constant $N_{SF}$, refer to the process of determining the second gap threshold by the network device based on the first gap threshold $N_{gap, threshold\ 1}$ and the preset constant $\tilde{N}_{SF}$ in step 601. Details are not described herein again in this embodiment.

In a third case, the first parameter is different from the second parameter, the first gap threshold is the same as the second gap threshold, the first parameter is the maximum quantity of repetitions of the physical downlink control channel search space, the second parameter is the first quantity of valid subframes, the first gap threshold is configured by the system, the second gap threshold is determined based on the first gap threshold and the third gap threshold, and the third gap threshold is configured by the system.

The terminal device may receive a system message or RRC signaling sent by the network device. If the first gap threshold $N_{gap, threshold\ 1}$ and the third gap threshold $N_{gap, threshold\ 3}$ are configured by the network device, the system message or the RRC signaling carries the maximum quantity of repetitions $R_{max}$ of the physical downlink control channel search space and the gap configuration parameters, and the gap configuration parameters include the first gap threshold $N_{gap, threshold\ 1}$ and the third gap threshold $N_{gap,\ threshold\ 3}$. The terminal device can obtain the first parameter, the first gap threshold $N_{gap,\ threshold\ 1}$, and the third gap threshold $N_{gap,\ threshold\ 3}$ by receiving the system message or the RRC signaling. The terminal device determines the second gap threshold based on the first gap threshold $N_{gap,\ threshold\ 1}$ and the third gap threshold $N_{gap,\ threshold\ 3}$. If the first gap threshold $N_{gap,\ threshold\ 1}$ and the third gap threshold $N_{gap,\ threshold\ 3}$ are agreed upon or are defined in the protocol, the first gap threshold $N_{gap,\ threshold\ 1}$ and the third gap threshold $N_{gap,\ threshold\ 3}$ are known to the terminal device, the system message or the RRC signaling carries the maximum quantity of repetitions $R_{max}$ of the physical downlink control channel search space and the gap configuration parameters, and the gap configuration parameters may not include the first gap threshold $N_{gap,\ threshold\ 1}$ or the third gap threshold $N_{gap,\ threshold\ 3}$. The terminal device obtains the first parameter by receiving the system message or the RRC signaling. The terminal device determines the second gap threshold based on the first gap threshold $N_{gap,\ threshold\ 1}$ and the third gap threshold $N_{gap,\ threshold\ 3}$. For a process of determining the second gap threshold by the terminal device based on the first gap threshold $N_{gap,\ threshold\ 1}$ and the third gap threshold $N_{gap,\ threshold\ 3}$, refer to the process of determining the second gap threshold by the network device based on the first gap threshold $N_{gap,\ threshold\ 1}$ and the third gap threshold $N_{gap,\ threshold\ 3}$ in step 601. Details are not described herein again in this embodiment.

It should be noted that, in the second implementation, the terminal device may determine the first quantity of valid subframes (that is, the second parameter) based on the scheduling information for the downlink data channel that carries the $N_{TB}$ transport blocks scheduled by the downlink control information. For an implementation process of obtaining the first quantity of valid subframes by the terminal device, refer to the process of obtaining the first quantity of valid subframes by the network device in step 601. Details are not described herein again in this embodiment. It should be noted that, because the scheduling information for the downlink data channel that carries the $N_{TB}$ transport blocks scheduled by the downlink control information is usually indicated in the downlink control information, in the second implementation, the terminal device may obtain the first quantity of valid subframes after step 608. Further, if the terminal device can learn of, before step 606, the scheduling information for the downlink data channel that carries the $N_{TB}$ transport blocks scheduled by the downlink control information, the terminal device may obtain the first quantity of valid subframes in step 606. This is not limited in this embodiment.

In a third implementation (corresponding to the third implementation in step 601), the first parameter is different from the second parameter, and the first gap threshold is different from the second gap threshold. The first parameter is the maximum quantity of repetitions of the physical downlink control channel search space, the second parameter is the first quantity of valid subframes, and the first gap threshold and the second gap threshold are configured by the system. Alternatively, the first gap threshold is configured by the system, the second gap threshold is determined based on the first gap threshold and the preset constant, and the preset constant is an integer greater than or equal to 1 and less than or equal to 10. Alternatively, the first gap threshold is configured by the system, the second gap threshold is determined based on the first gap threshold and the third gap threshold, and the third gap threshold is configured by the system. The first quantity of valid subframes is the quantity of valid subframes occupied by the physical downlink shared channel that carries the $1^{st}$ transport block in the plurality of transport blocks scheduled by the downlink control information. Alternatively, the first quantity of valid subframes is the quantity of valid subframes occupied by the physical downlink shared channel that carries any one of the plurality of transport blocks scheduled by the downlink control information. Alternatively, the first quantity of valid subframes is the quantity of valid subframes occupied by the physical downlink shared channel that carries the plurality of transport blocks scheduled by the downlink control information.

For a process of the third implementation, refer to the second implementation in step 606 and the third implementation in step 601. Details are not described herein again in this embodiment.

Step 607: The terminal device determines, based on the first parameter and the first gap threshold, whether a gap exists in the transmission on the downlink control channel.

For an implementation process of step 607, refer to the process of determining, by the network device based on the first parameter and the first gap threshold, whether a gap exists in the transmission on the downlink control channel in step 602. Details are not described herein again in this embodiment.

Step 608: The terminal device receives the downlink control information from the network device through the downlink control channel based on a result of determining whether a gap exists in the transmission on the downlink control channel, where the downlink control information is used to schedule the one or more transport blocks.

The terminal device may receive the downlink control information from the network device through the downlink control channel based on the result of determining whether a gap exists in the transmission on the downlink control channel Optionally, if a gap exists in the transmission on the downlink control channel, the terminal device determines a starting radio frame and a starting subframe of the gap based on the following formula:

$$\left(10n_f + \left\lfloor \frac{n_s}{2} \right\rfloor\right) \bmod N_{gap,period} = 0;$$

determines duration of the gap in each period based on the following formula: $N_{gap,\ duration} = N_{gap,\ coff} \times N_{gap,\ period}$; and then performs blind detection on the downlink control channel in a search space after the gap based on a radio frame (or a system frame) of the gap, a slot, and the duration of the gap in each period, to receive the downlink control information from the network device, where of is a radio frame number or a system frame number, $n_s$ is a slot number, mod indicates a modulo operation, and $\lfloor \ \rfloor$ indicates a rounding operation. If no gap exists in the transmission on the downlink control channel, the downlink control channel may perform transmission in consecutive valid subframes, and the terminal device may receive the downlink control information from the network device on the consecutive valid subframes.

It should be noted that the downlink control information may indicate the quantity $N_{TB}$ of transport blocks scheduled by the downlink control information, and carry the scheduling information for the downlink data channel that carries the $N_{TB}$ transport blocks scheduled by the downlink control information. The terminal device may determine, based on the downlink control information, the quantity $N_{TB}$ of transport blocks scheduled by the downlink control information;

and then determine the second gap threshold based on the first gap threshold $N_{gap,\ threshold\ 1}$ and the quantity $N_{TB}$ of transport blocks scheduled by the downlink control information. This process may be the process of obtaining the second gap threshold by the terminal device in the second case of the first implementation in step 606. The terminal device may determine, based on the downlink control information, the scheduling information for the downlink data channel that carries the $N_{TB}$ transport blocks scheduled by the downlink control information; and determine the first quantity of valid subframes based on the scheduling information for the downlink data channel that carries the $N_{TB}$ transport blocks scheduled by the downlink control information. This process may be the process of obtaining the first quantity of valid subframes (that is, the second parameter) by the terminal device in the second and third implementations in step 606.

Step 609: The terminal device determines, based on the second parameter and the second gap threshold, whether a gap exists in the transmission on the downlink data channel.

For an implementation process of step 609, refer to the process of determining, by the network device based on the second parameter and the second gap threshold, whether a gap exists in the transmission on the downlink data channel in step 604. Details are not described herein again in this embodiment.

Step 610: The terminal device receives the one or more transport blocks from the network device through the downlink data channel based on a result of determining whether a gap exists in the transmission on the downlink data channel.

The terminal device receives the one or more transport blocks from the network device through the downlink data channel based on the result of determining whether a gap exists in the transmission on the downlink data channel. The first parameter, the second parameter, the first gap threshold, and the second gap threshold enable a quantity of gaps included in a same time period used for receiving the downlink data channel to be not less than a quantity of gaps included in the same time period used for receiving the downlink control channel.

In this embodiment, it is assumed that the first parameter is the same as the second parameter, and the first gap threshold $N_{gap,\ threshold\ 1}$ is different from the second gap threshold $N_{gap,\ threshold\ 2}$. The first parameter is the maximum quantity of repetitions $R_{max}$ of the physical downlink control channel search space, and the first gap threshold $N_{gap,\ threshold\ 1}$ and the second gap threshold $N_{gap,\ threshold\ 2}$ are configured by the system. The maximum quantity of repetitions $R_{max}$ of the physical downlink control channel search space is 16, the first gap threshold $N_{gap,\ threshold\ 1}$ is configured to 32, and the second gap threshold $N_{gap,\ threshold\ 2}$ is configured to 8. Because the first parameter $R_{max}$ is less than the first gap threshold $N_{gap,\ threshold\ 1}$, no gap exists in the transmission on the downlink control channel Because the second parameter $R_{max}$ is greater than the second gap threshold $N_{gap,\ threshold\ 2}$, a gap exists in the transmission on the downlink data channel Gaps appear periodically. If gaps in a specific time period are counted, in this example, a gap exists in the transmission on the downlink data channel, and no gap exists in the transmission on the downlink control channel. Therefore, the first parameter, the second parameter, the first gap threshold, and the second gap threshold enable a quantity of gaps included in a same time period used for receiving the downlink data channel to be not less than a quantity of gaps included in the same time period used for receiving the downlink control channel.

Optionally, if a gap exists in the transmission on the downlink data channel, the terminal device determines a starting radio frame and a starting subframe of the gap based on the following formula:

$$\left(10n_f + \left\lfloor \frac{n_s}{2} \right\rfloor\right) \mathrm{mod} N_{gap, period} = 0;$$

determines duration of the gap in each period based on the following formula: $N_{gap,\ duration} = N_{gap,\ coff} \times N_{gap,\ period}$, and receives the one or more transport blocks from the network device through the downlink data channel after the gap based on a radio frame (or a system frame) of the gap, a slot, the duration of the gap in each period, and the scheduling information that is indicated in the downlink control information and that is for the downlink data channel that carries the $N_{TB}$ transport blocks scheduled by the downlink control information, where of is a radio frame number or a system frame number, $n_s$ is a slot number, mod indicates a modulo operation, and $\lfloor\ \rfloor$ indicates a rounding operation. If no gap exists in the transmission on the downlink data channel, the downlink data channel may perform transmission in consecutive valid subframes, and the terminal device may receive the one or more transport blocks by using the consecutive valid subframes. It should be noted that, if a gap exists in the transmission on the downlink data channel, the transmission on the downlink data channel is postponed until the end of the gap. Because the one or more transport blocks are carried on the downlink data channel, this may be understood as that the receiving the one or more transport blocks from the network device is postponed until the end of the gap.

It should be noted that, before the data transmission method provided in this embodiment is performed, the network device may determine whether data transmission between the network device and the terminal device meets a preset condition. If the data transmission between the network device and the terminal device meets the preset condition, whether a gap exists in the downlink transmission is determined in a gap determining manner in the data transmission method provided in this embodiment, and the downlink transmission is performed based on a determining result. If the data transmission between the network device and the terminal device does not meet the preset condition, whether a gap exists in the downlink transmission is determined in a gap determining manner provided in a related technology, and the downlink transmission is performed based on a determining result. The preset condition may include: a preset value of a scheduling delay is less than or equal to a preset time threshold. The preset value of the scheduling delay is a maximum value, a minimum value, or an average value of the scheduling delay. The maximum value of the scheduling delay is a maximum value of a plurality of time differences between a transmission ending moment of the downlink control information and a plurality of transmission starting moments of the plurality of transport blocks scheduled by the downlink control information. The minimum value of the scheduling delay is a minimum value of the time differences between the transmission ending moment of the downlink control information and the plurality of transmission starting moments of the plurality of transport blocks scheduled by the downlink control information. The average value of the scheduling delay is an average value of the plurality of time differences between the transmission ending moment of the downlink control information and the plurality of transmission starting moments of the plurality of transport blocks scheduled by the downlink control information. Alternatively, the preset condition includes: a preset value of a transmission delay between two adjacent transport blocks in the plurality of transport blocks scheduled by the downlink control information is less than or equal to a preset time threshold. The preset value of the transmission delay is a maximum value, a minimum value, or an average value of the transmission delay. In addition, the terminal device in this embodiment is a terminal device that supports scheduling a plurality of transport blocks by one piece of downlink control information. For a terminal device that does not support scheduling a plurality of transport blocks by one piece of downlink control information, whether a gap exists in downlink transmission may be determined in the gap determining manner provided in the related technology, and the downlink transmission is performed based on a determining result. This is not limited in this embodiment.

It should be noted that a sequence of the steps in the data transmission method provided in this embodiment may be properly adjusted, and the steps may also be correspondingly added or deleted according to a situation. All modified methods readily figured out by a person of ordinary skill in the art within the scope in the embodiments shall fall within the protection scope, and details are not described herein again.

Thus, in the data transmission method provided in this embodiment, the network device determines, based on the first parameter and the first gap threshold, whether a gap exists in the transmission on the downlink control channel; transmits the downlink control information to the terminal device through the downlink control channel based on the result of determining whether a gap exists in the transmission on the downlink control channel; determines, based on the second parameter and the second gap threshold, whether a gap exists in the transmission on the downlink data channel; and transmits the one or more transport blocks to the terminal device through the downlink data channel based on the result of determining whether a gap exists in the transmission on the downlink data channel. The first parameter is different from the second parameter, and the first gap threshold is the same as the second gap threshold; or the first parameter is the same as the second parameter, and the first gap threshold is different from the second gap threshold; or the first parameter is different from the second parameter, and the first gap threshold is different from the second gap threshold. In the solution provided in this embodiment, different determining manners may be used for determining whether a gap exists in the transmission on the downlink control channel and the transmission on the downlink data channel, so that a quantity of gaps included in a same time period used for sending the downlink data channel can be different from a quantity of gaps included in the same time period used for sending the downlink control channel. For example, the quantity of gaps included in the same time period used for sending the downlink data channel can be greater than or equal to the quantity of gaps included in the same time period used for sending the downlink control channel. Therefore, compared with a current gap determining manner, in the gap determining manners provided in this embodiment, there can be more gaps in the transmission on the downlink data channel. Therefore, in a scenario in which one piece of DCI schedules a plurality of TBs, continuous downlink data transmission that lasts for a relatively long time for a terminal device can be better avoided, thereby better avoiding blocking a downlink channel, and improving system resource utilization. In addition, in the data transmission method provided in this embodiment, the second gap threshold is set to determine whether a gap exists in the transmission on the downlink data channel Compared with the related technology, the gap determining manner is more flexible.

The following are apparatus embodiments, and may be used to perform the method embodiments. For details not disclosed in the apparatus embodiments, refer to the method embodiments.

FIG. 7 is a schematic diagram of a logical structure of a network device 700 according to an embodiment. The network device 700 may be a base station and may be specifically an MTC base station. Referring to FIG. 7, the network device 700 includes:
  a first determining module 710, configured to determine a first parameter, a second parameter, a first gap threshold, and a second gap threshold;
  a second determining module 720, configured to determine, based on the first parameter and the first gap threshold, whether a gap exists in transmission on a downlink control channel;
  a first sending module 730, configured to send downlink control information to a terminal device through the downlink control channel based on a result of determining whether a gap exists in the transmission on the downlink control channel;
  a third determining module 740, configured to determine, based on the second parameter and the second gap threshold, whether a gap exists in transmission on a downlink data channel; and
  a second sending module 750, configured to send one or more transport blocks to the terminal device through the downlink data channel based on a result of determining whether a gap exists in the transmission on the downlink data channel, where the downlink control information is used to schedule the one or more transport blocks.

The first parameter is different from the second parameter, and the first gap threshold is the same as the second gap threshold; or
  the first parameter is the same as the second parameter, and the first gap threshold is different from the second gap threshold; or
  the first parameter is different from the second parameter, and the first gap threshold is different from the second gap threshold.

Optionally, the first parameter, the second parameter, the first gap threshold, and the second gap threshold enable a quantity of gaps included in a same time period used for sending the downlink data channel to be not less than a quantity of gaps included in the same time period used for sending the downlink control channel.

Optionally, the first parameter is the same as the second parameter, and the first parameter is a maximum quantity of repetitions of a physical downlink control channel search space.

The second determining module 720 is configured to: when the maximum quantity of repetitions of the physical downlink control channel search space is greater than or equal to the first gap threshold, determine that a gap exists in the transmission on the downlink control channel; or when the maximum quantity of repetitions of the physical downlink control channel search space is less than the first gap threshold, determine that no gap exists in the transmission on the downlink control channel.

The third determining module 740 is configured to: when the maximum quantity of repetitions of the physical downlink control channel search space is greater than or equal to the second gap threshold, determine that a gap exists in the transmission on the downlink data channel; or when the maximum quantity of repetitions of the physical downlink control channel search space is less than the second gap threshold, determine that no gap exists in the transmission on the downlink data channel.

The first gap threshold and the second gap threshold are configured by a system, and the first gap threshold is different from the second gap threshold. Alternatively, the first gap threshold is configured by a system, and the second gap threshold is determined based on the first gap threshold and a quantity of transport blocks scheduled by the downlink control information. Alternatively, the first gap threshold is configured by a system, and the second gap threshold is determined based on the first gap threshold and a maximum quantity of transport blocks that can be scheduled by the downlink control information.

Optionally, the first parameter is a maximum quantity of repetitions of a physical downlink control channel search space, and the second parameter is a first quantity of valid subframes.

The second determining module 720 is configured to: when the maximum quantity of repetitions of the physical downlink control channel search space is greater than or equal to the first gap threshold, determine that a gap exists in the transmission on the downlink control channel; or when the maximum quantity of repetitions of the physical downlink control channel search space is less than the first gap threshold, determine that no gap exists in the transmission on the downlink control channel.

The third determining module 740 is configured to: when the first quantity of valid subframes is greater than or equal to the second gap threshold, determine that a gap exists in the transmission on the downlink data channel; or when the first quantity of valid subframes is less than the second gap threshold, determine that no gap exists in the transmission on the downlink data channel.

The first gap threshold and the second gap threshold are configured by a system. Alternatively, the first gap threshold is configured by a system, the second gap threshold is determined based on the first gap threshold and a preset constant, and the preset constant is an integer greater than or equal to 1 and less than or equal to 10. Alternatively, the first gap threshold is configured by a system, the second gap threshold is determined based on the first gap threshold and a third gap threshold, and the third gap threshold is configured by the system.

Optionally, the first quantity of valid subframes is a quantity of valid subframes occupied by a physical downlink shared channel that carries the $1^{st}$ transport block in a plurality of transport blocks scheduled by the downlink control information; or the first quantity of valid subframes is a quantity of valid subframes occupied by a physical downlink shared channel that carries any one of a plurality of transport blocks scheduled by the downlink control information; or the first quantity of valid subframes is a quantity of valid subframes occupied by a physical downlink shared channel that carries a plurality of transport blocks scheduled by the downlink control information.

Figure 6A:
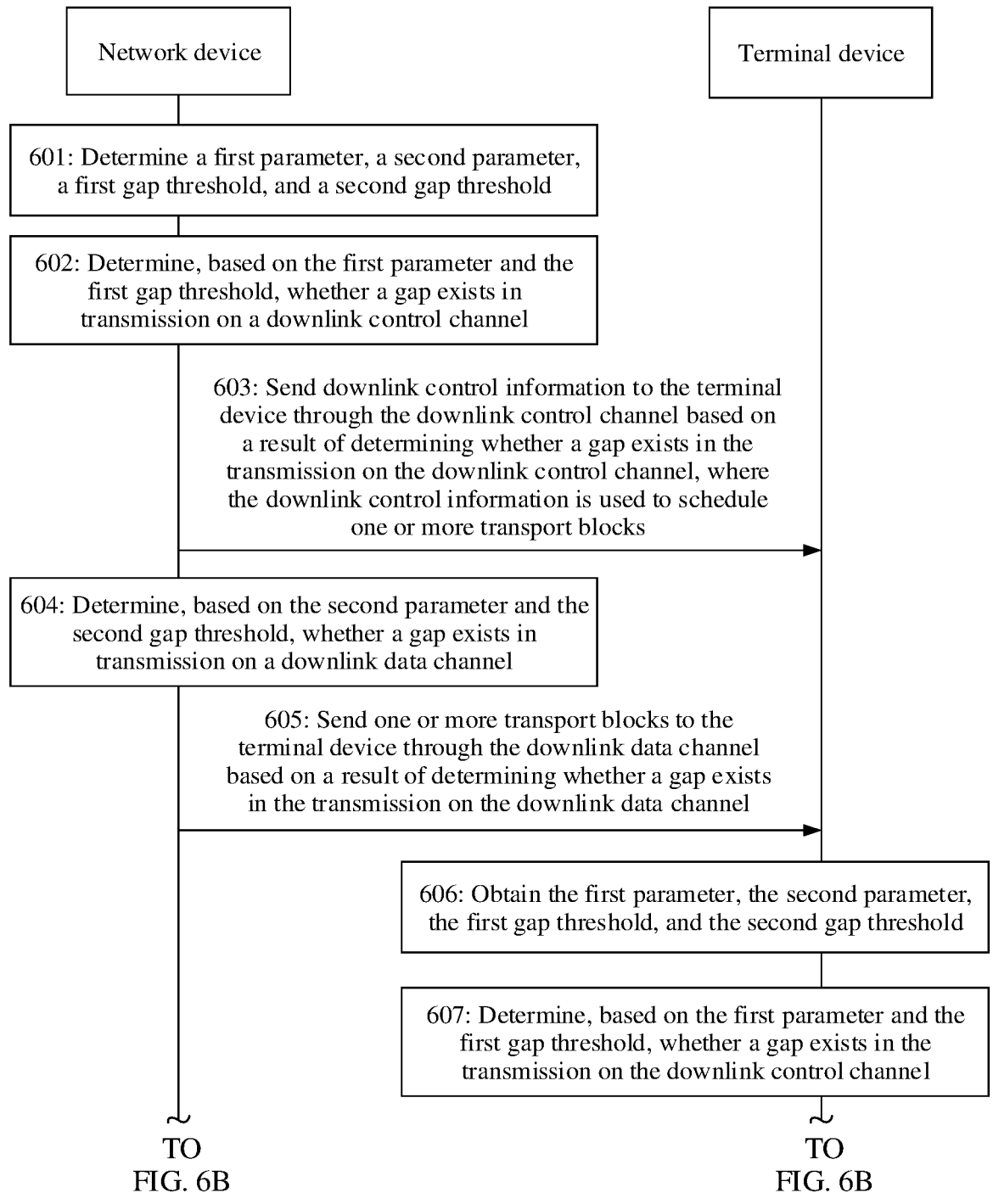

It should be noted that the first determining module 710 is configured to perform step 601 in the embodiment shown in FIG. 6A, the second determining module 720 is configured to perform step 602 in the embodiment shown in FIG. 6A, the first sending module 730 is configured to perform step 603 in the embodiment shown in FIG. 6A, the third determining module 740 is configured to perform step 604 in the embodiment shown in FIG. 6A, and the second sending module 750 is configured to perform step 605 in the embodiment shown in FIG. 6A. In addition, the first determining module 710, the second determining module 720, and the third determining module 740 may be a same determining module or may be different determining modules. The first sending module 730 and the second sending module 750 may be a same sending module or may be different sending modules. This is not limited in this embodiment.

Optionally, the foregoing determining modules may be alternatively one processing module, and the foregoing sending modules may be one sending module. In other words, the processing module performs the determining steps and the like in the foregoing steps, and the sending module performs the sending steps and the like. The processing module may alternatively include a plurality of processing sub-modules.

Therefore, the network device provided in this embodiment determines, based on the first parameter and the first gap threshold, whether a gap exists in the transmission on the downlink control channel; sends the downlink control information to the terminal device through the downlink control channel based on the result of determining whether a gap exists in the transmission on the downlink control channel; determines, based on the second parameter and the second gap threshold, whether a gap exists in the transmission on the downlink data channel; and sends the one or more transport blocks to the terminal device through the downlink data channel based on the result of determining whether a gap exists in the transmission on the downlink data channel. The first parameter is different from the second parameter, and the first gap threshold is the same as the second gap threshold; or the first parameter is the same as the second parameter, and the first gap threshold is different from the second gap threshold; or the first parameter is different from the second parameter, and the first gap threshold is different from the second gap threshold. In the solution provided in this embodiment, different determining manners may be used for determining whether a gap exists in the transmission on the downlink control channel and the transmission on the downlink data channel, so that a quantity of gaps included in a same time period used for sending the downlink data channel can be different from a quantity of gaps included in the same time period used for sending the downlink control channel. For example, the quantity of gaps included in the same time period used for sending the downlink data channel can be greater than or equal to the quantity of gaps included in the same time period used for sending the downlink control channel. Therefore, compared with a current gap determining manner, in the gap determining manners provided in this embodiment, there can be more gaps in the transmission on the downlink data channel. Therefore, in a scenario in which one piece of DCI schedules a plurality of TBs, continuous downlink data transmission that lasts for a relatively long time for a terminal device can be better avoided, thereby better avoiding blocking a downlink channel, and improving system resource utilization.

Figure 8:
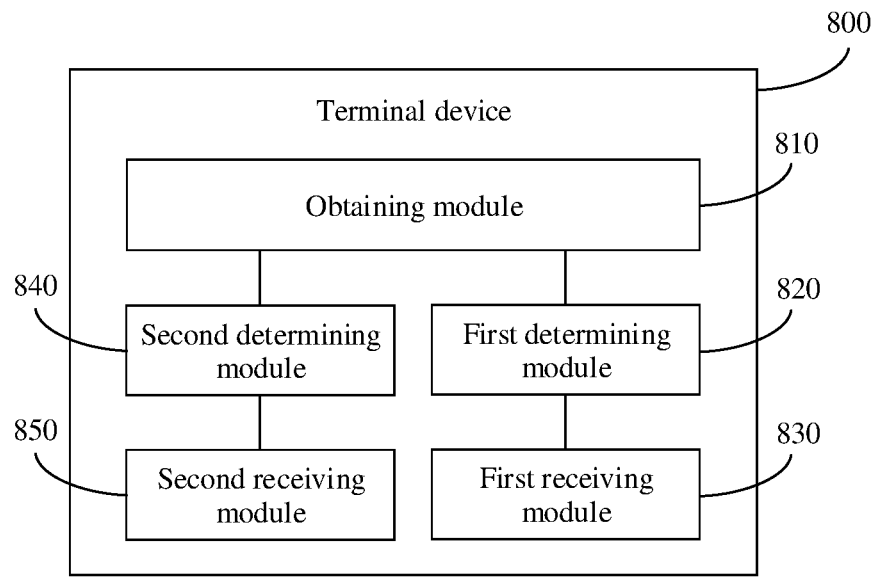
FIG. 8 is a schematic diagram of a logical structure of a terminal device according to an embodiment.

FIG. 8 is a schematic diagram of a logical structure of a terminal device 800 according to an embodiment. The terminal device 800 may be user equipment and may be specifically an MTC device. Referring to FIG. 8, the terminal device 800 includes:

an obtaining module 810, configured to obtain a first parameter, a second parameter, a first gap threshold, and a second gap threshold;

a first determining module 820, configured to determine, based on the first parameter and the first gap threshold, whether a gap exists in transmission on a downlink control channel;

a first receiving module 830, configured to receive downlink control information from a network device through the downlink control channel based on a result of determining whether a gap exists in the transmission on the downlink control channel;

a second determining module 840, configured to determine, based on the second parameter and the second gap threshold, whether a gap exists in transmission on a downlink data channel; and a second receiving module 850, configured to receive one or more transport blocks from the network device through the downlink data channel based on a result of determining whether a gap exists in the transmission on the downlink data channel, where the downlink control information is used to schedule the one or more transport blocks.

The first parameter is different from the second parameter, and the first gap threshold is the same as the second gap threshold; or the first parameter is the same as the second parameter, and the first gap threshold is different from the second gap threshold; or the first parameter is different from the second parameter, and the first gap threshold is different from the second gap threshold.

Optionally, the first parameter, the second parameter, the first gap threshold, and the second gap threshold enable a quantity of gaps included in a same time period used for receiving the downlink data channel to be not less than a quantity of gaps included in the same time period used for receiving the downlink control channel.

Optionally, the first parameter is the same as the second parameter, and the first parameter is a maximum quantity of repetitions of a physical downlink control channel search space.

The first determining module 820 is configured to: when the maximum quantity of repetitions of the physical downlink control channel search space is greater than or equal to the first gap threshold, determine that a gap exists in the transmission on the downlink control channel; or when the maximum quantity of repetitions of the physical downlink control channel search space is less than the first gap threshold, determine that no gap exists in the transmission on the downlink control channel.

The second determining module 840 is configured to: when the maximum quantity of repetitions of the physical downlink control channel search space is greater than or equal to the second gap threshold, determine that a gap exists in the transmission on the downlink data channel; or when the maximum quantity of repetitions of the physical downlink control channel search space is less than the second gap threshold, determine that no gap exists in the transmission on the downlink data channel.

The first gap threshold and the second gap threshold are configured by a system. Alternatively, the first gap threshold is configured by a system, and the second gap threshold is determined based on the first gap threshold and a quantity of transport blocks scheduled by the downlink control information. Alternatively, the first gap threshold is configured by a system, and the second gap threshold is determined based on the first gap threshold and a maximum quantity of transport blocks that can be scheduled by the downlink control information.

Optionally, the first parameter is a maximum quantity of repetitions of a physical downlink control channel search space, and the second parameter is a first quantity of valid subframes.

The first determining module 820 is configured to: when the maximum quantity of repetitions of the physical downlink control channel search space is greater than or equal to the first gap threshold, determine that a gap exists in the transmission on the downlink control channel; or when the maximum quantity of repetitions of the physical downlink control channel search space is less than the first gap threshold, determine that no gap exists in the transmission on the downlink control channel.

The second determining module 840 is configured to: when the first quantity of valid subframes is greater than or equal to the second gap threshold, determine that a gap exists in the transmission on the downlink data channel; or when the first quantity of valid subframes is less than the second gap threshold, determine that no gap exists in the transmission on the downlink data channel.

The first gap threshold and the second gap threshold are configured by a system. Alternatively, the first gap threshold is configured by a system, the second gap threshold is determined based on the first gap threshold and a preset constant, and the preset constant is an integer greater than or equal to 1 and less than or equal to 10. Alternatively, the first gap threshold is configured by a system, the second gap threshold is determined based on the first gap threshold and a third gap threshold, and the third gap threshold is configured by the system.

Optionally, the first quantity of valid subframes is a quantity of valid subframes occupied by a physical downlink shared channel that carries the $1^{st}$ transport block in a plurality of transport blocks scheduled by the downlink control information; or the first quantity of valid subframes is a quantity of valid subframes occupied by a physical downlink shared channel that carries any one of a plurality of transport blocks scheduled by the downlink control information; or the first quantity of valid subframes is a quantity of valid subframes occupied by a physical downlink shared channel that carries a plurality of transport blocks scheduled by the downlink control information.

It should be noted that the obtaining module 810 is configured to perform step 606 in the embodiment shown in FIG. 6A, the first determining module 820 is configured to perform step 607 in the embodiment shown in FIG. 6A, the first receiving module 830 is configured to perform step 608 in the embodiment shown in FIG. 6B, the second determining module 840 is configured to perform step 608 in the embodiment shown in FIG. 6B, and the second receiving module 850 is configured to perform step 610 in the embodiment shown in FIG. 6B. In addition, the first determining module 820 and the second determining module 840 may be a same determining module or may be different determining modules. The first receiving module 830 and the second receiving module 850 may be a same receiving module or may be different receiving modules. This is not limited in this embodiment.

Optionally, similar to those on the network device side, the foregoing determining modules and obtaining module on the terminal device side may be alternatively one processing module, and the foregoing receiving modules may be one receiving module. In other words, the processing module performs the determining and obtaining steps and the like in the foregoing steps, and the receiving module performs the receiving steps and the like. The processing module may alternatively include a plurality of processing sub-modules.

Thus, the terminal device provided in this embodiment determines, based on the first parameter and the first gap threshold, whether a gap exists in the transmission on the downlink control channel; receives the downlink control information, sent by the network device, through the downlink control channel based on the result of determining whether a gap exists in the transmission on the downlink control channel; determines, based on the second parameter and the second gap threshold, whether a gap exists in the transmission on the downlink data channel; and receives the one or more transport blocks, sent by the network device, through the downlink data channel based on the result of determining whether a gap exists in the transmission on the downlink data channel. The first parameter is different from the second parameter, and the first gap threshold is the same as the second gap threshold; or the first parameter is the same as the second parameter, and the first gap threshold is different from the second gap threshold; or the first parameter is different from the second parameter, and the first gap threshold is different from the second gap threshold. In the solution provided in this embodiment, different determining manners may be used for determining whether a gap exists in the transmission on the downlink control channel and the transmission on the downlink data channel, so that a quantity of gaps included in a same time period used for sending the downlink data channel can be different from a quantity of gaps included in the same time period used for sending the downlink control channel. For example, the quantity of gaps included in the same time period used for sending the downlink data channel can be greater than or equal to the quantity of gaps included in the same time period used for sending the downlink control channel Therefore, compared with a current gap determining manner, in the gap determining manners provided in this embodiment, there can be more gaps in the transmission on the downlink data channel. Therefore, in a scenario in which one piece of DCI schedules a plurality of TBs, continuous downlink data transmission that lasts for a relatively long time for a terminal device can be better avoided, thereby better avoiding blocking a downlink channel, and improving system resource utilization.

Figure 9:
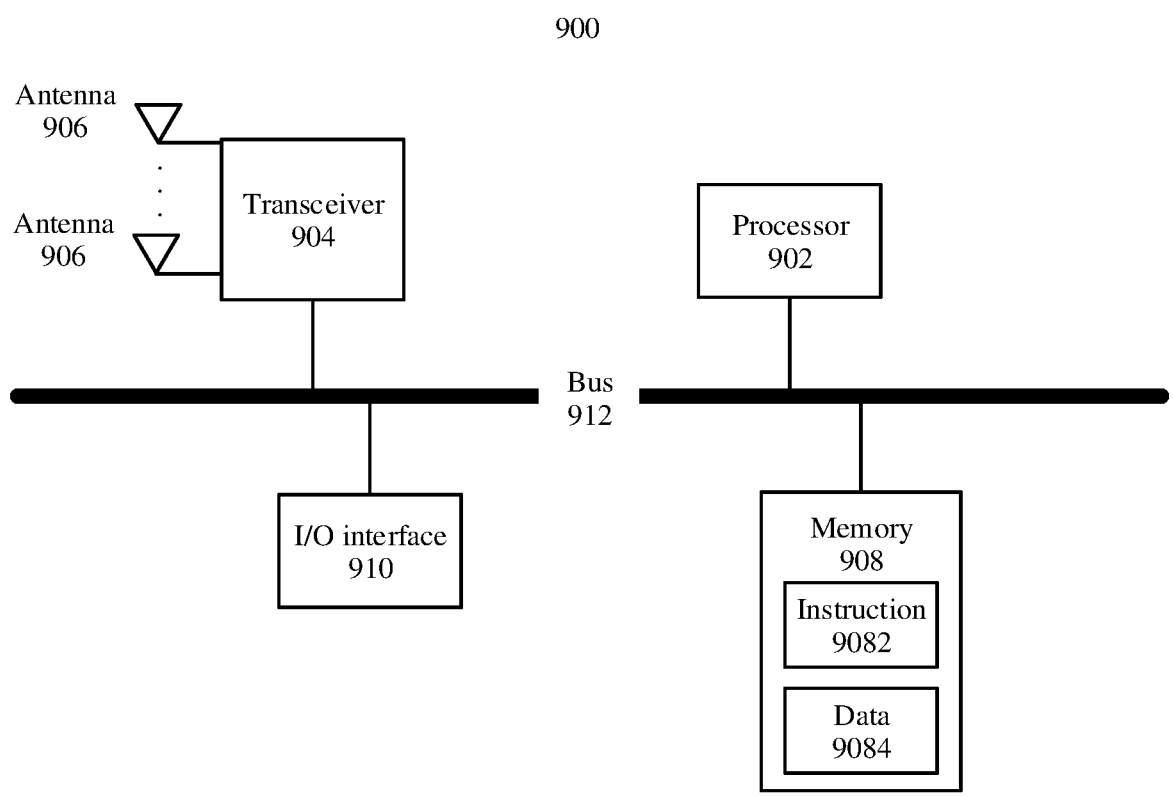
FIG. 9 is a schematic diagram of a hardware structure of a communications device according to an embodiment.

FIG. 9 is a schematic diagram of a hardware structure of a communications device 900 according to an embodiment. The communications device 900 may be a network device or a terminal device. The network device may be an MTC base station. The terminal device may be an MTC device. Referring to FIG. 9, the communications device 900 includes a processor 902, a transceiver 904, a plurality of antennas 906, a memory 908, an input/output (I/O) interface 910, and a bus 912. The processor 902, the transceiver 904, the memory 908, and the I/O interface 910 are communicatively connected to each other by using the bus 912. The plurality of antennas 906 are connected to the transceiver 904. It should be noted that the connection manner between the processor 902, the transceiver 904, the memory 908, and the I/O interface 910 shown in FIG. 9 is merely an example. During implementation, alternatively, the processor 902, the transceiver 904, the memory 908, and the I/O interface 910 may be communicatively connected to each other in another connection manner other than by using the bus 912.

The memory 908 may be configured to store an instruction 9082 and data 9084. The processor 902 may be a general-purpose processor. The general-purpose processor may be a processor that performs a specific step and/or operation by reading and executing an instruction (for example, the instruction 9082) stored in a memory (for example, the memory 908). When performing the step and/or the operation, the general-purpose processor may use data (for example, the data 9084) stored in the memory (for example, the memory 908). For example, the general-purpose processor may be, but is not limited to, a central processing unit (CPU). In addition, the processor 902 may be alternatively a dedicated processor. The dedicated processor may be a specially designed processor configured to perform a specific step and/or operation. For example, the dedicated processor may be, but is not limited to, a digital signal processor (DSP), an application-specific integrated circuit (ASIC), or a field programmable gate array (FPGA). In addition, the processor 902 may be alternatively a combination of a plurality of processors, for example, a multi-core processor. The processor 902 may include at least one circuit, to perform all or some of the steps in the data transmission method provided in the foregoing embodiments.

The transceiver 904 is configured to send and receive signals. Optionally, the transceiver 904 sends and receives signals by using at least one of the plurality of antennas 906. The transceiver 904 is used for the communications device 900 to communicate with another communications device. When the communications device 900 is a network device, the another communications device may be a terminal device. When the communications device 900 is a terminal device, the another communications device may be a network device.

The memory 908 may be various types of storage media, for example, a random access memory (RAM), a ROM, a non-volatile RAM (NVRAM), a programmable ROM (PROM), an erasable PROM (EPROM), an electrically erasable PROM (EEPROM), a flash memory, an optical memory, and a register. The memory 908 is configured to store the instruction 9082 and the data 9084. When the processor 902 is a general-purpose processor, the processor 902 may perform a specific step and/or operation by reading and executing the instruction 9082 stored in the memory 908. The data 9084 may need to be used in a process of performing the step and/or the operation.

The I/O interface 910 is configured to receive an instruction and/or data from a peripheral device and output an instruction and/or data to the peripheral device.

During specific implementation, for example, the processor 902 may be configured to perform baseband-related processing, and the transceiver 904 may be configured to perform radio frequency sending and receiving, but this does not constitute a limitation. The foregoing components may be separately disposed on chips independent of each other, or at least some or all of the components may be disposed on one chip. For example, the processor 902 may be further divided into an analog baseband processor and a digital baseband processor. The analog baseband processor and the transceiver 904 may be integrated on one chip, and the digital baseband processor may be disposed on an independent chip. With continuous development of integrated circuit technologies, an increasing quantity of components may be integrated on one chip. For example, the digital baseband processor and a plurality of application processors (for example, but not limited to a graphics processing unit and a multimedia processor) may be integrated on one chip. The chip may be referred to as a system-on-a-chip (system on chip). Whether to separately dispose the components on different chips or integrate the components on one or more chips depends on a specific product design requirement. Specific implementation forms of the foregoing components are not limited in this embodiment.

It should be noted that the communications device 900 shown in FIG. 9 is merely an example. During specific implementation, the communications device 900 may further include other hardware components, which are not listed one by one herein.

An embodiment provides a data transmission system. In a possible implementation, the data transmission system includes the network device 700 provided in the embodiment shown in FIG. 7 and the terminal device 800 provided in the embodiment shown in FIG. 8. In another possible implementation, the data transmission system includes a network device and a terminal device, and either or both of the network device and the terminal device may be the communications device provided in the embodiment shown in FIG. 9.

An embodiment provides a computer-readable storage medium. The computer-readable storage medium stores an instruction. When the instruction is run on a processing component of a computer, the processing component is enabled to perform step 601 to step 605 in the data transmission method provided in the embodiment shown in FIG. 6A, or the processing component is enabled to perform step 606 to step 610 in the data transmission method provided in the embodiment shown in FIG. 6A and FIG. 6B.

An embodiment provides a computer program product including an instruction. When the computer program product is run on a computer, the computer is enabled to perform step 601 to step 605 in the data transmission method provided in the embodiment shown in FIG. 6A, or the computer is enabled to perform step 606 to step 610 in the data transmission method provided in the embodiment shown in FIG. 6A and FIG. 6B.

An embodiment provides a chip. The chip includes a programmable logic circuit and/or a program instruction. When the chip runs, the chip is configured to implement step 601 to step 605 in the data transmission method provided in the embodiment shown in FIG. 6A, or implement step 606 to step 610 in the data transmission method provided in the embodiment shown in FIG. 6A and FIG. 6B.

An embodiment provides a processing apparatus. The processing apparatus includes at least one circuit. The at least one circuit is configured to perform step 601 to step 605 in the data transmission method provided in the embodiment shown in FIG. 6A, or the at least one circuit is configured to perform step 606 to step 610 in the data transmission method provided in the embodiment shown in FIG. 6A and FIG. 6B.

An embodiment provides a processing apparatus. The processing apparatus is configured to implement the data transmission method provided in the embodiment shown in FIG. 6A and FIG. 6B.

Figure 10A:
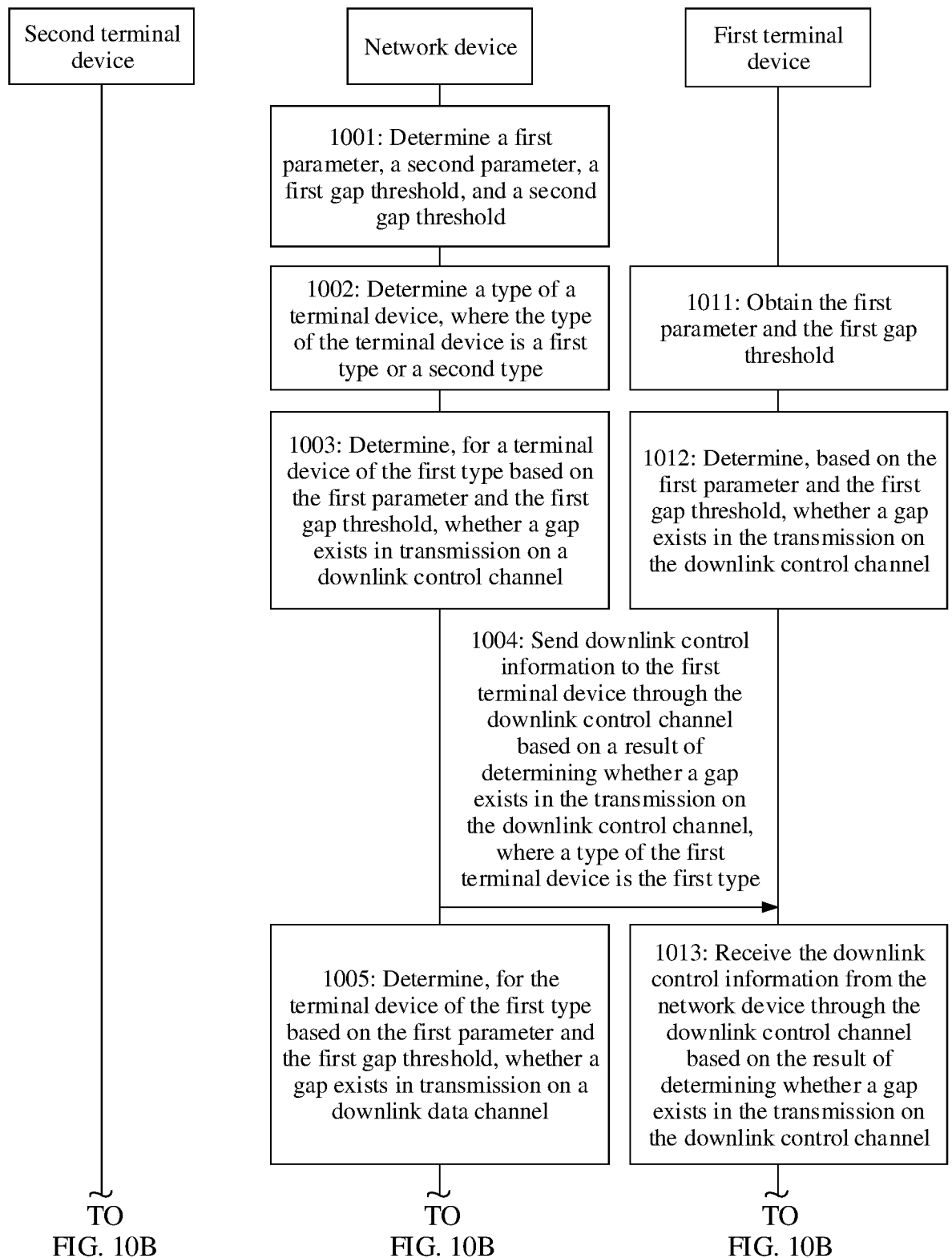
Figure 10B:
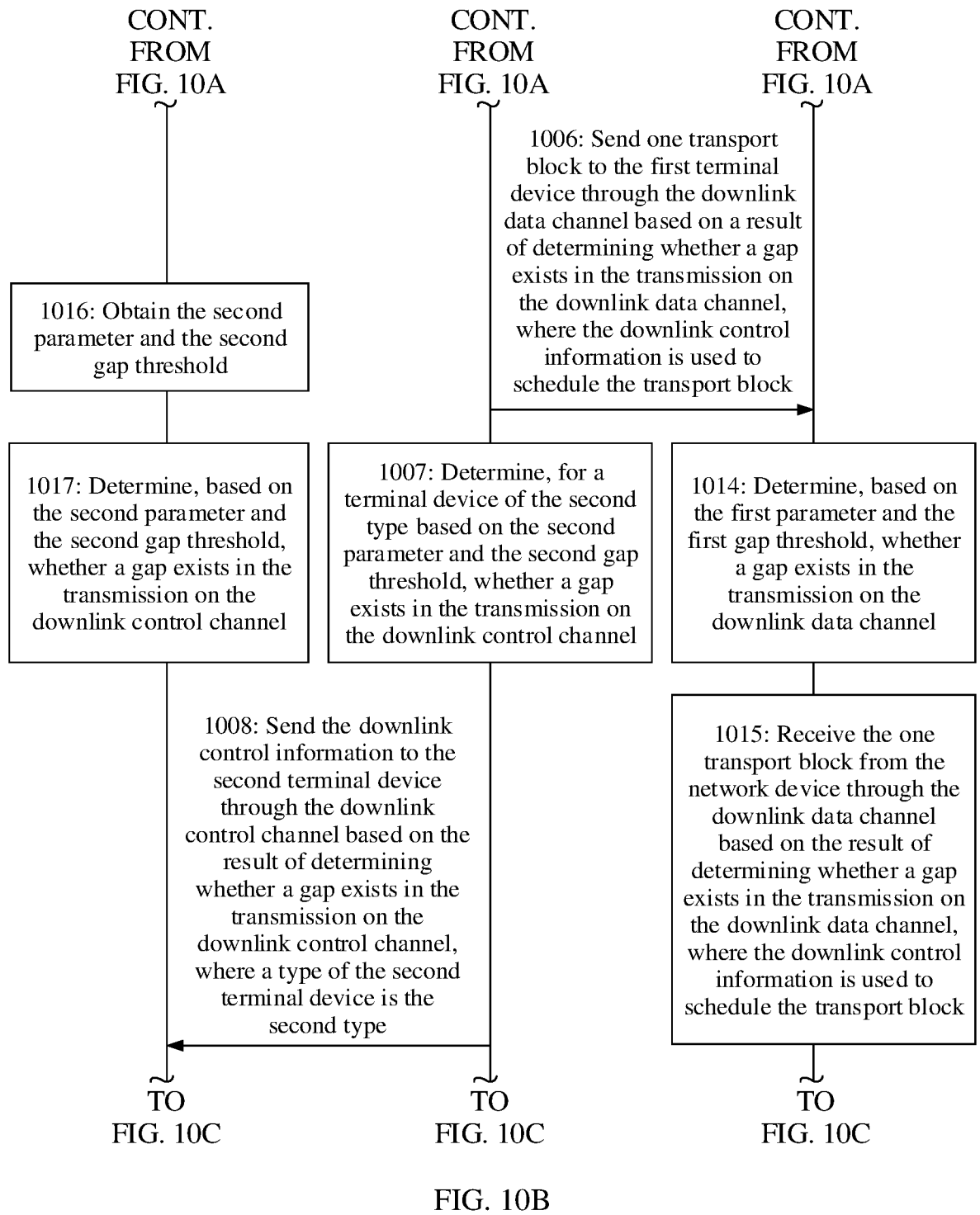

FIG. 10A to FIG. 10C are a method flowchart of a data transmission method according to an embodiment. The data transmission method may be used in the implementation environment shown in FIG. 5. Referring to FIG. 10A to FIG. 10C, the method includes the following steps.

Step 1001: A network device determines a first parameter, a second parameter, a first gap threshold, and a second gap threshold.

Similar to step 601, in this embodiment, that the network device determines the first parameter, the second parameter, the first gap threshold, and the second gap threshold may include the following two possible implementations.

In a first implementation, the first parameter is the same as the second parameter, and the first gap threshold is different from the second gap threshold. The first parameter is a maximum quantity of repetitions of a physical downlink control channel search space, the first gap threshold and the second gap threshold are configured by a system, and the first gap threshold is different from the second gap threshold. Alternatively, the first gap threshold is configured by a system, and the second gap threshold is determined based on the first gap threshold and a maximum quantity of transport blocks that can be scheduled by downlink control information.

In the first implementation, that the network device determines the first parameter, the second parameter, the first gap threshold, and the second gap threshold may include the following two possible cases.

In a first case, the first parameter is the same as the second parameter, and the first gap threshold is different from the second gap threshold. The first parameter is the maximum quantity of repetitions of the physical downlink control channel search space, and the first gap threshold and the second gap threshold are configured by the system. For the first case, refer to the first case in the first implementation in step 601. Details are not described herein again in this embodiment.

In a second case, the first parameter is the same as the second parameter, the first gap threshold is different from the second gap threshold, the first parameter is the maximum quantity of repetitions of the physical downlink control channel search space, the first gap threshold is configured by the system, and the second gap threshold is determined based on the first gap threshold and the maximum quantity of transport blocks that can be scheduled by the downlink control information. For the second case, refer to the third case in the first implementation in step 601. Details are not described herein again in this embodiment.

It should be noted that, in the first implementation of step 1001, the maximum quantity of repetitions of the physical downlink control channel search space may be a maximum quantity of repetitions of a physical downlink control channel search space used by a terminal device of a first type, or may be a maximum quantity of repetitions of a physical downlink control channel search space used by a terminal device of a second type, or may be a maximum value of a maximum quantity of repetitions of a physical downlink control channel search space used by a terminal device of a first type and a maximum quantity of repetitions of a physical downlink control channel search space used by a terminal device of a second type. This is not limited in this embodiment.

In a second implementation, the first parameter is different from the second parameter, and the first gap threshold is the same as the second gap threshold, or the first gap threshold is different from the second gap threshold. The first parameter is a first quantity of repetitions. The first quantity of repetitions is the maximum quantity of repetitions of the physical downlink control channel search space used by the terminal device of the first type. The second parameter is a second quantity of repetitions. The second quantity of repetitions is the maximum quantity of repetitions of the physical downlink control channel search space used by the terminal device of the second type. The first gap threshold and the second gap threshold are configured by a system. Alternatively, the first gap threshold is configured by a system, and the second gap threshold is determined based on the first gap threshold and a maximum quantity of transport blocks that can be scheduled by downlink control information.

In the second implementation, that the network device determines the first parameter, the second parameter, the first gap threshold, and the second gap threshold may include the following two possible cases.

In a first case, the first parameter is different from the second parameter, the first gap threshold is the same as the second gap threshold, or the first gap threshold is different from the second gap threshold, the first parameter is the first quantity of repetitions, the second parameter is the second quantity of repetitions, and the first gap threshold and the second gap threshold are configured by the system.

The network device may determine the maximum quantity of repetitions $R_{max\ 1}$ of the physical downlink control channel search space used by the terminal device of the first type, the maximum quantity of repetitions $R_{max\ 2}$ of the physical downlink control channel search space used by the terminal device of the second type, and gap configuration parameters; determine the maximum quantity of repetitions $R_{max\ 1}$ of the physical downlink control channel search space used by the terminal device of the first type as the first parameter; and determine the maximum quantity of repetitions $R_{max\ 2}$ of the physical downlink control channel search space used by the terminal device of the second type as the second parameter. The gap configuration parameters may include the first gap threshold $N_{gap,\ threshold\ 1}$ and the second gap threshold $N_{gap,\ threshold\ 2}$ that are configured by the system. The first gap threshold $N_{gap,\ threshold\ 1}$ is the same as or different from the second gap threshold $N_{gap,\ threshold\ 2}$.

In a second case, the first parameter is different from the second parameter, the first gap threshold is the same as the second gap threshold, or the first gap threshold is different from the second gap threshold, the first parameter is the first quantity of repetitions, the second parameter is the second quantity of repetitions, the first gap threshold is configured by the system, and the second gap threshold is determined based on the first gap threshold and the maximum quantity of transport blocks that can be scheduled by the downlink control information.

The network device may determine the maximum quantity of repetitions $R_{max\ 1}$ of the physical downlink control channel search space used by the terminal device of the first type, the $R_{max\ 1}$ of the maximum quantity of repetitions $R_{max\ 2}$ of the physical downlink control channel search space used by the terminal device of the second type, gap configuration parameters, and the maximum quantity $N_{TB,\ max}$ of transport blocks that can be scheduled by the downlink control information; determine the maximum quantity of repetitions $R_{max\ 1}$ of the physical downlink control channel search space used by the terminal device of the first type as the first parameter; and determine the maximum quantity of repetitions $R_{max\ 2}$ of the physical downlink control channel search space used by the terminal device of the second type as the second parameter. The gap configuration parameters may include the first gap threshold $N_{gap,\ threshold\ 1}$ configured by the system. The network device determines the second gap threshold based on the first gap threshold $N_{gap,\ threshold\ 1}$ and the maximum quantity $N_{TB,\ max}$ of transport blocks that can be scheduled by the downlink control information.

For a process of determining the second gap threshold by the network device based on the first gap threshold $N_{gap,\ threshold\ 1}$ and the maximum quantity $N_{TB,\ max}$ of transport blocks that can be scheduled by the downlink control information, refer to step 601 in the embodiment shown in FIG. 6A. Details are not described herein again in this embodiment. However, it should be noted that, in step 1001, if the network device determines $N_{gap,\ threshold\ 1}/$ $N_{TB,\ max}$ as the second gap threshold, when the maximum quantity $N_{TB,\ max}$ of transport blocks that can be scheduled by the downlink control information is equal to 1, the first gap threshold is the same as the second gap threshold; or when the maximum quantity $N_{TB,\ max}$ of transport blocks that can be scheduled by the downlink control information is not equal to 1, the first gap threshold is different from the second gap threshold.

Step 1002: The network device determines a type of a terminal device, where the type of the terminal device is a first type or a second type.

The terminal device may report the type of the terminal device to the network device. The network device may receive the type reported by the terminal device and determine the type of the terminal device based on the type reported by the terminal device. The type of the terminal device is the first type or the second type. A terminal device of the first type supports scheduling one transport block by one piece of downlink control information or does not support scheduling a plurality of transport blocks by one piece of downlink control information or does not support scheduling enhancement. A terminal device of the second type supports scheduling a plurality of transport blocks by one piece of downlink control information or supports scheduling enhancement.

Step 1003: The network device determines, for the terminal device of the first type based on the first parameter and the first gap threshold, whether a gap exists in transmission on a downlink control channel.

It can be understood from the descriptions of step 1001 that the first parameter may be the maximum quantity of repetitions of the physical downlink control channel search space or may be the first quantity of repetitions. In this embodiment, when the first parameter is the maximum quantity of repetitions of the physical downlink control channel search space, that the network device determines, for the terminal device of the first type based on the first parameter and the first gap threshold, whether a gap exists in transmission on a downlink control channel may include: the network device compares the maximum quantity of repetitions $R_{max}$ of the physical downlink control channel search space with the first gap threshold, to determine whether a gap exists in the transmission on the downlink control channel. When the maximum quantity of repetitions $R_{max}$ of the physical downlink control channel search space is greater than or equal to the first gap threshold, the network device determines that a gap exists in the transmission on the downlink control channel. When the maximum quantity of repetitions $R_{max}$ of the physical downlink control channel search space is less than the first gap threshold, the network device determines that no gap exists in the transmission on the downlink control channel. When the first parameter is the first quantity of repetitions, that the network device determines, for the terminal device of the first type based on the first parameter and the first gap threshold, whether a gap exists in transmission on a downlink control channel may include: the network device compares the first quantity of repetitions with the first gap threshold, to determine whether a gap exists in the transmission on the downlink control channel. When the first quantity of repetitions is greater than or equal to the first gap threshold, the network device determines that a gap exists in the transmission on the downlink control channel. When the first quantity of repetitions is less than the first gap threshold, the network device determines that no gap exists in the transmission on the downlink control channel.

For the two possible implementations in step 1001, step 1003 may include the following two possible implementations.

In a first implementation, the first parameter is the maximum quantity of repetitions $R_{max}$ of the physical downlink control channel search space, and the first gap threshold is configured by the system.

Optionally, the first gap threshold is configured by the system, and the first gap threshold may be $N_{gap,\ threshold\ 1}$. When the maximum quantity of repetitions $R_{max}$ of the physical downlink control channel search space is greater than or equal to $N_{gap,\ threshold\ 1}$, the network device determines that a gap exists in the transmission on the downlink control channel. When the maximum quantity of repetitions $R_{max}$ of the physical downlink control channel search space is less than $N_{gap,\ threshold\ 1}$, the network device determines that no gap exists in the transmission on the downlink control channel.

For example, the downlink control channel is an NPDCCH. In this case, a relationship between the first parameter $R_{max}$, the first gap threshold $N_{gap,\ threshold\ 1}$, and whether a gap exists in transmission on the NPDCCH may be shown in Table 5 below.

TABLE 5

| Relationship between $R_{max}$ and $N_{gap,\ threshold\ 1}$ | Whether a gap exists in the transmission on the NPDCCH |
|---|---|
| $R_{max} \geq N_{gap,\ threshold\ 1}$ | A gap exists. |
| $R_{max} < N_{gap,\ threshold\ 1}$ | No gap exists. |

In a second implementation, the first parameter is the first quantity of repetitions, and the first gap threshold is configured by the system.

The first parameter is the first quantity of repetitions. The first quantity of repetitions is the maximum quantity of repetitions $R_{max\ 1}$ of the physical downlink control channel search space used by the terminal device of the first type. The first gap threshold is configured by the system, and the first gap threshold may be $N_{gap,\ threshold\ 1}$. When the maximum quantity of repetitions $R_{max\ 1}$ of the physical downlink control channel search space used by the terminal device of the first type is greater than or equal to $N_{gap,\ threshold\ 1}$, the network device determines that a gap exists in the transmission on the downlink control channel. When the maximum quantity of repetitions $R_{max\ 1}$ of the physical downlink control channel search space used by the terminal device of the first type is less than $N_{gap,\ threshold\ 1}$, the network device determines that no gap exists in the transmission on the downlink control channel.

For example, the downlink control channel is an NPDCCH. In this case, a relationship between the first parameter $R_{max\ 1}$, the first gap threshold $N_{gap,\ threshold\ 1}$, and whether a gap exists in transmission on the NPDCCH may be shown in Table 6 below.

TABLE 6

| Relationship between $R_{max\ 1}$ and $N_{gap,\ threshold\ 1}$ | Whether a gap exists in the transmission on the NPDCCH |
|---|---|
| $R_{max\ 1} \geq N_{gap,\ threshold\ 1}$ | A gap exists. |
| $R_{max\ 1} < N_{gap,\ threshold\ 1}$ | No gap exists. |

Step 1004: The network device sends downlink control information to a first terminal device through the downlink control channel based on a result of determining whether a gap exists in the transmission on the downlink control channel, where a type of the first terminal device is the first type.

For an implementation process of step 1004, refer to step 603 in the embodiment shown in FIG. 6A. Details are not described herein again in this embodiment.

Step 1005: The network device determines, for the terminal device of the first type based on the first parameter and the first gap threshold, whether a gap exists in transmission on a downlink data channel.

It can be understood from the descriptions of step 1001 that the first parameter may be the maximum quantity of repetitions of the physical downlink control channel search space or may be the first quantity of repetitions. In this embodiment, when the first parameter is the maximum quantity of repetitions of the physical downlink control channel search space, that the network device determines, for the terminal device of the first type based on the first parameter and the first gap threshold, whether a gap exists in transmission on a downlink data channel may include: the network device compares the maximum quantity of repetitions $R_{max}$ of the physical downlink control channel search space with the first gap threshold, to determine whether a gap exists in the transmission on the downlink data channel. When the maximum quantity of repetitions $R_{max}$ of the physical downlink control channel search space is greater than or equal to the first gap threshold, the network device determines that a gap exists in the transmission on the downlink data channel. When the maximum quantity of repetitions $R_{max}$ of the physical downlink control channel search space is less than the first gap threshold, the network device determines that no gap exists in the transmission on the downlink data channel. When the first parameter is the first quantity of repetitions, that the network device determines, for the terminal device of the first type based on the first parameter and the first gap threshold, whether a gap exists in transmission on a downlink data channel may include: the network device compares the first quantity of repetitions with the first gap threshold, to determine whether a gap exists in the transmission on the downlink data channel. When the first quantity of repetitions is greater than or equal to the first gap threshold, the network device determines that a gap exists in the transmission on the downlink data channel. When the first quantity of repetitions is less than the first gap threshold, the network device determines that no gap exists in the transmission on the downlink data channel.

For a specific implementation process of step 1005, refer to step 1003. Details are not described herein again in this embodiment. It should be noted that, in step 1005, for example, the downlink data channel is an NPDSCH. In this case, a relationship between the first parameter $R_{max}$, the first gap threshold $N_{gap,\ threshold\ 1}$, and whether a gap exists in transmission on the NPDSCH may be shown in Table 7 below.

TABLE 7

| Relationship between $R_{max}$ and $N_{gap,\ threshold\ 1}$ | Whether a gap exists in the transmission on the NPDSCH |
|---|---|
| $R_{max} \geq N_{gap,\ threshold\ 1}$ | A gap exists. |
| $R_{max} < N_{gap,\ threshold\ 1}$ | No gap exists. |

A relationship between the first parameter $R_{max\ 1}$, the first gap threshold $N_{gap,\ threshold\ 1}$, and whether a gap exists in the transmission on the NPDSCH may be shown in Table 8 below.

TABLE 8

| Relationship between $R_{max\ 1}$ and $N_{gap,\ threshold\ 1}$ | Whether a gap exists in the transmission on the NPDSCH |
|---|---|
| $R_{max\ 1} \geq N_{gap,\ threshold\ 1}$ | A gap exists. |
| $R_{max\ 1} < N_{gap,\ threshold\ 1}$ | No gap exists. |

Step 1006: The network device sends one transport block to the first terminal device through the downlink data channel based on a result of determining whether a gap exists in the transmission on the downlink data channel, where the downlink control information is used to schedule the transport block.

The type of the first terminal device is the first type. The network device sends the transport block to the first terminal device through the downlink data channel based on the determining result in step 1005. For an implementation process of step 1006, refer to step 605 in the embodiment shown in FIG. 6A. Details are not described herein again in this embodiment.

Step 1007: The network device determines, for the terminal device of the second type based on the second parameter and the second gap threshold, whether a gap exists in transmission on a downlink control channel.

It can be understood from the descriptions of step 1001 that the second parameter may be the maximum quantity of repetitions of the physical downlink control channel search space, or may be the second quantity of repetitions. In this embodiment, when the second parameter is the maximum quantity of repetitions of the physical downlink control channel search space, that the network device determines, for the terminal device of the second type based on the second parameter and the second gap threshold, whether a gap exists in transmission on a downlink control channel may include: the network device compares the maximum quantity of repetitions $R_{max}$ of the physical downlink control channel search space with the second gap threshold, to determine whether a gap exists in the transmission on the downlink control channel. When the maximum quantity of repetitions $R_{max}$ of the physical downlink control channel search space is greater than or equal to the second gap threshold, the network device determines that a gap exists in the transmission on the downlink control channel. When the maximum quantity of repetitions $R_{max}$ of the physical downlink control channel search space is less than the second gap threshold, the network device determines that no gap exists in the transmission on the downlink control channel. When the second parameter is the second quantity of repetitions, that the network device determines, for the terminal device of the second type based on the second parameter and the second gap threshold, whether a gap exists in transmission on a downlink control channel may include: the network device compares the second quantity of repetitions with the second gap threshold, to determine whether a gap exists in the transmission on the downlink control channel. When the second quantity of repetitions is greater than or equal to the second gap threshold, the network device determines that a gap exists in the transmission on the downlink control channel. When the second quantity of repetitions is less than the second gap threshold, the network device determines that no gap exists in the transmission on the downlink control channel.

For the two possible implementations in step 1001, step 1007 may include the following two possible implementations.

In a first implementation, the second parameter is the maximum quantity of repetitions $R_{max}$ of the physical downlink control channel search space, and the second gap threshold is configured by the system, or the second gap threshold is determined based on the first gap threshold and the maximum quantity of transport blocks that can be scheduled by the downlink control information.

Optionally, the second gap threshold is configured by the system, and the second gap threshold may be $N_{gap,\ threshold\ 2}$. When the maximum quantity of repetitions $R_{max}$ of the physical downlink control channel search space is greater than or equal to $N_{gap,\ threshold\ 2}$, the network device determines that a gap exists in the transmission on the downlink control channel. When the maximum quantity of repetitions $R_{max}$ of the physical downlink control channel search space is less than $N_{gap,\ threshold\ 2}$, the network device determines that no gap exists in the transmission on the downlink control channel.

Optionally, the second gap threshold is determined based on the first gap threshold and the maximum quantity of transport blocks that can be scheduled by the downlink control information, and the second gap threshold may be $N_{gap,\ threshold\ 1}/N_{TB,\ max}$. When the maximum quantity of repetitions $R_{max}$ of the physical downlink control channel search space is greater than or equal to $N_{gap,\ threshold\ 1}/N_{TB,\ max}$, the network device determines that a gap exists in the transmission on the downlink control channel. When the maximum quantity of repetitions $R_{max}$ of the physical downlink control channel search space is less than $N_{gap,\ threshold\ 1}/N_{TB,\ max}$, the network device determines that no gap exists in the transmission on the downlink control channel.

For example, the downlink control channel is an NPDCCH. In this case, based on a difference of the second gap threshold, a relationship between the second parameter $R_{max}$, the second gap threshold, and whether a gap exists in transmission on the NPDCCH may be shown in Table 9 below.

TABLE 9

| Relationship between $R_{max}$ and $N_{gap,\ threshold\ 2}$ | Whether a gap exists in the transmission on the NPDCCH |
|---|---|
| $R_{max} \geq N_{gap,\ threshold\ 2}$ | A gap exists. |
| $R_{max} < N_{gap,\ threshold\ 2}$ | No gap exists. |
| $R_{max} \geq N_{gap,\ threshold\ 1}/N_{TB,\ max}$ | A gap exists. |
| $R_{max} < N_{gap,\ threshold\ 1}/N_{TB,\ max}$ | No gap exists. |

In a second implementation, the second parameter is the second quantity of repetitions, and the second gap threshold is configured by the system, or the second gap threshold is determined based on the first gap threshold and the maximum quantity of transport blocks that can be scheduled by the downlink control information.

The second parameter is the second quantity of repetitions. The second quantity of repetitions is the maximum quantity of repetitions $R_{max\ 2}$ of the physical downlink control channel search space used by the terminal device of the second type.

Optionally, the second gap threshold is configured by the system, and the second gap threshold may be $N_{gap,\ threshold\ 2}$. When the maximum quantity of repetitions $R_{max\ 2}$ of the physical downlink control channel search space used by the terminal device of the second type is greater than or equal to $N_{gap,\ threshold\ 2}$, the network device determines that a gap exists in the transmission on the downlink control channel. When the maximum quantity of repetitions $R_{max\ 2}$ of the physical downlink control channel search space used by the terminal device of the second type is less than $N_{gap,\ threshold\ 2}$, the network device determines that no gap exists in the transmission on the downlink control channel.

Optionally, the second gap threshold is determined based on the first gap threshold and the maximum quantity of transport blocks that can be scheduled by the downlink control information, and the second gap threshold may be $N_{gap,\ threshold\ 1}/N_{TB,\ max}$. When the maximum quantity of repetitions $R_{max\ 2}$ of the physical downlink control channel search space used by the terminal device of the second type is greater than or equal to $N_{gap,\ threshold\ 1}/N_{TB,\ max}$, the network device determines that a gap exists in the transmission on the downlink control channel. When the maximum quantity of repetitions $R_{max\ 2}$ of the physical downlink control channel search space used by the terminal device of the second type is less than $N_{gap,\ threshold\ 1}/N_{TB,\ max}$, the network device determines that no gap exists in the transmission on the downlink control channel.

For example, the downlink control channel is an NPDCCH. In this case, a relationship between the second parameter $R_{max\ 2}$, the second gap threshold $N_{gap,\ threshold\ 2}$, and whether a gap exists in transmission on the NPDCCH may be shown in Table 10 below.

TABLE 10

| Relationship between $R_{max\ 2}$ and $N_{gap,\ threshold\ 2}$ | Whether a gap exists in the transmission on the NPDCCH |
| --- | --- |
| $R_{max\ 2} \geq N_{gap,\ threshold\ 2}$ | A gap exists. |
| $R_{max\ 2} < N_{gap,\ threshold\ 2}$ | No gap exists. |
| $R_{max\ 2} \geq N_{gap,\ threshold\ 1}/N_{TB,\ max}$ | A gap exists. |
| $R_{max\ 2} < N_{gap,\ threshold\ 1}/N_{TB,\ max}$ | No gap exists. |

Step 1008: The network device sends downlink control information to a second terminal device through the downlink control channel based on a result of determining whether a gap exists in the transmission on the downlink control channel, where a type of the second terminal device is the second type.

For an implementation process of step 1008, refer to step 603 in the embodiment shown in FIG. 6A. Details are not described herein again in this embodiment.

Step 1009: The network device determines, for the terminal device of the second type based on the second parameter and the second gap threshold, whether a gap exists in transmission on a downlink data channel.

It can be understood from the descriptions of step 1001 that the second parameter may be the maximum quantity of repetitions of the physical downlink control channel search space, or may be the second quantity of repetitions. In this embodiment, when the second parameter is the maximum quantity of repetitions of the physical downlink control channel search space, that the network device determines, for the terminal device of the second type based on the second parameter and the second gap threshold, whether a gap exists in transmission on a downlink data channel may include: the network device compares the maximum quantity of repetitions $R_{max}$ of the physical downlink control channel search space with the second gap threshold, to determine whether a gap exists in the transmission on the downlink data channel. When the maximum quantity of repetitions $R_{max}$ of the physical downlink control channel search space is greater than or equal to the second gap threshold, the network device determines that a gap exists in the transmission on the downlink data channel. When the maximum quantity of repetitions $R_{max}$ of the physical downlink control channel search space is less than the second gap threshold, the network device determines that no gap exists in the transmission on the downlink data channel. When the second parameter is the second quantity of repetitions, that the network device determines, for the terminal device of the second type based on the second parameter and the second gap threshold, whether a gap exists in transmission on a downlink data channel may include: the network device compares the second quantity of repetitions with the second gap threshold, to determine whether a gap exists in the transmission on the downlink data channel. When the second quantity of repetitions is greater than or equal to the second gap threshold, the network device determines that a gap exists in the transmission on the downlink data channel. When the second quantity of repetitions is less than the second gap threshold, the network device determines that no gap exists in the transmission on the downlink data channel.

For a specific implementation process of step 1009, refer to step 1007. Details are not described herein again in this embodiment. It should be noted that, in step 1009, for example, the downlink data channel is an NPDSCH. In this case, based on a difference of the second gap threshold, a relationship between the second parameter $R_{max}$ the second gap threshold, and whether a gap exists in transmission on the NPDSCH may be shown in Table 11 below.

TABLE 11

| Relationship between $R_{max\ 2}$ and $N_{gap,\ threshold\ 2}$ | Whether a gap exists in the transmission on the NPDSCH |
| --- | --- |
| $R_{max\ 2} \geq N_{gap,\ threshold\ 2}$ | A gap exists. |
| $R_{max\ 2} < N_{gap,\ threshold\ 2}$ | No gap exists. |
| $R_{max\ 2} \geq N_{gap,\ threshold\ 1}/N_{TB,\ max}$ | A gap exists. |
| $R_{max\ 2} < N_{gap,\ threshold\ 1}/N_{TB,\ max}$ | No gap exists. |

A relationship between the second parameter $R_{max\ 2}$, the second gap threshold, and whether a gap exists in the transmission on the NPDSCH may be shown in Table 12 below.

TABLE 12

| Relationship between $R_{max\ 2}$ and $N_{gap,\ threshold\ 2}$ | Whether a gap exists in the transmission on the NPDSCH |
| --- | --- |
| $R_{max\ 2} \geq N_{gap,\ threshold\ 2}$ | A gap exists. |
| $R_{max\ 2} < N_{gap,\ threshold\ 2}$ | No gap exists. |
| $R_{max\ 2} \geq N_{gap,\ threshold\ 1}/N_{TB,\ max}$ | A gap exists. |
| $R_{max\ 2} < N_{gap,\ threshold\ 1}/N_{TB,\ max}$ | No gap exists. |

Step 1010: The network device sends a plurality of transport blocks to the second terminal device through the downlink data channel based on a result of determining whether a gap exists in the transmission on the downlink data channel, where the downlink control information is used to schedule the plurality of transport blocks.

The type of the second terminal device is the second type. The network device sends the plurality of transport blocks to the second terminal device through the downlink data channel based on the determining result in step 1009. For an implementation process of step 1010, refer to step 605 in the embodiment shown in FIG. 6A. Details are not described herein again in this embodiment.

Step 1011: The first terminal device obtains the first parameter and the first gap threshold.

The type of the first terminal device is the first type. In this embodiment, corresponding to step 1001, that the first terminal device obtains the first parameter and the first gap threshold may include two possible implementations.

In a first implementation (corresponding to the first implementation in step 1001), the first parameter is the maximum quantity of repetitions of the physical downlink control channel search space, and the first gap threshold is configured by the system.

The first terminal device may receive a system message or RRC signaling sent by the network device. If the first gap threshold $N_{gap,\ threshold\ 1}$ is configured by the network device, the system message or the RRC signaling carries the maximum quantity of repetitions $R_{max}$ of the physical downlink control channel search space and the gap configuration parameters, and the gap configuration parameters include the first gap threshold $N_{gap,\ threshold\ 1}$. The first terminal device can obtain the first parameter and the first gap threshold $N_{gap,\ threshold\ 1}$ by receiving the system message or the RRC signaling. If the first gap threshold $N_{gap,\ threshold\ 1}$ is agreed upon or is defined in the protocol, the first gap threshold $N_{gap,\ threshold\ 1}$ is known to the first terminal device, the system message or the RRC signaling carries the maximum quantity of repetitions $R_{max}$ of the physical downlink control channel search space and the gap configuration parameters, and the gap configuration parameters may not include the first gap threshold $N_{gap,\ threshold\ 1}$. The first terminal device obtains the first parameter by receiving the system message or the RRC signaling.

It should be noted that, in the first implementation of step 1011, the maximum quantity of repetitions $R_{max}$ of the physical downlink control channel search space may be the maximum quantity of repetitions of the physical downlink control channel search space used by the terminal device of the first type, or may be the maximum quantity of repetitions of the physical downlink control channel search space used by the terminal device of the second type, or may be the maximum value of the maximum quantity of repetitions of the physical downlink control channel search space used by the terminal device of the first type and the maximum quantity of repetitions of the physical downlink control channel search space used by the terminal device of the second type. This is not limited in this embodiment.

In a second implementation (corresponding to the second implementation in step 1001), the first parameter is the first quantity of repetitions, and the first gap threshold is configured by the system.

The first terminal device may receive a system message or RRC signaling sent by the network device. If the first gap threshold $N_{gap,\ threshold\ 1}$ is configured by the network device, the system message or the RRC signaling carries the maximum quantity of repetitions $R_{max\ 1}$ of the physical downlink control channel search space used by the terminal device of the first type and the gap configuration parameters, and the gap configuration parameters include the first gap threshold $N_{gap,\ threshold\ 1}$. The first terminal device can obtain the first parameter and the first gap threshold $N_{gap,\ threshold\ 1}$ by receiving the system message or the RRC signaling. If the first gap threshold $N_{gap,\ threshold\ 1}$ is agreed upon or is defined in the protocol, the first gap threshold $N_{gap,\ threshold\ 1}$ is known to the first terminal device, the system message or the RRC signaling carries the maximum quantity of repetitions $R_{max\ 1}$ of the physical downlink control channel search space used by the terminal device of the first type and the gap configuration parameters, and the gap configuration parameters may not include the first gap threshold $N_{gap,\ threshold\ 1}$. The first terminal device obtains the first parameter by receiving the system message or the RRC signaling.

Step 1012: The first terminal device determines, based on the first parameter and the first gap threshold, whether a gap exists in the transmission on the downlink control channel. For an implementation process of step 1012, refer to step 1003. Details are not described herein again in this embodiment.

Step 1013: The first terminal device receives the downlink control information from the network device through the downlink control channel based on a result of determining whether a gap exists in the transmission on the downlink control channel. The downlink control information is used to schedule the transport block. For an implementation process of step 1013, refer to step 608 in the embodiment shown in FIG. 6B. Details are not described herein again in this embodiment.

Step 1014: The first terminal device determines, based on the first parameter and the first gap threshold, whether a gap exists in the transmission on the downlink data channel. For an implementation process of step 1014, refer to step 1005. Details are not described herein again in this embodiment.

Step 1015: The first terminal device receives the transport block from the network device through the downlink data channel based on a result of determining whether a gap exists in the transmission on the downlink data channel, where the downlink control information is used to schedule the transport block. For an implementation process of step 1015, refer to step 610 in the embodiment shown in FIG. 6B. Details are not described herein again in this embodiment.

Step 1016: The second terminal device obtains the second parameter and the second gap threshold.

The type of the second terminal device is the second type. In this embodiment, corresponding to step 1001, that the second terminal device obtains the second parameter and the second gap threshold may include two possible implementations.

In a first implementation (corresponding to the first implementation in step 1001), the second parameter is the maximum quantity of repetitions of the physical downlink control channel search space, and the second gap threshold is configured by the system; or the second gap threshold is determined based on the first gap threshold and the maximum quantity of transport blocks that can be scheduled by the downlink control information, and the first gap threshold is configured by the system.

In the first implementation, that the second terminal device obtains the second parameter the second gap threshold may include the following two possible cases.

In a first case, the second parameter is the maximum quantity of repetitions $R_{max}$ of the physical downlink control channel search space, and the second gap threshold is configured by the system.

The second terminal device may receive a system message or RRC signaling sent by the network device. If the second gap threshold $N_{gap,\ threshold\ 2}$ is configured by the network device, the system message or the RRC signaling carries the maximum quantity of repetitions $R_{max}$ of the physical downlink control channel search space and the gap configuration parameters, and the gap configuration parameters include the second gap threshold $N_{gap,\ threshold\ 2}$. The second terminal device can obtain the second parameter and the second gap threshold $N_{gap,\ threshold\ 2}$ by receiving the system message or the RRC signaling. If the second gap threshold $N_{gap,\ threshold\ 2}$ is agreed upon or is defined in the protocol, the second gap threshold $N_{gap,\ threshold\ 2}$ is known to the second terminal device, the system message or the RRC signaling carries the maximum quantity of repetitions $R_{max}$ of the physical downlink control channel search space and the gap configuration parameters, and the gap configuration parameters may not include the second gap threshold $N_{gap,\ threshold\ 2}$. The second terminal device obtains the second parameter by receiving the system message or the RRC signaling.

In a second case, the second parameter is the maximum quantity of repetitions $R_{max}$ of the physical downlink control channel search space, the second gap threshold is determined based on the first gap threshold and the maximum quantity of transport blocks that can be scheduled by the downlink control information, and the first gap threshold is configured by the system.

The second terminal device may receive a system message or RRC signaling sent by the network device. If the first gap threshold $N_{gap,\ threshold\ 1}$ is configured by the network device, the system message or the RRC signaling carries the maximum quantity of repetitions $R_{max}$ of the physical downlink control channel search space and the gap configuration parameters, and the gap configuration parameters include the first gap threshold $N_{gap,\ threshold\ 1}$. The second terminal device can obtain the second parameter and the first gap threshold $N_{gap,\ threshold\ 1}$ by receiving the system message or the RRC signaling. The second terminal device determines the second gap threshold based on the first gap threshold $N_{gap,\ threshold\ 1}$ and the maximum quantity $N_{TB,\ max}$ of transport blocks that can be scheduled by the downlink control information. If the first gap threshold $N_{gap,\ threshold\ 1}$ is agreed upon or is defined in the protocol, the first gap threshold $N_{gap,\ threshold\ 1}$ is known to the second terminal device, the system message or the RRC signaling carries the maximum quantity of repetitions $R_{max}$ of the physical downlink control channel search space and the gap configuration parameters, and the gap configuration parameters may not include the first gap threshold $N_{gap,\ threshold\ 1}$. The terminal device obtains the second parameter by receiving the system message or the RRC signaling. The second terminal device determines the second gap threshold based on the first gap threshold $N_{gap,\ threshold\ 1}$ and the maximum quantity $N_{TB,\ max}$ of transport blocks that can be scheduled by the downlink control information.

It should be noted that, in the first implementation of step 1016, the maximum quantity of repetitions $R_{max}$ of the physical downlink control channel search space may be the maximum quantity of repetitions of the physical downlink control channel search space used by the terminal device of the first type, or may be the maximum quantity of repetitions of the physical downlink control channel search space used by the terminal device of the second type, or may be the maximum value of the maximum quantity of repetitions of the physical downlink control channel search space used by the terminal device of the first type and the maximum quantity of repetitions of the physical downlink control channel search space used by the terminal device of the second type. This is not limited in this embodiment.

In a second implementation (corresponding to the second implementation in step 1001), the second parameter is the second quantity of repetitions, and the second gap threshold is configured by the system; or the second gap threshold is determined based on the first gap threshold and the maximum quantity of transport blocks that can be scheduled by the downlink control information, and the first gap threshold is configured by the system.

In the second implementation, that the second terminal device obtains the second parameter the second gap threshold may include the following two possible cases.

In a first case, the second parameter is the second quantity of repetitions, and the second gap threshold is configured by the system.

The second terminal device may receive a system message or RRC signaling sent by the network device. If the second gap threshold $N_{gap,\ threshold\ 2}$ is configured by the network device, the system message or the RRC signaling carries the maximum quantity of repetitions $R_{max\ 2}$ of the physical downlink control channel search space used by the terminal device of the second type and the gap configuration parameters, and the gap configuration parameters include the second gap threshold $N_{gap,\ threshold\ 2}$. The second terminal device can obtain the second parameter and the second gap threshold $N_{gap,\ threshold\ 2}$ by receiving the system message or the RRC signaling. If the second gap threshold $N_{gap,\ threshold\ 2}$ is agreed upon or is defined in the protocol, the second gap threshold $N_{gap,\ threshold\ 2}$ is known to the second terminal device, the system message or the RRC signaling carries the maximum quantity of repetitions $R_{max\ 2}$ of the physical downlink control channel search space used by the terminal device of the second type and the gap configuration parameters, and the gap configuration parameters may not include the second gap threshold $N_{gap,\ threshold\ 2}$. The second terminal device obtains the second parameter by receiving the system message or the RRC signaling.

In a second case, the second parameter is the second quantity of repetitions, the second gap threshold is determined based on the first gap threshold and the maximum quantity of transport blocks that can be scheduled by the downlink control information, and the first gap threshold is configured by the system.

The second terminal device may receive a system message or RRC signaling sent by the network device. If the first gap threshold $N_{gap,\ threshold\ 1}$ is configured by the network device, the system message or the RRC signaling carries the maximum quantity of repetitions $R_{max\ 2}$ of the physical downlink control channel search space used by the terminal device of the second type and the gap configuration parameters, and the gap configuration parameters include the first gap threshold $N_{gap,\ threshold\ 1}$. The second terminal device can obtain the second parameter and the first gap threshold $N_{gap,\ threshold\ 1}$ by receiving the system message or the RRC signaling. The second terminal device determines the second gap threshold based on the first gap threshold $N_{gap,\ threshold\ 1}$ and the maximum quantity $N_{TB,\ max}$ of transport blocks that can be scheduled by the downlink control information. If the first gap threshold $N_{gap,\ threshold\ 1}$ is agreed upon or is defined in the protocol, the first gap threshold $N_{gap,\ threshold\ 1}$ is known to the second terminal device, the system message or the RRC signaling carries the maximum quantity of repetitions $R_{max\ 2}$ of the physical downlink control channel search space used by the terminal device of the second type and the gap configuration parameters, and the gap configuration parameters may not include the first gap threshold $N_{gap,\ threshold\ 1}$. The second terminal device obtains the second parameter by receiving the system message or the RRC signaling. The second terminal device determines the second gap threshold based on the first gap threshold $N_{gap,\ threshold\ 1}$ and the maximum quantity $N_{TB,\ max}$ of transport blocks that can be scheduled by the downlink control information.

It should be noted that, for a process of determining the second gap threshold by the second terminal device based on the first gap threshold $N_{gap,\ threshold\ 1}$ and the maximum quantity $N_{TB,\ max}$ of transport blocks that can be scheduled by the downlink control information in step 1016, reference may be made to step 601 in the embodiment shown in FIG. 6A. Details are not described herein again in this embodiment. However, it should be noted that, if the second terminal device determines $N_{gap,\ threshold\ 1}/N_{TB,\ max}$ as the second gap threshold, when the maximum quantity $N_{TB,\ max}$ of transport blocks that can be scheduled by the downlink control information is equal to 1, the first gap threshold is the same as the second gap threshold; or when the maximum quantity $N_{TB,\ max}$ of transport blocks that can be scheduled by the downlink control information is not equal to 1, the first gap threshold is different from the second gap threshold.

Step 1017: The second terminal device determines, based on the second parameter and the second gap threshold, whether a gap exists in the transmission on the downlink control channel. For an implementation process of step 1017, refer to step 1003. Details are not described herein again in this embodiment.

Step 1018: The second terminal device receives the downlink control information from the network device through the downlink control channel based on a result of determining whether a gap exists in the transmission on the downlink control channel. The downlink control information is used to schedule the plurality of transport blocks. For an implementation process of step 1018, refer to step 608 in the embodiment shown in FIG. 6B. Details are not described herein again in this embodiment.

Step 1019: The second terminal device determines, based on the second parameter and the second gap threshold, whether a gap exists in the transmission on the downlink data channel. For an implementation process of step 1019, refer to step 1005. Details are not described herein again in this embodiment.

Step 1020: The second terminal device receives the plurality of transport blocks from the network device through the downlink data channel based on a result of determining whether a gap exists in the transmission on the downlink data channel, where the downlink control information is used to schedule the plurality of transport blocks. For an implementation process of step 1020, refer to step 610 in the embodiment shown in FIG. 6B. Details are not described herein again in this embodiment.

It should be noted that a sequence of the steps in the data transmission method provided in this embodiment may be properly adjusted, and the steps may also be correspondingly added or deleted according to a situation. All modified methods readily figured out by a person of ordinary skill in the art within the technical scope disclosed in the embodiments shall fall within the protection scope, and details are not described herein again.

Thus, in the data transmission method provided in this embodiment, for the terminal device of the first type, whether a gap exists in the downlink transmission is determined based on the first parameter and the first gap threshold, and the downlink transmission is performed with the terminal device of the first type based on the determining result; and for the terminal device of the second type, whether a gap exists in the downlink transmission is determined based on the second parameter and the second gap threshold, and the downlink transmission is performed with the terminal device of the second type based on the determining result. Therefore, in the solution provided in this embodiment, whether a gap exists in downlink transmission for a terminal device can be determined based on a type of the terminal device. Therefore, in a scenario in which one piece of downlink control information schedules a plurality of transport blocks, continuous downlink transmission that lasts for a relatively long time for a terminal device is avoided, thereby avoiding blocking a downlink channel, and improving system resource utilization.

Figure 11:
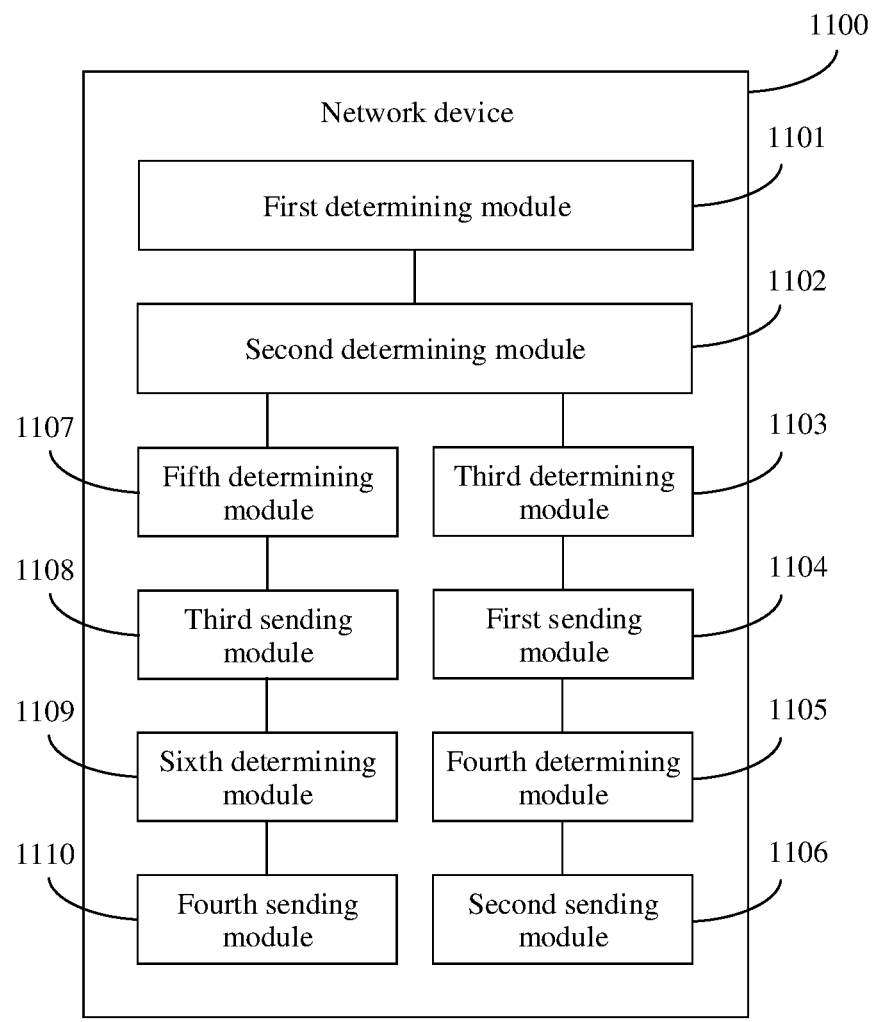
FIG. 11 is a schematic diagram of a logical structure of another network device according to an embodiment.

FIG. 11 is a schematic diagram of a logical structure of another network device 1100 according to an embodiment. The network device 1100 may be a base station, and may be specifically an MTC base station. Referring to FIG. 11, the network device 1100 includes:

a first determining module 1101, configured to determine a first parameter, a second parameter, a first gap threshold, and a second gap threshold;

a second determining module 1102, configured to determine a type of a terminal device, where the type of the terminal device is a first type or a second type;

a third determining module 1103, configured to: for a terminal device of the first type, determine, based on the first parameter and the first gap threshold, whether a gap exists in transmission on a downlink control channel; a first sending module 1104, configured to send downlink control information to the terminal device of the first type through the downlink control channel based on a result of determining whether a gap exists in the transmission on the downlink control channel; a fourth determining module 1105, configured to: for the terminal device of the first type, determine, based on the first parameter and the first gap threshold, whether a gap exists in transmission on a downlink data channel; a second sending module 1106, configured to: send one transport block to the terminal device of the first type through the downlink data channel based on a result of determining whether a gap exists in the transmission on the downlink data channel, where the downlink control information is used to schedule the transport block;

a fifth determining module 1107, configured to: for a terminal device of the second type, determine, based on the second parameter and the second gap threshold, whether a gap exists in transmission on a downlink control channel; a third sending module 1108, configured to send downlink control information to the terminal device of the second type through the downlink control channel based on a result of determining whether a gap exists in the transmission on the downlink control channel; a sixth determining module 1109, configured to: for the terminal device of the second type, determine, based on the second parameter and the second gap threshold, whether a gap exists in transmission on a downlink data channel; and a fourth sending module 1110, configured to: send a plurality of transport blocks to the terminal device of the second type through the downlink data channel based on a result of determining whether a gap exists in the transmission on the downlink data channel, where the downlink control information is used to schedule the plurality of transport blocks.

The first parameter is different from the second parameter, and the first gap threshold is the same as the second gap threshold; or the first parameter is the same as the second parameter, and the first gap threshold is different from the second gap threshold; or the first parameter is different from the second parameter, and the first gap threshold is different from the second gap threshold.

Optionally, the first parameter, the second parameter, the first gap threshold, and the second gap threshold enable, for a same terminal device, a quantity of gaps included in a same time period used for sending the downlink data channel to be not less than a quantity of gaps included in the same time period used for sending the downlink control channel.

Optionally, the first parameter is the same as the second parameter, and the first parameter is a maximum quantity of repetitions of a physical downlink control channel search space.

The third determining module 1103 is configured to: when the maximum quantity of repetitions of the physical downlink control channel search space is greater than or equal to the first gap threshold, determine that a gap exists in the transmission on the downlink control channel; or when the maximum quantity of repetitions of the physical downlink control channel search space is less than the first gap threshold, determine that no gap exists in the transmission on the downlink control channel.

The fourth determining module 1105 is configured to: when the maximum quantity of repetitions of the physical downlink control channel search space is greater than or equal to the first gap threshold, determine that a gap exists in the transmission on the downlink data channel; or when the maximum quantity of repetitions of the physical downlink control channel search space is less than the first gap threshold, determine that no gap exists in the transmission on the downlink data channel.

The fifth determining module 1107 is configured to: when the maximum quantity of repetitions of the physical downlink control channel search space is greater than or equal to the second gap threshold, determine that a gap exists in the transmission on the downlink control channel; or when the maximum quantity of repetitions of the physical downlink control channel search space is less than the second gap threshold, determine that no gap exists in the transmission on the downlink control channel.

The sixth determining module 1109 is configured to: when the maximum quantity of repetitions of the physical downlink control channel search space is greater than or equal to the second gap threshold, determine that a gap exists in the transmission on the downlink data channel; or when the maximum quantity of repetitions of the physical downlink control channel search space is less than the second gap threshold, determine that no gap exists in the transmission on the downlink data channel.

The first gap threshold and the second gap threshold are configured by a system, and the first gap threshold is different from the second gap threshold. Alternatively, the first gap threshold is configured by a system, and the second gap threshold is determined based on the first gap threshold and a maximum quantity of transport blocks that can be scheduled by the downlink control information.

Optionally, the first parameter is different from the second parameter. The first parameter is a first quantity of repetitions. The first quantity of repetitions is a maximum quantity of repetitions of a physical downlink control channel search space used by the terminal device of the first type. The second parameter is a second quantity of repetitions. The second quantity of repetitions is a maximum quantity of repetitions of a physical downlink control channel search space used by the terminal device of the second type.

The third determining module 1103 is configured to: when the first quantity of repetitions is greater than or equal to the first gap threshold, determine that a gap exists in the transmission on the downlink control channel; or when the first quantity of repetitions is less than the first gap threshold, determine that no gap exists in the transmission on the downlink control channel.

The fourth determining module 1105 is configured to: when the first quantity of repetitions is greater than or equal to the first gap threshold, determine that a gap exists in the transmission on the downlink data channel; or when the first quantity of repetitions is less than the first gap threshold, determine that no gap exists in the transmission on the downlink data channel.

The fifth determining module 1107 is configured to: when the second quantity of repetitions is greater than or equal to the second gap threshold, determine that a gap exists in the transmission on the downlink control channel; or when the second quantity of repetitions is less than the second gap threshold, determine that no gap exists in the transmission on the downlink control channel.

The sixth determining module 1109 is configured to: when the second quantity of repetitions is greater than or equal to the second gap threshold, determine that a gap exists in the transmission on the downlink data channel; or when the second quantity of repetitions is less than the second gap threshold, determine that no gap exists in the transmission on the downlink data channel.

The first gap threshold and the second gap threshold are configured by a system, and the first gap threshold is different from the second gap threshold. Alternatively, the first gap threshold is configured by a system, and the second gap threshold is determined based on the first gap threshold and a maximum quantity of transport blocks that can be scheduled by the downlink control information.

It should be noted that the first determining module 1101 is configured to perform step 1001 in the embodiment shown in FIG. 10A, the second determining module 1102 is configured to perform step 1002 in the embodiment shown in FIG. 10A, the third determining module 1103 is configured to perform step 1003 in the embodiment shown in FIG. 10A, the first sending module 1104 is configured to perform step 1004 in the embodiment shown in FIG. 10A, the fourth determining module 1105 is configured to perform step 1005 in the embodiment shown in FIG. 10A, the second sending module 1106 is configured to perform step 1006 in the embodiment shown in FIG. 10B, the fifth determining module 1107 is configured to perform step 1007 in the embodiment shown in FIG. 10B, the third sending module 1108 is configured to perform step 1008 in the embodiment shown in FIG. 10B, the sixth determining module 1109 is configured to perform step 1009 in the embodiment shown in FIG. 10C, and the fourth sending module 1110 is configured to perform step 1010 in the embodiment shown in FIG. 10C. In addition, the first determining module 1101, the second determining module 1102, the third determining module 1103, the fourth determining module 1105, the fifth determining module 1107, and the sixth determining module 1109 may be a same determining module, or may be different determining modules. The first sending module 1104, the second sending module 1106, the third sending module 1108, and the fourth sending module 1110 may be a same sending module or may be different sending modules. This is not limited in this embodiment.

Optionally, the foregoing determining modules may alternatively be one processing module, and the foregoing sending modules may be one sending module. In other words, the processing module performs the determining steps and the like in the foregoing steps, and the sending module performs the sending steps and the like. The processing module may alternatively include a plurality of processing sub-modules.

In conclusion, the network device provided in this embodiment determines, for the terminal device of the first type based on the first parameter and the first gap threshold, whether a gap exists in the downlink transmission, and performs the downlink transmission with the terminal device of the first type based on the determining result; and determines, for the terminal device of the second type based on the second parameter and the second gap threshold, whether a gap exists in the downlink transmission, and performs the downlink transmission with the terminal device of the second type based on the determining result. Therefore, in the solution provided in this embodiment, whether a gap exists in downlink transmission for a terminal device can be determined based on a type of the terminal device. Therefore, in a scenario in which one piece of downlink control information schedules a plurality of transport blocks, continuous downlink transmission that lasts for a relatively long time for a terminal device is avoided, thereby avoiding blocking a downlink channel, and improving system resource utilization.

Figure 12:
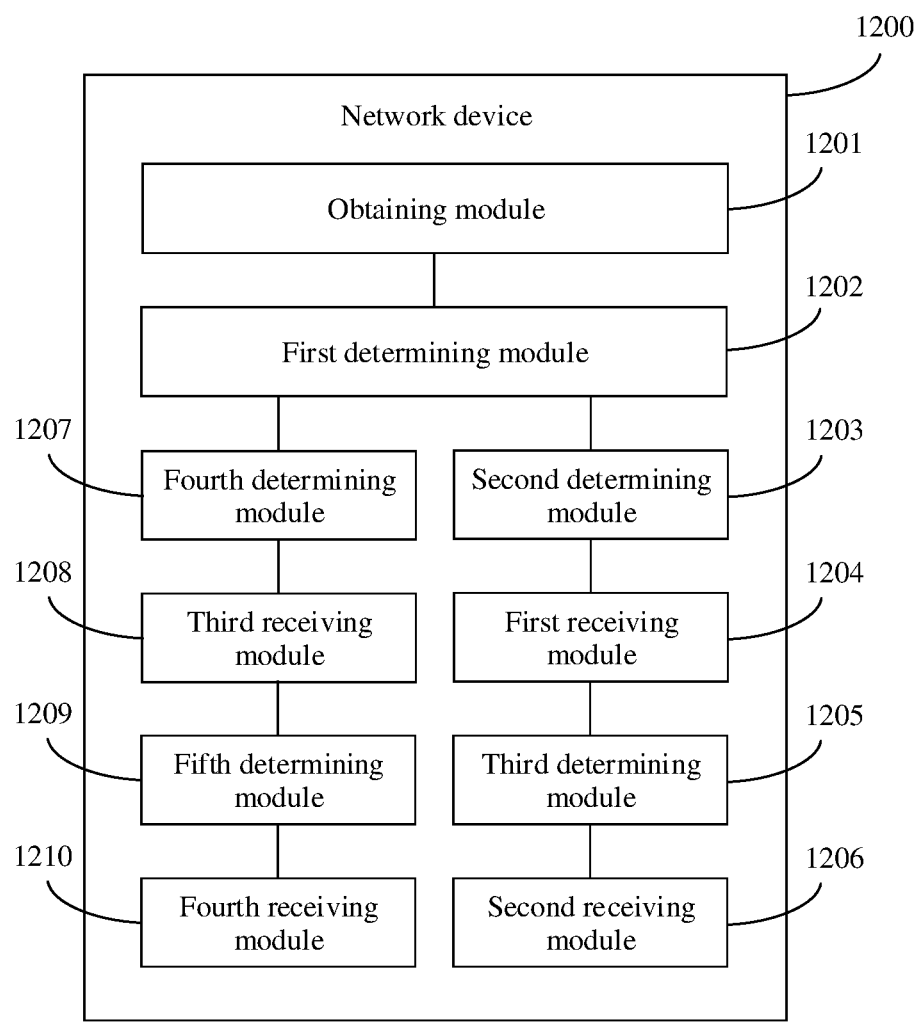
FIG. 12 is a schematic diagram of a logical structure of another terminal device according to an embodiment.

FIG. 12 is a schematic diagram of a logical structure of another terminal device 1200 according to an embodiment. The terminal device 1200 may be user equipment and may be specifically an MTC device. Referring to FIG. 12, the terminal device 1200 includes:

an obtaining module 1201, configured to obtain a first parameter, a second parameter, a first gap threshold, and a second gap threshold;

a first determining module 1202, configured to determine a type of a terminal device, where the type of the terminal device is a first type or a second type;

a second determining module 1203, configured to: when the terminal device is a terminal device of the first type, determine, based on the first parameter and the first gap threshold, whether a gap exists in transmission on a downlink control channel; a first receiving module 1204, configured to receive downlink control information from a network device through the downlink control channel based on a result of determining whether a gap exists in the transmission on the downlink control channel; a third determining module 1205, configured to: when the terminal device is the terminal device of the first type, determine, based on the first parameter and the first gap threshold, whether a gap exists in transmission on a downlink data channel; a second receiving module 1206, configured to: receive one transport block from the network device through the downlink data channel based on a result of determining whether a gap exists in the transmission on the downlink data channel, where the downlink control information is used to schedule the transport block;

a fourth determining module 1207, configured to: when the terminal device is a terminal device of the second type, determine, based on the second parameter and the second gap threshold, whether a gap exists in transmission on a downlink control channel; a third receiving module 1208, configured to receive downlink control information from the network device through the downlink control channel based on a result of determining whether a gap exists in the transmission on the downlink control channel; a fifth determining module 1209, configured to: when the terminal device is the terminal device of the second type, determine, based on the second parameter and the second gap threshold, whether a gap exists in transmission on a downlink data channel; and a fourth receiving module 1210, configured to: receive a plurality of transport blocks from the network device through the downlink data channel based on a result of determining whether a gap exists in the transmission on the downlink data channel, where the downlink control information is used to schedule the plurality of transport blocks.

The first parameter is different from the second parameter, and the first gap threshold is the same as the second gap threshold; or the first parameter is the same as the second parameter, and the first gap threshold is different from the second gap threshold; or the first parameter is different from the second parameter, and the first gap threshold is different from the second gap threshold.

Optionally, the first parameter, the second parameter, the first gap threshold, and the second gap threshold enable, for a same terminal device, a quantity of gaps included in a same time period used for receiving the downlink data channel to be not less than a quantity of gaps included in the same time period used for receiving the downlink control channel.

Optionally, the first parameter is the same as the second parameter, and the first parameter is a maximum quantity of repetitions of a physical downlink control channel search space. The second determining module 1203 is configured to: when the maximum quantity of repetitions of the physical downlink control channel search space is greater than or equal to the first gap threshold, determine that a gap exists in the transmission on the downlink control channel; or when the maximum quantity of repetitions of the physical downlink control channel search space is less than the first gap threshold, determine that no gap exists in the transmission on the downlink control channel.

The third determining module 1205 is configured to: when the maximum quantity of repetitions of the physical downlink control channel search space is greater than or equal to the first gap threshold, determine that a gap exists in the transmission on the downlink data channel; or when the maximum quantity of repetitions of the physical downlink control channel search space is less than the first gap threshold, determine that no gap exists in the transmission on the downlink data channel.

The fourth determining module 1207 is configured to: when the maximum quantity of repetitions of the physical downlink control channel search space is greater than or equal to the second gap threshold, determine that a gap exists in the transmission on the downlink control channel; or when the maximum quantity of repetitions of the physical downlink control channel search space is less than the second gap threshold, determine that no gap exists in the transmission on the downlink control channel.

The fifth determining module 1209 is configured to: when the maximum quantity of repetitions of the physical downlink control channel search space is greater than or equal to the second gap threshold, determine that a gap exists in the transmission on the downlink data channel; or when the maximum quantity of repetitions of the physical downlink control channel search space is less than the second gap threshold, determine that no gap exists in the transmission on the downlink data channel.

The first gap threshold and the second gap threshold are configured by a system, and the first gap threshold is different from the second gap threshold. Alternatively, the first gap threshold is configured by a system, and the second gap threshold is determined based on the first gap threshold and a maximum quantity of transport blocks that can be scheduled by the downlink control information.

Optionally, the first parameter is different from the second parameter. The first parameter is a first quantity of repetitions. The first quantity of repetitions is a maximum quantity of repetitions of a physical downlink control channel search space used by the terminal device of the first type. The second parameter is a second quantity of repetitions. The second quantity of repetitions is a maximum quantity of repetitions of a physical downlink control channel search space used by the terminal device of the second type.

The second determining module 1203 is configured to: when the first quantity of repetitions is greater than or equal to the first gap threshold, determine that a gap exists in the transmission on the downlink control channel; or when the first quantity of repetitions is less than the first gap threshold, determine that no gap exists in the transmission on the downlink control channel.

The third determining module 1205 is configured to: when the first quantity of repetitions is greater than or equal to the first gap threshold, determine that a gap exists in the transmission on the downlink data channel; or when the first quantity of repetitions is less than the first gap threshold, determine that no gap exists in the transmission on the downlink data channel.

The fourth determining module 1207 is configured to: when the second quantity of repetitions is greater than or equal to the second gap threshold, determine that a gap exists in the transmission on the downlink control channel; or when the second quantity of repetitions is less than the second gap threshold, determine that no gap exists in the transmission on the downlink control channel.

The fifth determining module 1209 is configured to: when the second quantity of repetitions is greater than or equal to the second gap threshold, determine that a gap exists in the transmission on the downlink data channel; or when the second quantity of repetitions is less than the second gap threshold, determine that no gap exists in the transmission on the downlink data channel.

The first gap threshold and the second gap threshold are configured by a system, and the first gap threshold is different from the second gap threshold. Alternatively, the first gap threshold is configured by a system, and the second gap threshold is determined based on a maximum quantity of transport blocks that can be scheduled by the downlink control information.

It should be noted that the obtaining module 1201 is configured to perform step 1001 and/or step 1016 in the embodiment shown in FIG. 10A and FIG. 10B.

The second determining module 1203 is configured to perform step 1012 in the embodiment shown in FIG. 10A, the first receiving module 1204 is configured to perform step 1013 in the embodiment shown in FIG. 10A, the third determining module 1205 is configured to perform step 1014 in the embodiment shown in FIG. 10B, the second receiving module 1206 is configured to perform step 1015 in the embodiment shown in FIG. 10B, the fourth determining module 1207 is configured to perform step 1017 in the embodiment shown in FIG. 10B, the third receiving module 1208 is configured to perform step 1018 in the embodiment shown in FIG. 10C, the fifth determining module 1209 is configured to perform step 1019 in the embodiment shown in FIG. 10C, and the fourth receiving module 1210 is configured to perform step 1020 in the embodiment shown in FIG. 10C. In addition, the second determining module 1203 and the third determining module 1205 may be a same determining module or may be different determining modules. The first receiving module 1204 and the second receiving module 1206 may be a same receiving module or may be different receiving modules. The fourth determining module 1207 and the fifth determining module 1209 may be a same determining module or may be different determining modules. The third receiving module 1208 and the fourth receiving module 1210 may be a same receiving module or may be different receiving modules. This is not limited in this embodiment.

Optionally, similar to those on the network device side, the foregoing determining modules and obtaining module on the terminal device side may alternatively be one processing module, and the foregoing receiving modules may be one receiving module. In other words, the processing module performs the determining and obtaining steps and the like in the foregoing steps, and the receiving module performs the receiving steps and the like. The processing module may alternatively include a plurality of processing sub-modules.

Therefore, when the terminal device provided in this embodiment is the terminal device of the first type, the terminal device determines, based on the first parameter and the first gap threshold, whether a gap exists in the downlink transmission, and performs the downlink transmission with the network device based on the determining result; and when the terminal device is the terminal device of the second type, the terminal device determines, based on the second parameter and the second gap threshold, whether a gap exists in the downlink transmission, and performs the downlink transmission with the network device based on the determining result. Therefore, in the solution provided in this embodiment, whether a gap exists in downlink transmission for a terminal device can be determined based on a type of the terminal device. Therefore, in a scenario in which one piece of downlink control information schedules a plurality of transport blocks, continuous downlink transmission that lasts for a relatively long time for a terminal device is avoided, thereby avoiding blocking a downlink channel, and improving system resource utilization.

An embodiment further provides a communications device. A hardware structure of the communications device is shown in FIG. 9. The communications device may be a network device or a terminal device, the network device may be an MTC base station, and the terminal device may be an MTC device. The communications device is configured to perform all or some of the steps in the embodiment shown in FIG. 10A to FIG. 10C.

An embodiment provides a data transmission system. In a possible implementation, the data transmission system includes the network device 1100 provided in the embodiment shown in FIG. 11 and the terminal device 1200 provided in the embodiment shown in FIG. 12. In another possible implementation, the data transmission system includes a network device and a terminal device, and either or both of the network device and the terminal device may be the communications device provided in the embodiment shown in FIG. 9.

An embodiment provides a computer-readable storage medium. The computer-readable storage medium stores an instruction. When the instruction is run on a processing component of a computer, the processing component is enabled to perform all or some of the steps in the data transmission method provided in the embodiment shown in FIG. 10A to FIG. 10C.

An embodiment provides a computer program product including an instruction. When the computer program product runs on a computer, the computer is enabled to perform some or all of the steps in the data transmission method provided in the embodiment shown in FIG. 10A to FIG. 10C.

An embodiment provides a chip. The chip includes a programmable logic circuit and/or a program instruction. When the chip runs, the chip is configured to implement some or all of the steps in the data transmission method provided in the embodiment shown in FIG. 10A to FIG. 10C.

An embodiment provides a processing apparatus. The processing apparatus includes at least one circuit, and the at least one circuit is configured to perform all or some of the steps in the data transmission method provided in the embodiment shown in FIG. 10A to FIG. 10C.

An embodiment provides a processing apparatus. The processing apparatus is configured to implement the data transmission method provided in the embodiment shown in FIG. 10A to FIG. 10C.

The sequence numbers of the foregoing embodiments are merely for illustrative purpose, and are not intended to indicate priorities or limitations of the embodiments.

A person of ordinary skill in the art may understand that all or some of the steps in the embodiments may be implemented by hardware or a program instructing related hardware. The program may be stored in a computer-readable storage medium, and the storage medium may include a read-only memory, a magnetic disk, a compact disc, or the like.

The foregoing descriptions are merely optional embodiments of the embodiments, and are non-limiting. Any modification, equivalent replacement, or improvement made without departing from the spirit and principle of the embodiments shall fall within the scope of the embodiments.

What is claimed is:

1. A data transmission method, comprising:
   determining a first parameter, a second parameter, a first gap threshold, and a second gap threshold;
   determining, based on the first parameter and the first gap threshold, whether a gap exists in transmission on a downlink control channel;
   sending downlink control information to a terminal device through the downlink control channel based on a result of determining whether a gap exists in the transmission on the downlink control channel;
   determining, based on the second parameter and the second gap threshold, whether a gap exists in transmission on a downlink data channel;
   sending one or more transport blocks to the terminal device through the downlink data channel based on a result of determining whether a gap exists in the transmission on the downlink data channel, wherein the downlink control information is used to schedule the one or more transport blocks; and
   the first parameter is different from the second parameter, and the first gap threshold is the same as the second gap threshold; or
   the first parameter is the same as the second parameter, and the first gap threshold is different from the second gap threshold; or
   the first parameter is different from the second parameter, and the first gap threshold is different from the second gap threshold.

2. The method according to claim 1, wherein the first parameter, the second parameter, the first gap threshold, and the second gap threshold enable a quantity of gaps comprised in a same time period used for sending the downlink data channel to be not less than a quantity of gaps comprised in the same time period used for sending the downlink control channel.

3. The method according to claim 1, wherein the first parameter is the same as the second parameter, and the first parameter is a maximum quantity of repetitions of a physical downlink control channel search space;
   the determining, based on the first parameter and the first gap threshold, of whether a gap exists in transmission on a downlink control channel comprises:
   when the maximum quantity of repetitions of the physical downlink control channel search space is greater than or equal to the first gap threshold, determining that a gap exists in the transmission on the downlink control channel; or
   when the maximum quantity of repetitions of the physical downlink control channel search space is less than the first gap threshold, determining that no gap exists in the transmission on the downlink control channel; and
   the determining, based on the second parameter and the second gap threshold, of whether a gap exists in transmission on a downlink data channel comprises:
   when the maximum quantity of repetitions of the physical downlink control channel search space is greater than or equal to the second gap threshold, determining that a gap exists in the transmission on the downlink data channel; or
   when the maximum quantity of repetitions of the physical downlink control channel search space is less than the second gap threshold, determining that no gap exists in the transmission on the downlink data channel, wherein
   the first gap threshold and the second gap threshold are configured by a system, and the first gap threshold is different from the second gap threshold; or
   the first gap threshold is configured by a system, and the second gap threshold is determined based on the first gap threshold and a quantity of transport blocks scheduled by the downlink control information; or
   the first gap threshold is configured by a system, and the second gap threshold is determined based on the first gap threshold and a maximum quantity of transport blocks that can be scheduled by the downlink control information.

4. The method according to claim 1, wherein the first parameter is a maximum quantity of repetitions of a physical downlink control channel search space, and the second parameter is a first quantity of valid subframes;
   the determining, based on the first parameter and the first gap threshold, of whether a gap exists in transmission on a downlink control channel comprises:
   when the maximum quantity of repetitions of the physical downlink control channel search space is greater than or equal to the first gap threshold, determining that a gap exists in the transmission on the downlink control channel; or
   when the maximum quantity of repetitions of the physical downlink control channel search space is less than the first gap threshold, determining that no gap exists in the transmission on the downlink control channel; and
   the determining, based on the second parameter and the second gap threshold, of whether a gap exists in transmission on a downlink data channel comprises:
   when the first quantity of valid subframes is greater than or equal to the second gap threshold, determining that a gap exists in the transmission on the downlink data channel; or
   when the first quantity of valid subframes is less than the second gap threshold, determining that no gap exists in the transmission on the downlink data channel, wherein
   the first gap threshold and the second gap threshold are configured by a system; or
   the first gap threshold is configured by a system, the second gap threshold is determined based on the first gap threshold and a preset constant, and the preset constant is an integer greater than or equal to 1 and less than or equal to 10; or
   the first gap threshold is configured by a system, the second gap threshold is determined based on the first gap threshold and a third gap threshold, and the third gap threshold is configured by the system.

5. The method according to claim 4, wherein
the first quantity of valid subframes is a quantity of valid subframes occupied by a physical downlink shared channel that carries the 1$^{st}$ transport block in a plurality of transport blocks scheduled by the downlink control information; or
the first quantity of valid subframes is a quantity of valid subframes occupied by a physical downlink shared channel that carries any one of a plurality of transport blocks scheduled by the downlink control information; or
the first quantity of valid subframes is a quantity of valid subframes occupied by a physical downlink shared channel that carries a plurality of transport blocks scheduled by the downlink control information.

6. A data receiving method, comprising:
obtaining a first parameter, a second parameter, a first gap threshold, and a second gap threshold;
determining, based on the first parameter and the first gap threshold, whether a gap exists in transmission on a downlink control channel;
receiving downlink control information from a network device through the downlink control channel based on a result of determining whether a gap exists in the transmission on the downlink control channel;
determining, based on the second parameter and the second gap threshold, whether a gap exists in transmission on a downlink data channel; and
receiving one or more transport blocks from the network device through the downlink data channel based on a result of determining whether a gap exists in the transmission on the downlink data channel, wherein the downlink control information is used to schedule the one or more transport blocks, wherein
the first parameter is different from the second parameter, and the first gap threshold is the same as the second gap threshold; or
the first parameter is the same as the second parameter, and the first gap threshold is different from the second gap threshold; or
the first parameter is different from the second parameter, and the first gap threshold is different from the second gap threshold.

7. The method according to claim 6, wherein the first parameter, the second parameter, the first gap threshold, and the second gap threshold enable a quantity of gaps comprised in a same time period used for receiving the downlink data channel to be not less than a quantity of gaps comprised in the same time period used for receiving the downlink control channel.

8. The method according to claim 6, wherein the first parameter is the same as the second parameter, and the first parameter is a maximum quantity of repetitions of a physical downlink control channel search space;
the determining, based on the first parameter and the first gap threshold, of whether a gap exists in transmission on a downlink control channel comprises:
when the maximum quantity of repetitions of the physical downlink control channel search space is greater than or equal to the first gap threshold, determining that a gap exists in the transmission on the downlink control channel; or
when the maximum quantity of repetitions of the physical downlink control channel search space is less than the first gap threshold, determining that no gap exists in the transmission on the downlink control channel; and
the determining, based on the second parameter and the second gap threshold, of whether a gap exists in transmission on a downlink data channel comprises:
when the maximum quantity of repetitions of the physical downlink control channel search space is greater than or equal to the second gap threshold, determining that a gap exists in the transmission on the downlink data channel; or
when the maximum quantity of repetitions of the physical downlink control channel search space is less than the second gap threshold, determining that no gap exists in the transmission on the downlink data channel, wherein
the first gap threshold and the second gap threshold are configured by a system; or
the first gap threshold is configured by a system, and the second gap threshold is determined based on the first gap threshold and a quantity of transport blocks scheduled by the downlink control information; or
the first gap threshold is configured by a system, and the second gap threshold is determined based on the first gap threshold and a maximum quantity of transport blocks that can be scheduled by the downlink control information.

9. The method according to claim 6, wherein the first parameter is a maximum quantity of repetitions of a physical downlink control channel search space, and the second parameter is a first quantity of valid subframes;
the determining, based on the first parameter and the first gap threshold, of whether a gap exists in transmission on a downlink control channel comprises:
when the maximum quantity of repetitions of the physical downlink control channel search space is greater than or equal to the first gap threshold, determining that a gap exists in the transmission on the downlink control channel; or
when the maximum quantity of repetitions of the physical downlink control channel search space is less than the first gap threshold, determining that no gap exists in the transmission on the downlink control channel; and
the determining, based on the second parameter and the second gap threshold, of whether a gap exists in transmission on a downlink data channel comprises:
when the first quantity of valid subframes is greater than or equal to the second gap threshold, determining that a gap exists in the transmission on the downlink data channel; or
when the first quantity of valid subframes is less than the second gap threshold, determining that no gap exists in the transmission on the downlink data channel, wherein
the first gap threshold and the second gap threshold are configured by a system; or
the first gap threshold is configured by a system, the second gap threshold is determined based on the first gap threshold and a preset constant, and the preset constant is an integer greater than or equal to 1 and less than or equal to 10; or
the first gap threshold is configured by a system, the second gap threshold is determined based on the first gap threshold and a third gap threshold, and the third gap threshold is configured by the system.

10. The method according to claim 9, wherein
the first quantity of valid subframes is a quantity of valid subframes occupied by a physical downlink shared channel that carries the 1$^{st}$ transport block in a plurality of transport blocks scheduled by the downlink control information; or the first quantity of valid subframes is a quantity of valid subframes occupied by a physical downlink shared channel that carries any one of a plurality of transport blocks scheduled by the downlink control information; or the first quantity of valid subframes is a quantity of valid subframes occupied by a physical downlink shared channel that carries a plurality of transport blocks scheduled by the downlink control information.

11. A network device, comprising:

a processor and a memory unit storing program codes for execution by the processor;

wherein the program codes, when executed by the processor, cause the apparatus to: determine a first parameter, a second parameter, a first gap threshold, and a second gap threshold; determine, based on the first parameter and the first gap threshold, whether a gap exists in transmission on a downlink control channel; send, by using a transmitter, downlink control information to a terminal device through the downlink control channel based on a result of determining whether a gap exists in the transmission on the downlink control channel; determine, based on the second parameter and the second gap threshold, whether a gap exists in transmission on a downlink data channel; and send, by using the transmitter, one or more transport blocks to the terminal device through the downlink data channel based on a result of determining whether a gap exists in the transmission on the downlink data channel, wherein the downlink control information is used to schedule the one or more transport blocks; and the first parameter is different from the second parameter, and the first gap threshold is the same as the second gap threshold; or the first parameter is the same as the second parameter, and the first gap threshold is different from the second gap threshold; or the first parameter is different from the second parameter, and the first gap threshold is different from the second gap threshold.

12. The network device according to claim 11, wherein the first parameter, the second parameter, the first gap threshold, and the second gap threshold enable a quantity of gaps comprised in a same time period used for sending the downlink data channel to be not less than a quantity of gaps comprised in the same time period used for sending the downlink control channel.

13. The network device according to claim 11, wherein the first parameter is the same as the second parameter, and the first parameter is a maximum quantity of repetitions of a physical downlink control channel search space;

the program codes further causes the device to:

when the maximum quantity of repetitions of the physical downlink control channel search space is greater than or equal to the first gap threshold, determine that a gap exists in the transmission on the downlink control channel; or when the maximum quantity of repetitions of the physical downlink control channel search space is less than the first gap threshold, determine that no gap exists in the transmission on the downlink control channel; and the program codes further causes the device to: when the maximum quantity of repetitions of the physical downlink control channel search space is greater than or equal to the second gap threshold, determine that a gap exists in the transmission on the downlink data channel; or when the maximum quantity of repetitions of the physical downlink control channel search space is less than the second gap threshold, determine that no gap exists in the transmission on the downlink data channel, wherein the first gap threshold and the second gap threshold are configured by a system, and the first gap threshold is different from the second gap threshold; or the first gap threshold is configured by a system, and the second gap threshold is determined based on the first gap threshold and a quantity of transport blocks scheduled by the downlink control information; or the first gap threshold is configured by a system, and the second gap threshold is determined based on the first gap threshold and a maximum quantity of transport blocks that can be scheduled by the downlink control information.

14. The network device according to claim 11, wherein the first parameter is a maximum quantity of repetitions of a physical downlink control channel search space, and the second parameter is a first quantity of valid subframes;

the program codes further causes the device to: when the maximum quantity of repetitions of the physical downlink control channel search space is greater than or equal to the first gap threshold, determine that a gap exists in the transmission on the downlink control channel; or when the maximum quantity of repetitions of the physical downlink control channel search space is less than the first gap threshold, determine that no gap exists in the transmission on the downlink control channel; and the program codes further causes the device to: when the first quantity of valid subframes is greater than or equal to the second gap threshold, determine that a gap exists in the transmission on the downlink data channel; or when the first quantity of valid subframes is less than the second gap threshold, determine that no gap exists in the transmission on the downlink data channel, wherein the first gap threshold and the second gap threshold are configured by a system; or the first gap threshold is configured by a system, the second gap threshold is determined based on the first gap threshold and a preset constant, and the preset constant is an integer greater than or equal to 1 and less than or equal to 10; or the first gap threshold is configured by a system, the second gap threshold is determined based on the first gap threshold and a third gap threshold, and the third gap threshold is configured by the system.

15. The network device according to claim 14, wherein the first quantity of valid subframes is a quantity of valid subframes occupied by a physical downlink shared channel that carries the 1$^{st}$ transport block in a plurality of transport blocks scheduled by the downlink control information; or the first quantity of valid subframes is a quantity of valid subframes occupied by a physical downlink shared channel that carries any one of a plurality of transport blocks scheduled by the downlink control information; or the first quantity of valid subframes is a quantity of valid subframes occupied by a physical downlink shared channel that carries a plurality of transport blocks scheduled by the downlink control information.

16. A terminal device, comprising:
a processor and a memory unit storing program codes for execution by the processor;
wherein the program codes, when executed by the processor, cause the apparatus to: obtain a first parameter, a second parameter, a first gap threshold, and a second gap threshold; determine, based on the first parameter and the first gap threshold, whether a gap exists in transmission on a downlink control channel; receive, by using a receiver, downlink control information from a network device through the downlink control channel based on a result of determining whether a gap exists in the transmission on the downlink control channel; determine, based on the second parameter and the second gap threshold, whether a gap exists in transmission on a downlink data channel; and receive, by using the receiver, one or more transport blocks from the network device through the downlink data channel based on a result of determining whether a gap exists in the transmission on the downlink data channel, wherein the downlink control information is used to schedule the one or more transport blocks; and the first parameter is different from the second parameter, and the first gap threshold is the same as the second gap threshold; or the first parameter is the same as the second parameter, and the first gap threshold is different from the second gap threshold; or the first parameter is different from the second parameter, and the first gap threshold is different from the second gap threshold.

17. The terminal device according to claim 16, wherein the first parameter, the second parameter, the first gap threshold, and the second gap threshold enable a quantity of gaps comprised in a same time period used for receiving the downlink data channel to be not less than a quantity of gaps comprised in the same time period used for receiving the downlink control channel.

18. The terminal device according to claim 16, wherein the first parameter is the same as the second parameter, and the first parameter is a maximum quantity of repetitions of a physical downlink control channel search space;

the program codes further causes the device to: when the maximum quantity of repetitions of the physical downlink control channel search space is greater than or equal to the first gap threshold, determine that a gap exists in the transmission on the downlink control channel; or when the maximum quantity of repetitions of the physical downlink control channel search space is less than the first gap threshold, determine that no gap exists in the transmission on the downlink control channel; and the program codes further causes the device to: when the maximum quantity of repetitions of the physical downlink control channel search space is greater than or equal to the second gap threshold, determine that a gap exists in the transmission on the downlink data channel; or when the maximum quantity of repetitions of the physical downlink control channel search space is less than the second gap threshold, determine that no gap exists in the transmission on the downlink data channel, wherein the first gap threshold and the second gap threshold are configured by a system; or the first gap threshold is configured by a system, and the second gap threshold is determined based on the first gap threshold and a quantity of transport blocks scheduled by the downlink control information; or the first gap threshold is configured by a system, and the second gap threshold is determined based on the first gap threshold and a maximum quantity of transport blocks that can be scheduled by the downlink control information.

19. The terminal device according to claim 16, wherein the first parameter is a maximum quantity of repetitions of a physical downlink control channel search space, and the second parameter is a first quantity of valid subframes;

the program codes further causes the device to: when the maximum quantity of repetitions of the physical downlink control channel search space is greater than or equal to the first gap threshold, determine that a gap exists in the transmission on the downlink control channel; or when the maximum quantity of repetitions of the physical downlink control channel search space is less than the first gap threshold, determine that no gap exists in the transmission on the downlink control channel; and the program codes further causes the device to: when the first quantity of valid subframes is greater than or equal to the second gap threshold, determine that a gap exists in the transmission on the downlink data channel; or when the first quantity of valid subframes is less than the second gap threshold, determine that no gap exists in the transmission on the downlink data channel, wherein the first gap threshold and the second gap threshold are configured by a system; or the first gap threshold is configured by a system, the second gap threshold is determined based on the first gap threshold and a preset constant, and the preset constant is an integer greater than or equal to 1 and less than or equal to 10; or the first gap threshold is configured by a system, the second gap threshold is determined based on the first gap threshold and a third gap threshold, and the third gap threshold is configured by the system.

20. The terminal device according to claim 19, wherein the first quantity of valid subframes is a quantity of valid subframes occupied by a physical downlink shared channel that carries the $1^{st}$ transport block in a plurality of transport blocks scheduled by the downlink control information; or the first quantity of valid subframes is a quantity of valid subframes occupied by a physical downlink shared channel that carries any one of a plurality of transport blocks scheduled by the downlink control information; or the first quantity of valid subframes is a quantity of valid subframes occupied by a physical downlink shared channel that carries a plurality of transport blocks scheduled by the downlink control information.

* * * * *